United States Patent
Dally

(10) Patent No.: US 8,923,433 B2
(45) Date of Patent: Dec. 30, 2014

(54) DIGITAL TRANSMITTER

(71) Applicant: Massachusetts Institute of Technology, Cambridge, MA (US)

(72) Inventor: William J. Dally, Los Altos Hills, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/170,685

(22) Filed: Feb. 3, 2014

(65) Prior Publication Data
US 2014/0269879 A1    Sep. 18, 2014

Related U.S. Application Data

(63) Continuation of application No. 13/914,350, filed on Jun. 10, 2013, now Pat. No. 8,761,235, which is a
(Continued)

(51) Int. Cl.
*H04L 27/04*    (2006.01)
*H03K 5/156*    (2006.01)
(Continued)

(52) U.S. Cl.
CPC .... *H04L 25/03025* (2013.01); *H04L 25/03343* (2013.01); *H04L 25/03878* (2013.01); *H04L 25/03885* (2013.01); *H04L 1/0042* (2013.01); *H04B 3/04* (2013.01); *H04B 1/1081* (2013.01); *H04L 27/01* (2013.01); *H04L 25/0272* (2013.01); *H04L 25/0282* (2013.01)
USPC ............ 375/295; 375/231; 375/296; 375/256

(58) Field of Classification Search
USPC ......... 375/229, 230, 231, 295, 296, 297, 256, 375/257, 258, 358, 377; 333/18, 28 R
See application file for complete search history.

(56) References Cited

U.S. PATENT DOCUMENTS

| | | |
|---|---|---|
| 3,593,142 A | 7/1971 | Freeny |
| 3,777,130 A | 12/1973 | Crosier et al. |

(Continued)

FOREIGN PATENT DOCUMENTS

| | | |
|---|---|---|
| DE | 2853029 A1 | 6/1979 |
| DE | 2853059 | 6/1979 |

(Continued)

OTHER PUBLICATIONS

Davis et al., "The New DRAM Interfaces: SDRAM, RDRAM and Variants," 2000, In High Performance Computing, vol. 1940 of Lecture Notes in Computer Science, pp. 26-31, Springer-Verlag Publishing, Tokyo, Japan. 6 pages.

(Continued)

*Primary Examiner* — Tesfaldet Bocure
(74) *Attorney, Agent, or Firm* — Hamilton, Brook, Smith & Reynolds, P.C.

(57) ABSTRACT

An equalizer provided in a digital transmitter compensates for attenuation in a signal channel to a digital receiver. The equalizer generates signal levels as a logical function of bit history to emphasize transition signal levels relative to repeated signal levels. The preferred equalizer includes an FIR transition filter using a look-up table. Parallel circuits including FIR filters and digital-to-analog converters provide a high speed equalizer with lower speed circuitry. The equalizer is particularly suited to in-cabinet and local area network transmissions where feedback circuitry facilitates adaptive training of the equalizer.

21 Claims, 14 Drawing Sheets

Related U.S. Application Data continuation of application No. 12/942,607, filed on Nov. 9, 2010, now Pat. No. 8,681,837, which is a continuation of application No. 12/571,582, filed on Oct. 1, 2009, now Pat. No. 8,243,847, which is a continuation of application No. 11/514,735, filed on Aug. 31, 2006, now Pat. No. 8,254,491, which is a continuation of application No. 11/483,971, filed on Jul. 10, 2006, now abandoned, which is a continuation of application No. 10/372,630, filed on Feb. 24, 2003, now Pat. No. 7,099,404, which is a continuation of application No. 09/852,481, filed on May 10, 2001, now Pat. No. 6,542,555, which is a continuation of application No. 08/882,252, filed on Jun. 25, 1997, now Pat. No. 6,266,379, which is a continuation-in-part of application No. 08/880,980, filed on Jun. 23, 1997, now abandoned.

(60) Provisional application No. 60/050,098, filed on Jun. 20, 1997.

(51) Int. Cl.
| | | |
|---|---|---|
| *H04L 25/03* | (2006.01) | |
| *H04L 27/00* | (2006.01) | |
| *H04L 1/00* | (2006.01) | |
| *H04B 3/04* | (2006.01) | |
| *H04B 1/10* | (2006.01) | |
| *H04L 27/01* | (2006.01) | |
| *H04L 25/02* | (2006.01) | |

(56) References Cited

U.S. PATENT DOCUMENTS

| | | |
|---|---|---|
| 3,806,807 A | 4/1974 | Nakamura |
| 3,865,988 A | 2/1975 | Getgen |
| 3,906,400 A | 9/1975 | Gooding et al. |
| 3,909,510 A | 9/1975 | Luce |
| 3,914,588 A | 10/1975 | Nussbaumer |
| 3,943,496 A | 3/1976 | Padgett et al. |
| 3,950,735 A | 4/1976 | Patel |
| 3,980,826 A | 9/1976 | Widmer |
| 3,987,288 A | 10/1976 | Franks |
| 4,006,468 A | 2/1977 | Webster |
| 4,011,530 A | 3/1977 | Carver |
| 4,041,239 A | 8/1977 | Haass |
| 4,068,105 A | 1/1978 | Jain et al. |
| 4,086,587 A | 4/1978 | Lender |
| 4,153,916 A | 5/1979 | Miwa et al. |
| 4,170,715 A | 10/1979 | Mizokawa |
| 4,183,095 A | 1/1980 | Ward |
| 4,281,401 A | 7/1981 | Redwine |
| 4,315,308 A | 2/1982 | Jackson |
| 4,330,852 A | 5/1982 | Redwine et al. |
| 4,337,523 A | 6/1982 | Hotta et al. |
| 4,374,426 A | 2/1983 | Burlage et al. |
| 4,379,222 A | 4/1983 | Hayter et al. |
| 4,445,204 A | 4/1984 | Nishiguchi |
| 4,499,536 A | 2/1985 | Gemma et al. |
| 4,520,465 A | 5/1985 | Sood |
| 4,535,443 A | 8/1985 | Korevaar |
| 4,556,983 A | 12/1985 | Heitmann et al. |
| 4,584,690 A | 4/1986 | Cafiero et al. |
| 4,637,018 A | 1/1987 | Flora et al. |
| 4,646,270 A | 2/1987 | Voss |
| 4,649,522 A | 3/1987 | Kirsch |
| 4,663,735 A | 5/1987 | Novak et al. |
| 4,712,190 A | 12/1987 | Guglielmi et al. |
| 4,719,602 A | 1/1988 | Hag et al. |
| 4,744,062 A | 5/1988 | Nakamura et al. |
| 4,755,937 A | 7/1988 | Glier |
| 4,763,249 A | 8/1988 | Bomba et al. |
| 4,777,612 A | 10/1988 | Tomimitsu |
| 4,785,396 A | 11/1988 | Murphy et al. |
| 4,792,926 A | 12/1988 | Roberts |
| 4,792,929 A | 12/1988 | Olson et al. |
| 4,797,898 A | 1/1989 | Martinez |
| 4,799,199 A | 1/1989 | Scales, III et al. |
| 4,800,530 A | 1/1989 | Itoh et al. |
| 4,803,621 A | 2/1989 | Kelly |
| 4,821,226 A | 4/1989 | Christopher et al. |
| 4,825,411 A | 4/1989 | Hamano |
| 4,845,664 A | 7/1989 | Aichelmann, Jr. |
| 4,845,677 A | 7/1989 | Chappell et al. |
| 4,849,937 A | 7/1989 | Yoshimoto |
| 4,849,957 A | 7/1989 | Suzuki |
| 4,866,675 A | 9/1989 | Kawashima |
| 4,875,192 A | 10/1989 | Matsumoto |
| 4,882,712 A | 11/1989 | Ohno et al. |
| 4,891,791 A | 1/1990 | Iijima |
| 4,901,283 A | 2/1990 | Hanbury et al. |
| 4,916,670 A | 4/1990 | Suzuki et al. |
| 4,920,483 A | 4/1990 | Pogue et al. |
| 4,928,265 A | 5/1990 | Higuchi et al. |
| 4,933,910 A | 6/1990 | Olson et al. |
| 4,937,734 A | 6/1990 | Bechtolsheim |
| 4,941,128 A | 7/1990 | Wada et al. |
| 4,945,516 A | 7/1990 | Kashiyama |
| 4,953,128 A | 8/1990 | Kawai et al. |
| 4,965,527 A | 10/1990 | Clark et al. |
| 5,001,672 A | 3/1991 | Ebbers et al. |
| 5,008,903 A | 4/1991 | Betts et al. |
| 5,051,889 A | 9/1991 | Fung et al. |
| 5,058,130 A | 10/1991 | Park |
| 5,077,693 A | 12/1991 | Hardee et al. |
| 5,083,296 A | 1/1992 | Hara et al. |
| 5,111,386 A | 5/1992 | Fujishima et al. |
| 5,119,402 A | 6/1992 | Ginzburg et al. |
| 5,124,589 A | 6/1992 | Shiomi et al. |
| 5,134,699 A | 7/1992 | Aria et al. |
| 5,140,613 A | 8/1992 | Birgenheier et al. |
| 5,140,688 A | 8/1992 | White et al. |
| 5,179,687 A | 1/1993 | Hidaka et al. |
| 5,204,880 A | 4/1993 | Wurster et al. |
| 5,218,684 A | 6/1993 | Hayes et al. |
| 5,226,147 A | 7/1993 | Fujishima et al. |
| 5,254,883 A | 10/1993 | Horowitz |
| 5,260,905 A | 11/1993 | Mori |
| 5,267,269 A | 11/1993 | Shih et al. |
| 5,268,639 A | 12/1993 | Gasbarro |
| 5,268,927 A | 12/1993 | Dimos et al. |
| 5,274,339 A | 12/1993 | Wideman et al. |
| 5,276,858 A | 1/1994 | Oak et al. |
| 5,283,539 A | 2/1994 | Sadhir et al. |
| 5,301,278 A | 4/1994 | Bowater et al. |
| 5,305,278 A | 4/1994 | Inoue |
| 5,311,483 A | 5/1994 | Takasugi |
| 5,313,624 A | 5/1994 | Harriman et al. |
| 5,319,755 A | 6/1994 | Horowitz et al. |
| 5,323,358 A | 6/1994 | Toda et al. |
| 5,327,390 A | 7/1994 | Takasugi |
| 5,339,276 A | 8/1994 | Takasugi |
| 5,341,341 A | 8/1994 | Fukuzo |
| 5,343,503 A | 8/1994 | Goodrich |
| 5,345,573 A | 9/1994 | Bowden, III et al. |
| 5,355,391 A | 10/1994 | Horowitz |
| 5,357,145 A | 10/1994 | Segaram |
| 5,363,069 A | 11/1994 | Sadhir et al. |
| 5,365,489 A | 11/1994 | Jeong |
| 5,381,376 A | 1/1995 | Kim et al. |
| 5,384,745 A | 1/1995 | Konishi et al. |
| 5,386,385 A | 1/1995 | Stephens, Jr. |
| 5,390,149 A | 2/1995 | Vogley et al. |
| 5,390,308 A | 2/1995 | Ware |
| 5,392,239 A | 2/1995 | Margulis et al. |
| 5,394,437 A | 2/1995 | Ayanoglu et al. |
| 5,404,338 A | 4/1995 | Murai et al. |
| 5,404,463 A | 4/1995 | McGarvey |
| 5,410,188 A | 4/1995 | Segaram |
| 5,412,691 A | 5/1995 | Ginzburg et al. |
| 5,414,830 A | 5/1995 | Marbot |
| 5,418,670 A | 5/1995 | McClure et al. |

(56) References Cited

U.S. PATENT DOCUMENTS

| | | |
|---|---|---|
| 5,430,676 A | 7/1995 | Ware |
| 5,432,823 A | 7/1995 | Gasbarro |
| 5,442,476 A | 8/1995 | Yamazaki et al. |
| 5,444,667 A | 8/1995 | Obara et al. |
| 5,455,803 A | 10/1995 | Kodama |
| 5,463,661 A | 10/1995 | Moran, III et al. |
| 5,504,874 A | 4/1996 | Galles et al. |
| 5,513,327 A | 4/1996 | Farmwald |
| 5,521,946 A | 5/1996 | Main |
| 5,533,204 A | 7/1996 | Tipley |
| 5,539,696 A | 7/1996 | Patel |
| 5,541,957 A | 7/1996 | Lau |
| 5,548,786 A | 8/1996 | Amini et al. |
| 5,553,248 A | 9/1996 | Melo et al. |
| 5,566,203 A * | 10/1996 | Brief et al. .................... 375/211 |
| 5,608,757 A | 3/1997 | Smith et al. |
| 5,611,058 A | 3/1997 | Moore et al. |
| 5,638,531 A | 6/1997 | Crump et al. |
| 5,649,161 A | 7/1997 | Andrade et al. |
| 5,651,028 A | 7/1997 | Harris et al. |
| 5,655,078 A | 8/1997 | Anderson et al. |
| 5,655,105 A | 8/1997 | McLaury |
| 5,655,113 A | 8/1997 | Leung et al. |
| 5,687,183 A | 11/1997 | Chesley |
| 5,748,914 A | 5/1998 | Ware et al. |
| 5,754,764 A | 5/1998 | Davis et al. |
| 5,778,029 A | 7/1998 | Kaufmann |
| 5,778,419 A | 7/1998 | Hansen et al. |
| 5,802,103 A | 9/1998 | Jeong |
| 5,805,089 A | 9/1998 | Fiedler et al. |
| 5,809,552 A | 9/1998 | Kuroiwa et al. |
| 5,844,858 A | 12/1998 | Kyung |
| 5,881,108 A | 3/1999 | Herzberg et al. |
| 5,901,151 A | 5/1999 | Bleiweiss et al. |
| 5,966,032 A | 10/1999 | Elrabaa et al. |
| 5,983,070 A | 11/1999 | Georges et al. |
| RE36,673 E | 4/2000 | Cheng-Quispe et al. |
| 6,065,092 A | 5/2000 | Roy |
| 6,088,129 A | 7/2000 | Yoshida |
| 6,112,284 A | 8/2000 | Hayek et al. |
| 6,137,524 A | 10/2000 | Chea |
| 6,211,714 B1 | 4/2001 | Jeong |
| 6,266,379 B1 | 7/2001 | Dally |
| 6,437,870 B1 | 8/2002 | Yoshida et al. |
| 6,470,405 B2 | 10/2002 | Hampel et al. |
| 6,496,911 B1 | 12/2002 | Dixon et al. |
| 6,542,555 B2 | 4/2003 | Dally |
| 6,584,037 B2 | 6/2003 | Farmwald |
| 6,591,353 B1 | 7/2003 | Ware et al. |
| 6,748,507 B2 | 6/2004 | Kawasaki et al. |
| 6,931,467 B2 | 8/2005 | Ware et al. |
| 7,099,404 B2 | 8/2006 | Dally |
| 7,287,109 B2 | 10/2007 | Barth |
| 7,526,046 B2 | 4/2009 | Dally |
| 7,564,920 B1 | 7/2009 | Dally |
| 7,580,474 B2 | 8/2009 | Dally |
| 7,586,987 B2 | 9/2009 | Vorenkamp et al. |
| 7,602,857 B2 | 10/2009 | Dally |
| 7,602,858 B2 | 10/2009 | Dally |
| 7,706,464 B2 | 4/2010 | Dally |
| 7,715,494 B2 | 5/2010 | Dally |
| 8,238,467 B2 | 8/2012 | Dally |
| 8,238,470 B2 | 8/2012 | Dally |
| 8,243,847 B2 | 8/2012 | Dally |
| 8,254,491 B2 | 8/2012 | Dally |
| 8,259,841 B2 | 9/2012 | Dally |
| 8,311,147 B2 | 11/2012 | Dally |
| 8,761,235 B2 | 6/2014 | Dally |
| 2004/0095838 A1 | 5/2004 | Li |
| 2004/0125887 A1 | 7/2004 | Dryden et al. |
| 2006/0291585 A1 | 12/2006 | Dally |
| 2006/0291586 A1 | 12/2006 | Dally |
| 2006/0291587 A1 | 12/2006 | Dally |
| 2007/0002966 A1 | 1/2007 | Dally |
| 2007/0002967 A1 | 1/2007 | Dally |
| 2007/0041468 A1 | 2/2007 | Dally |
| 2007/0041469 A1 | 2/2007 | Dally |
| 2009/0262794 A1 | 10/2009 | Dally |
| 2010/0034252 A1 | 2/2010 | Dally |
| 2011/0051794 A1 | 3/2011 | Dally |
| 2011/0135032 A1 | 6/2011 | Dally |
| 2011/0200085 A1 | 8/2011 | Dally |
| 2011/0255633 A1 | 10/2011 | Dally |
| 2014/0146901 A1 | 5/2014 | Dally |

FOREIGN PATENT DOCUMENTS

| | | |
|---|---|---|
| EP | 0339224 A2 | 11/1989 |
| EP | 0384620 | 8/1990 |
| EP | 0474185 A1 | 3/1992 |
| EP | 0535670 A1 | 4/1993 |
| EP | 0561370 A2 | 9/1993 |
| EP | 0605887 B1 | 9/2001 |
| FR | 2695227 A1 | 3/1994 |
| JP | SHO 61-107453 A2 | 5/1968 |
| JP | S57-210495 | 12/1982 |
| JP | 58-192154 A2 | 11/1983 |
| JP | SHO 61-107453 A2 | 5/1986 |
| JP | 61160129 A2 | 7/1986 |
| JP | 61160130 A2 | 7/1986 |
| JP | SHO 61-160556 A | 7/1986 |
| JP | SHO 61-160556 A | 8/1986 |
| JP | 61-160130 | 9/1986 |
| JP | 61245255 A2 | 10/1986 |
| JP | S61-245255 | 10/1986 |
| JP | 62016289 A2 | 1/1987 |
| JP | 62135949 A2 | 6/1987 |
| JP | 62-248330 | 10/1987 |
| JP | SHO 63-34795 | 2/1988 |
| JP | 63-091766 A2 | 4/1988 |
| JP | 63-217452 | 9/1988 |
| JP | 63239676 A2 | 10/1988 |
| JP | 01163849 | 6/1989 |
| JP | 1-236494 | 9/1989 |
| JP | 3-276344 | 12/1991 |
| JP | 05-315988 | 11/1993 |
| JP | 05-315998 | 11/1993 |
| JP | 6-103153 | 4/1994 |
| JP | 6103153 A2 | 4/1994 |
| JP | 7-262769 | 10/1995 |

OTHER PUBLICATIONS

De Man et al., "High-Speed NMOS Circuits for ROM-Accumulator and Multiplier Type Digital Filters," IEEE Journal of Solid-State Circuits, vol. SC-13, No. 5, Oct. 1978, pp. 565-572. 8 pages.

Declaration of John Poulton dated Jul. 7, 2011 for ITC Action Rel. Barth/Dally Patents. 9 pages.

Deutsch et al., "Performance Limits of Electrical Cables for Intrasystem Communication," IBM Journal of Research and Development, vol. 38, No. 6, Nov. 1994, 16 pages.

Dipert, Brian, "The Slammin', Jammin' DRAM Scramble," Jan. 20, 2000, EDN, vol. 2000, No. 2, pp. 68-82, 12 pages.

Discovery Statement of Hitachi Global Storage Technology, Inc., In the Matter of "Certain Semiconductor Chips and Products Containing Same", re Investigation No. 337-TA-753, dated Jan. 25, 2011 for ITC Action Rel. Barth/Dally Patents. 10 pages.

Discovery Statement of Respondent Hitachi Global Storage Technologies, Inc., dated Jan. 25, 2011, re United States International Trade Commission, Washington DC, Investigation No. 337-TA-753 in the Matter of "Certain Semiconductor Chips and Products Containing Same" for ITC Action Rel. Barth/Dally Patents. 10 pages.

Discovery Statement of Respondent Garmin International, dated Jan. 25, 2011, re United States International Trade Commission, Washington DC, Investigation No. 337-TA-753 in the Matter of "Certain Semiconductor Chips and Products Containing Same" for ITC Action Rel. Barth/Dally Patents. 11 pages.

Documents related to IBM DRAM products including Gazelle and Luna (IBM 000412 to 486), Mar. 1987-1993 (as of Sep. 6, 2011 we only have IBM 000412 to 432). 21 pages.

(56) References Cited

OTHER PUBLICATIONS

DP83902A ST-NIC, "Serial Network Interface Controller for Twisted Pair," National Semiconductor, Preliminary datasheet, Nov. 1995. 70 pages.

Draft Proposed X3 Technical Report, "Fibre Channel—10-bit Interface," ANSI TR/X3.18-1993, Information Technology Industry Council, May 30, 1996. 17 pages.

EIA/JEDEC Minutes of Meeting No. 59, JC-42.3 Committee on RAM Memories, Philadelphia, PA, Sep. 18, 1991. 102 pages.

Electronic Engineering Times, "Synclink to take on SDRAMs," Apr. 10, 1995, Issue 843, A CMP Publication. 2 pages.

English Abstract and Brief Description for JP61-160556U, published Oct. 4, 1986. 13 pages.

English Translation of Notice of the Reason for Refusal, dated Sep. 21, 2004 in JP Application No. 500879/95. 4 pages.

Ewen et al., "Single-Chip 1062Mbaud CMOS Transceiver for Serial Data Communication," Feb. 15, 1995, ISSCC95/Session 2/Data Communications/Paper WP 2.1. 3 pages.

Expert Report of Dr. Robert Ellett Regarding Public Availability of Certain References, dated Jul. 20, 2011, In the Matter of "Certain Semiconductor Chips and Products Containing Same," re Investigation No. 337-TA-753 for ITC Action Rel. Barth/Dally Patents. 34 pages.

Expert Report of R. Polk Wagner Concerning the Delay in the Prosecution of the Patents-At-Issue in the in Re "Certain Semiconductor Chips and Products Containing Same Litigation," re Investigation No. 337-TA-753, dated Jul. 20, 2011 for ITC Action Rel. Barth/Dally Patents. 46 pages.

Farmwald et al., "A Fast Path to One Memory," Rambus Inc., IEEE Spectrum, Oct. 1992, pp. 50-51. 2 pages.

Fiedler et al., "A 1.0625 Gbps Transceiver with 2x-Oversampling and Transmit Signal Pre-Emphasis," Feb. 7, 1997, 1997 IEEE International Solid-State Circuits Conference, Session 15, pp. 238-239, 464. 3 pages.

Fielder et al., "A 3 NS 1K×4 Static: Self-Timed GaAs RAM," Nov. 1988, IEEE Gallium Arsenide Integrated Circuit Symposium Technical Digest, pp. 67-70. 6 pages.

Fields, Kari, "10-bit Interface TR Project," 1996, Document JNT0026672-JNT0026673, found online on Jul. 2, 2011 at http://www,t11.org/t11/stat.nsf/1158203. 2 pages.

Fields, Kari, "FC-PH Project," 1994, printed from http://www.t11.org/t11/stat.nsf/ . . . On Jul. 2, 2011. 2 pages.

First Rebuttal Expert Report of Andrew C. Singer, Ph.D. (Redacted), dated Aug. 2, 2011, In the Matter of "Certain Semiconductor Chips and Products Containing Same," re Investigation No. 337-TA-753 for ITC Action Rel. Barth/Dally Patents. 171 pages.

Forney et al., "Combined Equalization and Coding Using Precoding," Dec. 1991, IEEE Communications Magazine, pp. 25-34. 10 pages.

Frank, Edward H., "The SBUS: Sun's High Performance System Bus for RISC Workstations," 1990, Sun Microsystems Inc., IEEE pp. 189-194. 6 pages.

Freescale Semiconductor, Inc.'s Answer to Rambus Inc.'s Complaint for Patent Infringement, Demand for Jury Trial, dated Feb. 7, 2011, re Case No. C 10-05445 JF, In the United States District Court, Northern District of California, San Jose Division, for ITC Action Rel. Barth/Dally Patents. 15 pages.

Geimer, Rick, "Hitachi Single-Chip RISC Micro-Computer SH7032 and SH7034 HD6417032, HD6477034, HD6437034 Hardware Manual," Jun. 9, 1995, Hitachi Micro Systems, Incorporated, 614 pages.

Gigabyte Respondents' Response to Rambus Inc.'s Complaint and The Commission's Notice of Investigation including Exhibit, dated Feb. 1, 2011, re United States International Trade Commission, Washington DC, Investigation No. 337-TA-753 in the Matter of "Certain Semiconductor Chips and Products Containing Same," for ITC Action Rel. Barth/Dally Patents. 121 pages.

Ginzburg et al., "FDDI over Unshielded Twisted Pairs," 1990, IEEE, pp. 395-398. 4 pages.

Gjessing et al., "RamLink: A High-Bandwidth Point-to-Point Memory Architecture," with Attached Standard, 1992, IEEE, pp. 328-331. 105 pages.

Granting Unopposed Motion Extending Time for Respondent Motorola, Inc.'s Response to Complaint and Notice of Investigation, dated Feb. 3, 2011, In the Matter of "Certain Semiconductor Chips and Products Containing Same," re Investigation No. 337-TA-753 for ITC Action Rel. Barth/Dally Patents. 4 pages.

Gustavson et al., "9. Appendix B: SyncLink," Ramlink: Appendix, 1993, R1353499-506, pp. 43-50. 8 pages.

Gustavson et al., "The Scalable Coherent Interface Project (Superbus)," SCI Aug. 22, 1988, Draft, Rev. 14, 16 pages.

Gustavson, David B., "Scalable Coherent Interface," Nov. 1988, SCI-28Nov88-doc20, SLAC-PUB-4798, Invited Paper Presented at COMPCON Spring '89, San Francisco, CA on Feb. 27-Mar. 3, 1989. 3 pages.

Gustavson, David B., "The Scalable Coherent Interface, IEEE P1596, Status and Possible Applications to Data Acquisition and Physics," Jan. 1990, SLAC-PUB-5119, I-IV, Presented at the IEEE Nuclear Science Symposium, San Francisco, CA on Jan. 15-19, 1990. 4 pages.

Hansen, et al., "A RISC Microprocessor with Integral MMU and Cache Interface," MIPS Computer Systems, Sunnyvale, CA IEEE, 1986, pp. 145-148. 4 pages.

Haykin, Simon, "An Introduction to Analog and Digital Communications," 1989, John Wiley & Sons. 89 pages.

Hidaka et al., "The Cache DRAM Architecture: A DRAM with an On-Chip Cache Memory," IEEE Micro, vol. 10, No. 2, Apr. 1990, pp. 14-25. 14 pages.

Holte et al., "A New Digital Echo Canceler for Two-Wire Subscriber Lines," Nov. 1981, IEEE Transactions on Communications, vol. COM-29, No. 11, pp. 1573-1581. 9 pages.

Horowitz et al., "TP 10.5: PLL Design for a 500 MB/s Interface," 1993, ISSCC93, Session 10, High Speed Communication and Interfaces, Paper TP 10.5, pp. 160-161, 282, JNT0020098-100. 3 pages.

IBM, "Presentations made by Michael Clinton and Mark Kellogg at the Internal IBM High-Bandwidth DRAM Meeting' held on or about Mar. 23-24, 1992 (LS1753-0469497 to 505)," Apr. 2, 1992, JNT0020071-079. 9 pages.

IBM, "Presentations made to JEDEC on or about May 7, 1992 in New Orleans, Louisiana (LS1753-0475247 to 467)". 221 pages.

IEEE Standards for Local and Metropolitan Area Networks: Supplement to Carrier Sense Multiple Access with Collision Detection (CSMA/CD) Access Method and Physical Layer Specifications, "Media Access Control (MAC) Parameters, Physical Layer, Medium Attachment Units, and Repeater for 100 Mb/s Operation. Type 100BASE-T (Clauses 21-30)," IEEE Std 802.3U-1995, LAN MAN Standards Committee of the IEEE Computer Society, approved Jun. 14, 1995. 415 pages.

IEEE Std 1802.3-1991, "Conformance Test methodology for IEEE Standards for Local and Metropolitan Area Networks: Carrier Sense Multiple Access with Collision Detection (CSMA/CD) Access Method and Physical Layer Specifications," Mar. 21, 1991. 35 pages.

IEEE. "Draft Standard for a High-Speed Memory Interface (SyncLink)," Draft 0.5 IEEE P1596.x-199x, 1995. 68 pages.

Initial Determination on Violation of Section 337 and Recommended Determination on Remedy and Bond mailed Mar. 16, 2012, re Investigation No. 337-TA-753, dated Jun. 8, 2011 for ITC Action Rel. Barth/Dally Patents. 386 pages.

Jacob et al., "Memory Systems: Cache, DRAM. Disk," ISBN: 978-0123797513, Morgan Kauffmann: San Francisco, CA, 2008. 23 pages.

James, David V., "Scalable I/O Architecture for Buses," COMPCON Spring 1989, SCI, Nov. 28, 1988. 7 pages.

James, David, "Scalable I/O Architecture for Buses," Apr. 1989, IEEE, pp. 539-544. 8 pages.

JEDEC Standard No. 21-C Release 4, Configurations for Solid State Memories, Electronic Industries Association, Nov. 1993. 183 pages.

Jeremiah et al., "Synchronous LSSD Packet Switching Memory and I/O Channel," Mar. 1982, IBM Technical Disclosure Bulletin, vol. 24, No. 10, pp. 4986-4987. 2 pages.

(56) References Cited

OTHER PUBLICATIONS

Kalter et al., "A 50-ns 16Mb DRAM with a 10-ns Data Rate and On-Chip ECC," Oct. 1990, IEEE Journal of Solid State Circuits. vol. 25, No. 5, pp. 1118-1128. 11 pages.
Kalter, Howard, "High Speed TOGGLE for Microprocessor Applications," DRAM Task Group, Sep. 17, 1990, JEDEC JC-42.3, Denver, Colorado, JNT0022352-357. 6 pages.
O'Connell, Karen (LSI Logic Corporation) Fax to Karen Huffstutter (Seagate ), dated Jul. 10, 1992 (SEA753-0105250 to 251). 2 pages.
Knut, Alnes, "SCI: A Proposal for SCI Operation," Nov. 10, 1988, SCI-10Nov88-doc23, Norsk , , Data, Oslo, Norvvay, pp. 1-12. 14 pages.
Knut, Alnes, "Scalable Coherent Interface," SCI-Feb89-doc52, (To appear in Eurobus Conference Proceedings May 1989), pp. 1-8. 8 pages.
Knut, Alnes, "SCI: A Proposal for SCI Operation," Jan. 6, 1989, SCI-Jan. 6, 1989-doc31, Norsk Data, Oslo, Norway, pp. 1-24. 23 pages.
Kobayashi, H., "Coding Schemes for Reduction of Intersymbol Interface in Data Transmission Systems," Jul. 1970, IBM J. Res. Develop., Reduction of Intersymbol Interface, pp. 343-353. 11 pages.
Komizo et al., "A 7 GHz FM Transmitter Utilizing GaAs Power MESFETs," IEEE 1977. 3 pages.
Kristiansen et al., "Scalable Coherent Interface," SCI-Sep89-doc102, Sep. 1989, Eurobus, London, (JNT0010118 to 125). 8 pages.
Krisitansen, et al., "Scalable Coherent Interface," to appear in Eurobus Conference Proceedings, May 1989. 9 pages.
Kuriyama et al., "A 4-Mbit CMOS SDRAM with 8-NS Serial Access Time," Jun. 1990, IEEE Symposium on VLSI Circuits Digest of Technical Papers, pp. 51-52. 2 pages.
Kushiyama et al., "'500 Mbyte/sec Data-Rate 512 Kbits×9 DRAM Using a Novel I/O Interface," 1992 Symposium on VLSI Circuits Digest of Technical Papers, 1992, pp. 66-67. 2 pages.
Kushiyama et al., "A 500-Megabyte/s Data-Rate 4.5M DRAM," IEEE Journal of Solid State Circuits. IEEE Service Center, Piscataway, NJ, US, vol. 28, No. 4, Apr. 1, 1993, pp. 490-498. 9 pages.
Lammers, David, "Amkor sets U.S. BGA plant," May 15, 1995 (SEA753-0105112). 1 page.
Lee et al., "A 2.5V Delay-Locked Loop for an 18Mbit, 500 Megabyte/s DRAM," Solid State Circuits Conference, Digest of Technical Papers, 41$^{st}$ ISSCC International, Feb. 1994, pp. 300-301, 357. 3 pages.
Lee et al., "A CMOS Serial Link for Fully Duplexed Data Communication," Apr. 1995, IEEE Journal of Solid-State Circuits, vol. 30, No. 4, pp. 353-364. 12 pages.
Lee et al., "Digital Communication," 1988, 151 Edition, Kluwer Academic Publishers, Boston, MA. 731 pages.
Lee et al., "Digital Communication," 1994, 2$^{nd}$ Edition, Kluwer Academic Publishers, Boston, MA. 910 pages.
Lee et al., "Low-Power Area-Efficient High-Speed I/O Circuit Techniques," IEEE J. of Solid State Circuits, vol. 35, No. 11, Nov. 2000, pp. 1591-1599. 10 pages.
Lee et al., "FA18.6: A 2.5V Delay-Locked Loop for an 18Mb 500MB/s DRAM," 1994, ISSCC94, Session 18, High-Performance Logic and Circuit Techniques, Paper FA 18.6, pp. 236-237, 239, 330. 4 pages.
Lee et al., "A 2.5 V CMOS Delay-Locked Loop for an 18Mbit, 500 Megabyte/s DRAM," IEEE Journal, vol. 29, No. 12, Dec. 1994. 6 pages.
Lee et al., "A 155-MHZ Clock Recovery Delay- and Phase-Locked Loop," pp. 421-430, Reprinted from IEEE Journal of Solid-State Circuits, vol. SC-27, Dec. 1992, pp. 1736-1746. 10 pages.
Levy et al., "A Single-Chip 5-V 2400-b/s Modem," Jun. 1990, IEEE Journal of Solid-State Circuits, vol. 25, No. 3, pp. 632-643. 12 pages.
Liu, Yu-Cheng, "The M68000 Microprocessor Family, Fundamentals of Assembly Language Programming & Interface Design," 1991, Prentice-Hall, Inc. 462 pages.

LSI Corporation's Response to Complaint Under Section 337 of the Tariff Act of 1930, as Amended, and to the Notice of Investigation Public Version, dated Feb. 2, 2011, re United States International Trade Commission, Washington DC, Investigation No. 337-TA-753 in the Matter of "Certain Semiconductor Chips and Products Containing Same," for ITC Action Rel. Barth/Dally Patents. 118 pages.
LSI Logic Preliminary Datasheet, "LR2000 High Performance RISC Microprocessor," Sep. 1988. 16 pages.
LSI Logic Preliminary Datasheet, "LR2010 Floating-Point Accelerator," Nov. 1988. 20 pages.
LSI Logic Statement of Work and Correspondence re Products Incorporating the CWSL500 Core Technology, dated 1995 (SEA753-0105087 to 093). 7 pages.
LSI Logic, "Application Note, initial Design Review (IDR) Check List," Sep. 12, 1995 (LSI753-0877571 to 585). 15 pages.
LSI Logic, "Application Note, Pre-Layout Verification Checklist," May 17, 1996 (LSI753-0877598 to 632). 35 pages.
LSI Logic, "CoreWare GigaBlaze SeriaLink Transceiver Cores Datasheet," 1996, (L51753-0475243 to 246). 4 pages.
LSI Logic, "Core Ware SeriaLink Core," Brochure, 1995. 4 pages.
LSI Logic, "GigaBlaze 500 SeriaLink Core Design Manual," Apr. 1997 (LSI753-0474994 to 0475142). 149 pages.
LSI Logic, "GigaBlaze SeriaLink 500 Core Preliminary Datasheet," Feb. 1998 (L51753-0475143 to 150). 8 pages.
LSI Logic, "SeriaLink BDSL500 Evaluation Board User's Guide," May 1997, and related documentation (LSI753-0474928 to 993). 66 pages.
LSI Logic, SeriaLink CWSL500 Core Design Manual, Preliminary, Jun. 5, 1996 (LSI753-0877703 to 953). 251 pages.
LSI Logic, "SL300 High-Speed Serializer/Deserializer Technical Manual," May 1995. 67 pages.
LSI Logic, "SL500FCT Specification 500K Fibre Channel Transceiver," Jul. 9, 1996, Rev. 0.4 (SEA753-0105252 to 273). 22 pages.
LSI/Cabletron, "Attachment H: L1A9791 Test Waiver," Sep. 6, 1996 (LSI753-0877597). 1 page.
LSI/Cabletron, "Test Change Authorization," Dec. 16, 1996 (LSI753-0877638 to 6396). 2 pages.
Marbot et al., "Integration of Multiple Bidirectional Point-to-Point Serial Links in the Gigabits per Second Range," Aug. 5-7, 1993, Hot Interconnects Symposium 1993. 22 pages.
Marbot et al., "SP25.2: Serial networks for Computing Applications," 1996 IEEE international Solid-State Circuits Conference. 3 pages.
MediaTek's Answer, dated Mar. 7, 2011, In the United States District Court Northern District of California, San Francisco Division. re Case No. 3:10-CV-05447, for ITC Action Rel. Barth/Dally Patents. 231 pages.
Meyr et al., "Research Report, 'Manchester Coding with Redistortion: An Efficient and Simple Transmission Technique in Local Digital Ring Networks,'" RZ 1042 (#37178) Oct. 27, 1980 Communications. 23 pages.
Micron Technology, Inc., "4 megx4 EDO DRAM—MT4LC4M4E8, MT4C4M4E8, MT4LC4M4E9, MT4C4M4C9," Mar. 1997, Rev. 3/97. 23 pages.
Micron Technology, Inc., "4 Megx4 EDO DRAM," Mar. 1997. 23 pages.
Mikkelsen, Catherine, "NextBus Specification," 1990, NeXT, Inc. 81 pages.
Miller, Marc, "CWSL3100 Development Status," LSI SeriaLink Presentaion, May 3, 1995, LSI Logic, Computer Products Division, SEA753-0104715 to 725. 11 pages.
Minutes of JC-42.3 DRAM Task Group Meeting, dated Jan. 17, 1995, San Jose, CA. 39 pages.
Minutes of JC-42.3 Meeting No. 55, Committee on MOS Memories, JEDEC 13674-13676, Sep. 19, 1990, Denver, CO. 57 pages.
Minutes of Meeting and Presentations made at JC-42.3 Committee on RAM Memories, Jan. 17, 1995, San Jose, CA. 39 pages.
Minutes of Meeting and Presentations made at JC-42.3 Committee on RAM Memories, Meeting No. 66, Mar. 3-4, 1993, Scottsdale, AZ. 84 pages.
Minutes of Meeting and Presentations made at JC-42.3 Committee on RAM Memories, Meeting No. 64, Sep. 16-17, 1992, Crystal City. VA. 86 pages.

(56) References Cited

OTHER PUBLICATIONS

Minutes of Meeting and Presentations made at JC-42.3 Committee on RAM Memories, Meeting No. 59, Sep. 18, 1991. Philadelphia. PA 102 pages.
Minutes of Meeting and Presentations made at JC-42.3 Committee on RAM Memories, Meeting No. 76, Sep. 11, 1995, Crystal City, VA. 43 pages.
Minutes of Meeting and Presentations made at JC-42.3 Committee on HAM Memories, Meeting No. 58, May 9, 1991, Anchorage, AK. 30 pages.
Minutes of Meeting and Presentations made at JC-42.3 Committee on HAM Memories, Meeting No. 72, Sep. 13, 1994, Albuquerque, NM. 56 pages.
Minutes of Meeting and Presentations made at JC-42.3 Committee on HAM Memories, Meeting No. 62, May 7, 1992, New Orleans, LA. 115 pages.
Minutes of Meeting and Presentations made at JC-42.3 Committee on RAM Memories, Meeting No. 65, Dec. 9-10, 1992, Ft. Lauderdale, FL. 6 pages.
Minutes of Meeting No. 75, JEDEC JC-42.3 Committee on RAM Memories, and referenced attachment "Y" of the presentation titled "SyncLink", May 24, 1995, New Orleans, LA. 14 pages.
Mitsubishi Electric Corporation, "M5M4V16807ATP-10, -12,-15, Target Spec.," Rev. 0.3, May 7, 1993, pp. 452-488. 37 pages.
MoSys Inc., "MDRAM datasheet," MD904 to MD920, ½ to 2 ½ MByte Multibank DRAM (MDRAM) 125K×32 to 656K×32 Preliminary Information, 1997 (LSI753-0473073 to 088). 16 pages.
MoSys Incorporated, "Company Backgrounder," Jul. 1994 (LSI753-0473041 to 043). 3 pages.
MoSys Press Releases, "MoSys Innovative Ultra-High-Performance DRAM Architecture Basis for Breakthrough Graphics and Multimedia Engine," Nov. 13, 1995, found at file://C:\DOCUME~1\Te on Sep. 18, 2006 (LSI753-0473067 to 067). 2 pages.
MoSys, "MD904 to MD920, Multibank DRAM (MDRAM) 128K×32 to 656K×32," Datasheet, Document DS01-2.1, MoSys Inc., California, Dec. 18, 1995, pp. 1-14. 14 pages.
Motion for Receipt of Evidence Without a Sponsoring Witness and Motion for Leave to File Same on Sep. 28, 2011, dated Sep. 27, 2011, In the Matter of "Certain Semiconductor Chips and Products Containing Same," re Investigation No. 337-TA-753 for ITC Action Rel. Barth/Dally Patents, 97 pages.
Motorola, "M68000 8-/16-/32-Bit Microprocessors User's Manual," 1993, $9^{th}$ Edition, Freescale Semiconductor, Inc. 189 pages.
Motorola, "MC68302 Integrated Multiprotocol Processor User's Manual," 1991, Rev. 2, $2^{nd}$ Edition, from the Library of the University of California at Santa Barbara. 544 pages.
Motorola, "Motorola MC88200 Cache/Memory Management Unit User's Manual," $2^{nd}$ Edition, 1988, Prentice Hall. 122 pages.
Moussouris, John P., "The Advanced Systems Outlook-Life Beyond RISC: The Next 30 years in High-Performance Computing," Computer Letter, Jul. 31, 1989 (an Edited Excerpt from an Address at the $4^{th}$ Annual Conference on the Advanced Systems Outlook, in San Francisco, CA on Jun. 5). 10 pages.
Moussouris, John P., "A CMOS Processor with Integrated Systems Functions," MIPS Computer Systems, Sunnyvale, CA, IEEE 1986, pp. 126-130. 12 pages.
National Semiconductor Product Folder, "CLC014, Adaptive Cable Equalizer for High Speed Data Recovery," Feb. 26, 1997, pp. 1-3. 3 pages.
National Semiconductor Product Folder,"Comlinear CLC014, Adaptive Cable Equalizer for High-Speed Data Recovery," Aug. 1996, pp. 1-12. 12 pages.
National Semiconductor, "DP83840 10/100 Mb/s Ethernet Physical Layer," Preliminary Datasheet, Nov. 1995. 56 pages.
National Semiconductor, "DP83840A 10/100 Mb/s Ethernet Physical Layer," Datasheet, Version A Mar. 1997. 89 pages.
NeXT, "NextBus Interface Chip Specification," 1990. 142 pages.

Notice of Commission Determination Terminating the Investigation as to Three Respondents of the Basis of Settlement; Determination to Review in the Entirety a Final Initial Determination Finding No Violation of Section 337; Schedule for Filing Written Submissions or Certain Issues and on Remedy, the Public Interest and Bonding, dated May 3, 2012, In the Matter of "Certain Semiconductor Chips and Products Containing Same," re ITC Investigation No. 337-TA-753. 6 pages.
Notice of Prior Art by Respondents Broardcom, MediaTek, STMicroelectronics N.V., STMicroelectronics, Inc., Nvidia, Audio Partnership PLC., Asustek Computer Inc., Asus Computer International, Inc., Biostar Microtech (U.S.A) Corp., Biostar Microtech International, Cisco Systems, Inc., EliteGroup Computer Systems Co. Ltd. (ECS), EVGA Corporation, Galaxy Microsystems Ltd., Garmin International, Inc., G.B.T. Inc., Gigabyte Technology Co. Ltd., Gracom Technologies LLC, Hewlett-Packard Co., Hitachi Global Storage Technologies, Inc., Jaton Corporation, Jaton Technologies TPE, Micro-Star International, Motorola Mobility, Inc., MSI Computer Corporation, Oppo Digital, Inc., Palit Microsystems Ltd., Pine Technology Holdings, Ud., Sparkle Computer Co. Ltd., Zotac International (MCO) Ltd., and Zotac USA Inc., dated Jul. 5, 2011, In the Matter of "Certain Semiconductor Chips and Products Containing Same," re Investigation No. 337-TA-753 for ITC Action Rel. Barth/Dally Patents. 37 pages.
Numata et al., "New Nibbled-Page Architecture for High Density DRAM's," Aug. 1989, IEEE Journal of Solid State Circuits, vol. 24, No. 4, pp. 900-904. 6 pages.
Objections and Responses to Respondents Broadcom, MediaTek, STMicroelectronics N.V., STMicroelectronics, Inc., and Nvidia's Corporate Notice of Deposition to Complainant Rambus Inc. (Topics Nos. 60-94 ), dated Jun. 26, 2011, In the Matter of "Certain Semiconductor Chips and Products Containing Same," re Investigation No. 337-TA-753 for ITC Action Rel. Barth/Dally Patents. 29 pages.
O'Connell et al., "Serial Link Breaks the I/O Bottleneck," Jul. 22, 1996, Electronic Design, Computer systems Special Editorial, pp. 124-127. 9 pages.
Ohta, Kiyoto. "A 1-Mbit DRAM with 33-MHz Serial I/O Ports," Oct. 1986, IEEE Journal of Solid State Circuits, vol. 21, No. 5, pp. 649-654. 6 pages.
Oshima et al., "High Speed DRAMs with Innovative Architectures," Aug. 1994, (Exhibit F), IEICE Trans. Electron, vol. E77-C, No. 8, pp. 1303-1315. 14 pages.
Oster et al., "Overview of the Hitachi SH7000 Series Single-Chip RISC Microcomputer," Feb. 1, 1994, Hitachi Micro Systems, Incorporated. 115 pages.
P1596: SCI, A Scalable Coherent Interface, "Bus Specification Components," Nov. 28, 1988, SCI-28Nov88-doc2.p1 (INT0010069 to 93). 25 pages.
PCI-SIG's Responses and Objections to Subpoena Duces Tecum and Subpoena Ad Testificandum From Respondents Broadcom Corp., STMicroelectronics N.Y., STMicroelectronics, Inc., and Nvidia Corp., dated Jul. 5, 2011, In the Matter of "Certain Semiconductor Chips and Products Containing Same," re Investigation No. 337-TA-753 for ITC Action Rel. Barth/Dally Patents. 13 pages.
PCI-SIG's Responses and Objections to Subpoena Duces Tecum and Subpoena Ad Testificandum From Complainant Rambus, Inc., dated Jul. 5, 2011, In the Matter of "Certain Semiconductor Chips and Products Containing Same," re Investigation No. 337-TA-753 for ITC Action Rel. Barth/Dally Patents. 17 pages.
PCT Invitation to Pay Additional Fees with Communication Relating to the Results of the Partial International Search, mailed Apr. 21, 1997, for counterpart PCT Application No. PCT/US96/16835. 4 pages.
Plaintiff and Counter-Defendant Rambus Inc.'s Answer to Defendant and Counterclaimant LSI Corporation's Counterclaims for Declaratory Judgment in the United States District Court Northern District of California, San Jose Division, dated Feb. 14, 2011, re Case No. 10-05446 JF or ITC Action Rel. Barth/Dally Patents. 11 pages.

(56) References Cited

OTHER PUBLICATIONS

Plaintiff and Counter-Defendant Rambus Inc.'s Answer to Defendant Ad Counterclaimant Broadcom Corporation's Counterclaims for Declaratory Judgment, dated Feb. 16, 2011, In the United States District Court Northern District of California, San Jose Division, re Case No. 3:10-cv-05437-RS for ITC Action Rel. Barth/Dally Patents. 25 pages.
Plaintiff and Counter-Defendant Rambus Inc.'s Answer to Defendant and Counterclaimant STMicroelectronics N.V. and STMicmelectronics Inc.'s Counterclaims for Declaratory Judgment, dated Mar. 22, 2011, In the United States District Court Northern District of California, San Francisco Division, re Case No. 3:10-cv-05449 RS for ITC Action Rel. Barth/Dally Patents. 8 pages.
Proakis, John G., "Digital Communications," $3^{rd}$ Edition, 1995, McGraw-Hill, Inc. 30 pages.
Phzybyliski, Steven A., "New DRAM Technologies, A Comprehensive Analysis of the New Architectures," Micro Design Resource 1994, pp. iii-iv, 119-121, 138-158, 177-203. 56 pages.
Phzybylski, Steven, "DRAMs for New Memory Systems (Part 3): New Designs to Play Strong Role in Next-Generation Systems," Mar. 29, 1993, Microprocessor Report, pp. 22-26. 5 pages.
Przybylski, Steven, "DRAMs for New Memory Systems (Part 2): Rambus, Ramlink Offer Revolutionary New Interfaces," Mar. 8, 1993, Microprocessor Report, pp. 18-21. 4 pages.
Przybylski, Steven, "MoSys Reveals MDRAM Architecture: Radical Alternative is Not Just Another VRAM," Dec. 25, 1995, Microprocessor Report, pp. 17-20 (LSI753-0473045 to 048). 4 pages.
Przybylski, Steven, "New DRAMs Improve Bandwidth (Part 1): SDRAMs, CDRAMs, and EDRAMs, Illustrate Evolutionary Approach," Feb. 15, 1993, Microprocessor Report, pp. 18-21. 4 pages.
Raffaelli et al., "A Low Cost 77 GHz Monolithic Transmitter for Automotive Collision Avoidance Systems," Jun. 14-15, 1993, IEEE Microwave and Millimeter-Wave Monolithic Circuits Symposium, pp. 63-66. 4 pages.
Ramamurthy, Krishnan, "SeriaLink 500K Technology Core Specification," Draft, May 1, 1995, Rev. 1.0, LSI Logic, Computer Products Division, Serial Link Design Engineering. 18 pages.
*Rambus Inc. v. Broadcom Corp.*, Broadcom's Answer and Counterclaims, Including Exhibits, dated Jan. 26, 2011, In United States District Court Case No. 10-CV-05437-RS, Northern District of California, San Jose Division, for ITC Action Rel. Barth/Dally Patents. 270 pages.
*Rambus Inc. v. LSI Corporation*, LSI Corporation's Answer to Rambus Inc.'s Complaint for Patent Infringement and Counterclaims, In United States District Court Case No. 10-CV-05446-JF, Northern District of California, San Jose Division, for ITC Action Rel. Barth/Dally Patents. 26 pages.
Rambus Inc., "Architectural Overview," 1992, pp. 1-23. 23 pages.
Rambus Inc., "Corporate Backgrounder," Mar. 1992, Special Confidential (JNT0013041 to 64). 24 pages.
Rambus Inc., "RDRAM," Articles Related to RDRAM Technology, Mar. 1992-Dec. 1994 (LSI753-0466504 to 518, 566 to 589). 42 pages.
Rambus Inc.'s Objections and Responses to Freescale Semiconductor, Inc.'s First Set of Interrogatories (Nos. 1-93) Redacted on Mar. 16, 2012, dated Jan. 26, 2011, re United States International Trade Commission, Washington DC, Investigation No. 337-TA-753, In the Matter of "Certain Semiconductor Chips and Products Containing Same," for ITC Action Rel. Barth/Dally Patents. 8 pages.
Rambus Inc.'s Supplemental Responses to Broadcom Corporation's Interrogatories, Redacted on Mar. 20, 2013, dated Jun. 8, 2011, In the Matter of "Certain Semiconductor Chips and Products Containing Same," re Investigation No. 337-TA-753 for ITC Action Rel. Barth/Dally Patents. 3 pages.
Rambus Inc.'s Supplemental Response to Broadcom Corporation Interrogatory No. 8, dated Jun. 20, 2011, In the Matter of "Certain Semiconductor Chips and Products Containing Same," re Investigation No. 337-TA-753 for ITC Action Rel. Barth/Dally Patents. 8 pages.

Rambus's Objections and Responses to Respondents Broadcom Corporation, Nvidia Corporation, STMicroelectronics N. V., and STMicroelectronics, Inc.'s Fifth Set of Requests for Admission to Rambus (Nos. 496-712), dated Jul. 11, 2011, In the Matter of "Certain Semiconductor Chips and Products Containing Same," re Investigation No. 337-TA-753 for ITC Action Rel. Barth/Dally Patents. 152 pages.
Rau et al., "The Cydra 5 Departmental Supercomputer Design Philosophies, Decisions, and Tradeoffs," Jan. 1989, Computer IEEE, pp. 12-35. 22 pages.
Redacted Corrected Rebuttal Witness Statement of Andrew C. Singer, Ph.D., dated Oct. 19, 2011, In the Matter of "Certain Semiconductor Chips and Products Containing Same," re ITC Investigation No. 337-TA-753. 147 pages.
Redacted Direct Witness Statement of Dr. Ali Hajimiri dated Sep. 7, 2011. In the Matter of "Certain Semiconductor Chips and Products Containing Same," re ITC Investigation No. 337-TA-753. 298 pages.
Redacted Direct Witness Statement of Marwan Hassoun, Ph.D. dated Sep. 7, 2011, In the Matter of "Certain Semiconductor Chips and Products Containing Same," re ITC Investigation No. 337-T A-753. 470 pages.
Redacted Expert Report of Dr. Ali Hajimiri Regarding the Invalidity of US Patent Nos., dated Jul. 20, 2011, In the Matter of "Certain Semiconductor Chips and Products Containing Same," re ITC Investigation No. 337-TA-753. 412 pages.
Redacted Expert Report of Marwan Hassoun, Ph.D. Regarding Validity of US Patent Nos., dated Jul. 20, 2011, In the Matter of "Certain Semiconductor Chips and Products Containing Same," re ITC Investigation No. 337-TA-753. 695 pages.
Redacted First Rebuttal Expert Report of Andrew C. Singer, Ph.D. dated Aug. 2, 2011. In the Matter of "Certain Semiconductor Chips and Products Containing Same," re ITC Investigation No. 337-TA-753. 172 pages.
Redacted Rebuttal Witness Statement of Dr. Ali Hajimiri dated Sep. 21, 2011, In the Matter of "Certain Semiconductor Chips and Products Containing Same," re ITC Investigation No. 337-TA-753. 59 pages.
Redacted Respondents' Corrected Post-Trial Brief dated Jan. 6, 2012 (Originally filed Nov. 8, 2011), In the Matter of "Certain Semiconductor Chips and Products Containing Same," re ITC Investigation No. 337-TA-753. 321 pages.
Redacted Respondents' Prehearing Statement and Brief dated Sep. 21, 2011, In the Matter of "Certain Semiconductor Chips and Products Containing the Same," re ITC Investigation No. 337-TA-753. 475 pages.
Redacted Second Rebuttal Expert Report of Andrew C. Singer, Ph.D. dated Aug. 3, 2011, In the Matter of "Certain Semiconductor Chips and Products Containing Same," re ITC Investigation No. 337-TA-753. 88 pages.
Respondent Broadcom's Motion to Amend their Responses to Complaint, dated Jul. 1, 2011, In the Matter of "Certain Semiconductor Chips and Products Containing Same," re Investigation No. 337-TA-753 for ITC Action Rel. Barth/Dally Patents. 1543 pages.
Respondent ECS's Response to Rambus Inc.'s Complaint and the Commission's Notice of Investigation Including Exhibit, dated Feb. 1, 2011, re United States International Trade Commission, Washington DC Investigation No. 337-TA-753, In the Matter of "Certain Semiconductor Chips and Products Containing Same," for ITC Action Rel. Barth/Dally Patents. 20 pages.
Respondent EVGA's Response to Rambus Inc.'s Complaint and the Commission's Notice of Investigation Including Exhibit, dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 121 pages.
Respondent Galaxy's Response to Rambus Inc.'s Complaint and the Commission's Notice of Investigation Including Exhibit, dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 121 pages.

(56) References Cited

OTHER PUBLICATIONS

Respondent Hewlett-Packard Company's Response to Rambus Inc.'s Complaint and the Commission's Notice of Investigation Including Exhibit, dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 120 pages.

Respondent Hitachi Global Storage Technologies, Inc.'s Second Supplemental Objections and Responses to Complainant's First Set of Interrogatories to Respondent Hitachi Global Storage Technologies, Inc. (Nos. 12, 24, 28, 31, 34 and 51), dated Jun. 8, 2011, In the Matter of "Certain Semiconductor Chips and Products Containing Same," re Investigation No. 337-TA-753 for ITC Action Rel. Barth/Dally Patents. 24 pages.

Respondent Hitachi Global Storage Technologies, Inc.'s Second Supplemental Objections and Responses to Complainant's First Set of Interrogatories to Respondent Hitachi Global Storage Technologies, Inc. (Nos. 12. 24, 28, 31, 34 and 51), Redacted on Mar. 16, 2012, dated Jun. 8, 2011, In the Matter of "Certain Semiconductor Chips and Products Containing Same," re Investigation No. 337-TA-753 for ITC Action Rel. Barth/Dally Patents. 7 pages.

Respondent Nvidia Corporation's First Supplemental Objections and Responses to Rambus Inc.'s Third Set of Interrogatories (Nos. 75-76), dated Jun. 20, 2011, In the Matter of "Certain Semiconductor Chips and Products Containing Same," re Investigation No. 337-TA-753 for ITC Action Rel. Barth/Dally Patents. 18 pages.

Respondent Nvidia Corporation's Response to Rambus Inc.'s Complaint and the Commission's Notice of Investigation, dated Feb. 8, 2011, In the Matter of "Certain Semiconductor Chips and Products Containing the Same," re Investigation No. 337-TA-753 for ITC Action Rel. Barth/Dally Patents. 132 pages.

Respondent Pine Technology Holdings, Ltd.'s Response to Rambus Inc.'s Complaint and the Commission's Notice of Investigation Including Exhibit, dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 120 pages.

Respondent Sparkle Computer Co. Ltd.'s Response to Rambus Inc's Complaint and the Commission's Notice of Investigation Including Exhibit, dated Feb. 1, 2011, re United States International Trade Commission, Washington DC, In the Matter of "Certain Semiconductor Chips and Products Containing Same," Investigation No. 337-TA-753 for ITC Action Rel. Barth/Dally Patents. 121 pages.

Respondents' Contingent Petition for Review of the Initial Determination dated Mar. 29, 2012, In the Matter of "Certain Semiconductor Chips and Products Containing the Same," re ITC Investigation No. 337-TA-753. 84 pages.

Respondents LSI and Seagate's Partial Withdrawal of their Second Motion for Leave to Amend their Tentative List of Witnesses (Motion Docket 753-064), dated Aug. 18, 2011, In the Matter of "Certain Semiconductor Chips and Products Containing Same," re Investigation No. 337-TA-753 for ITC Action Rel. Barth/Dally Patents. 21 pages.

Respondents LSI and Seagate's Second Motion for Leave to Amend their Tentative List of Witnesses, dated Jul. 29, 2011, In the Matter of "Certain Semiconductor Chips and Products Containing Same," re Investigation No. 337-TA-753 for ITC Action Rel. Barth/Dally Patents. 188 pages.

Respondents' Notice of Prior Art dated Jul. 5, 2011, re Investigation No. 337-TA-753. 39 pages.

Respondents' Notice of Prior Art dated Jul. 5, 2011, In the Matter of "Certain Semiconductor Chips and Products Containing Same," re Investigation No. 337-TA-753 for ITC Action Rel. Barth/Dally Patents. 39 pages.

Respondents' Notice of Prior Art dated Jul. 5, 2011, re Investigation No. 337-TA-753. 37 pages.

Respondents' Reply to Petition of Complainant Rambus Inc. and Contingent Petition of the Office of Unfair Import Investigations, dated Mar. 27, 2012, Redacted, In the Matter of "Certain Semiconductor Chips and Products Containing the Same," re Investigation No. 337-TA-753. 112 pages.

Respondents' Response to the Commission's Notice of Review, dated May 18, 2012, Redacted, In the Matter of "Certain Semiconductor Chips and Products Containing the Same," re Investigation No. 337-TA-753. 116 pages.

Respondents' Tentative Rebuttal Exhibit List, dated Sep. 16, 2011, In the Matter of "Certain Semiconductor Chips and Products Containing Same," re Investigation No. 337-TA-753 for ITC Action Rel. Barth/Dally Patents. 81 pages.

Respondents' Joint Discovery Statement dated Jan. 25, 2011, re United States International Trade Commission, Washington DC, Investigation No. 337-TA-753, In the Matter of "Certain Semiconductor Chips and Products Containing Same," Encompassing Responses from: Broadcom Corporation, Nvidia Corp., Freescale Semiconductor, Inc., STMicroelectronics, Inc., STMicroelectronics N.V., MediaTek Inc., ASUSTek Computer, Inc., Asus Computer International, Inc., Biostar Microtech (U.S.A.) Corporation, Biostar Microtech International Corporation, Cisco Systems, Inc., EliteGroup Computer System Co. Ltd. (ECS), EVGA Corporation, Galaxy Microsystems, Ltd., Giga-Byte Technology Co. Ltd., G.B.T Inc., Hewlett-Packard Company, Jaton Corporation, Jaton Technology TPE, Micro-Star International Co. Ltd., MSI Computer Corporation, Gracom Technologies LLC, Oppo Digital, Inc., Palit Microsystems, Ltd., Pine Technology Holdings Ltd., Sparkle Computer Co. Ltd., Zotac USA Inc., and Zotac International (MCO), for ITC Action Rel. Barth/Dally Patents. 27 pages.

Response of Broadcom Corporation to Complaint Under Section 337 of the Tariff Act of 1930, as Amended and Notice of Investigation Including Exhibits, dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 331 pages.

Response of Cisco Systems, Inc. to Complaint Under Section 337 of the Tariff Act of 1930, as Amended and Notice of Investigation Including Exhibits, dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 334 pages.

Response of Complainant Rambus Inc. to Petitions for Review of Respondents and the Staff, dated Apr. 13, 2012, In the Matter of "Certain Semiconductor Chips and Products Containing Same," re ITC Investigation No. 337-TA-753. 87 pages.

Response of MediaTek Inc. to Complaint Under Section 337 of the Tarriff Act of 1930, as Amended and Notice of Investigation Including Exhibits, dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 334 pages.

Response of Motorola Inc. to Complaint Under Section 337 of the Tarif Act of 1930, as Amended and notice of Investigation dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 132 pages.

Response of Oppo Digital, Inc. to Complaint Under Section 337 of the Tariff Act of 1930, as Amended and Notice of Investigation Including Exhibits, dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 333 pages.

Response of STMicroelectronics Inc. and STMicroelec:tronics N.V. to Complaint Under Section 337 of the Tariff Act of 1930, as Amended, and Notice of Investigation, dated Feb. 4, 2011, In the Matter of "Certain Semiconductors Chips and Products Containing Same," re Investigation No. 337-TA-753 for ITC Action Rel. Barth/Dally Patents. 119 pages.

(56) References Cited

OTHER PUBLICATIONS

Response of the Office of Unfair Import Investigations to the Notice of Commission Determination to Review in the Entirety a Final Determination Finding No Violation of Section 337, dated May 31, 2012, Public Version, In the Matter of "Certain Semiconductor Chips and Products Containing Same," Investigation No. 337-TA-753. 109 pages.
Response to Complaint and Notice of Investigation by Respondent Garmin International, Inc., dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 135 pages.
Rocchi, Marc (ed.), "High-Speed Digital IC Technologies," 1990, Artech House, Inc., Norwood, MA. 74 pages.
Schanke, Morten, "Proposal for Clock Distribution in SCI," May 5, 1989, SCI-B [1 and SCI 2]. 5 pages.
Schroder, Hartmut, "High Word-Hate Digital Filters with Programmable Table Look-Up," May 1997, IEEE Transactions on Circuits and Systems, pp. 277-279. 3 pages.
Seagate Aurora 170, "Project Schedule," and related documentation, dated May 20, 1995 (SEA753-0105057 to 059). 3 pages.
Seagate Technology's Response to Complaint Under Section 337 of the Tariff Act of 1930, as Amended, and to the Notice of Investigation, dated Feb. 2, 2011, In the Matter of "Certain Semiconductor Chips and Products Containing Same," re Investigation No. 337-TA-753 for ITC Action Rel. Barth/Dally Patents. 119 pages.
Second Rebuttal Expert Report of Andrew C. Singer, Ph.D. (Redacted), dated Aug. 3, 2011. In the Matter of "Certain Semiconductor Chips and Products Containing Same," re Investigation No. 337-TA-753 for ITC Action Rel. Barth/Dally Patents. 88 pages.
Shih et al., "10 Mb/s Twisted Pair CMOS Transceiver with Transmit Waveform Pre-Equalization," 1991, IEEE Custom Integrated Circuits Conference, pp. 7.3.1-7.3.4. 4 pages.
Siemens AG, "Siemens ICs for Entertainment Electronics Picture-in-Picture System," Aug. 1989, Siemens Edition. 36 pages.
Slater, Michael, "Rambus Unveils Revolutionary Memory Interface, Rambus Channel Provides 500 Mbyte/s Memory Interface," Mar. 4, 1992, Microprocessor Report, pp. 15-21. 5 pages.
STMicroelectronics N.V. and STMicroelectronics, Inc.'s Answer to Complaint and Counterclaims, dated Mar. 1, 2011, In the United States District Court for the Northern District of California, San Francisco Division, re Case No. 3:10-CV-05449-RS for ITC Action Rel. Barth/Dally Patents. 23 pages.
Summary of Complainant's Petition for Review, dated Mar. 29, 2012, In the Matter of "Certain Semiconductor Chips and Products Containing Same," re ITC Investigation No. 337-TA-753. 17 pages.
Summary of Respondents' Reply to Petition of Complainant Rambus Inc. and Contingent Petition of the Office of Unfair Import Investigations, dated Mar. 27, 2012, Redacted, In the Matter of "Certain Semiconductor Chips and Products Containing the Same," Investigation No. 337-TA-753. 15 pages.
Summary of Response of Complainant Rambus Inc. to Petitions for Review of Respondents and the Staff, dated Apr. 13, 2012, In the Matter of "Certain Semiconductor Chips and Products Containing Same," re ITC Investigation No. 337-TA-753. 17 pages.
Synclink Annexes to RamLink Standard, Annex A-C, Draft 1.00, Dec. 13, 1993, Based on SCI Signaling Technology (RamLink), IEEE, P1596.4-199X, R1356826-863, R1356870-871, R1356874-885. 52 pages.
SyncLink, "A Proposal for an Implementation of 'RamLink'," Micron Technologies, Inc., May 23, 1995. 6 pages.
Tewksbury, Stuart K., "Wafer-Level Integrated Systems: Implementation Issues," 1989, Kluwer Academic Publishers. 459 pages.
Texas Instruments, "Proposal to Redefine Address Compression Control Bits for 16 bit DataBus Width," May 8, 1991. 19 pages.
Texas Instruments, Inc., "TMS626402, 2097 152-Word By 2-Bank Synchronous Dynamic Random-Access Memory ," Feb. 1994, pp. 5-3-5-23. 12 pages.

The Asus Respondents' Response to Rambus Inc.'s Complaint and the Commission's Notice of Investigation Including Exhibit, dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 123 pages.
The Biostar Respondents' Response to Rambus Inc.'s Complaint and the Commission's Notice of Investigation Including Exhibit, dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 121 pages.
The Jaton Respondents' Response to Rambus Inc.'s Complaint and the Commission's Notice of Investigation Including Exhibit, dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 121 pages.
The MSI Respondents' Response to Rambus Inc.'s Complaint and the Commission's Notice of Investigation Including Exhibit, dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 120 pages.
The Palit Respondents' Response to Rambus Inc.'s Complaint and the Commission's Notice of Investigation Including Exhibit, dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 120 pages.
The Zotac Respondents' Response to Rambus Inc.'s Complaint and the Commission's Notice of Investigation Including Exhibit, dated Feb. 1, 2011, re United States International Trade Commission, Washington DC, Investigation No. 337-TA-753, In the Matter of "Certain Semiconductor Chips and Products Containing Same," for ITC Action Rel. Barth/Dally Patents. 121 pages.
Thornton, J.E., "Design of a Computer: The Control Data 6600," 1970, Scott, Foresman and Company, Glenview, IL, JNT0031249-349. 101 pages.
University of North Carolina, "ARPA Proposal," Mar. 7, 1996. 61 pages.
Vanderaar et al., "Transmit Pulse Shaping Filters and Cordic Algorithm Based Precompensation for Digital Satellite Communications," 1997, IEEE, pp. 1219-1222. 4 pages.
Walker et al., "A Two-Chip 1.5-GBd Serial Link Interface," Dec. 1992, IEEE Journal of Solid-State Circuits, vol. 27, No. 12, pp. 1805-1811. 7 pages.
Wang et al., "A Monolithic Ka-Band 0.25-um GaAs MESFET Transmitter for High Volume Production," Oct. 1992, IEEE Journal of Solid-State Circuits, vol. 27, No. 10, pp. 1397-1404. 26 pages.
Watanabe et al., "An Experimental 16-Mbit CMOS DRAM Chip with a 100-MHz Serial Read/Write Mode," Jun. 1982, IEEE Journal of Solid State Circuits, vol. 24, No. 3, p. 763. 8 pages.
Widmer et al., "Single-Chip 4×500-MBd CMOS Transceiver," Dec. 1996, IEEE Journal of Solid-State Circuits, vol. 31, No. 12, pp. 2004-2014. 11 pages.
Widmer, A. X., "Predistorting Transmission Line Driver," Aug. 1975, IBM Technical Disclosure Bulletin, vol. 18, No. 3. 6 pages.
Widmer. Albert, "Documents Produced by Albert Widmer," Jul. 8, 2011, Letter to Mr. Lance Yang. 1 page.
Widmer et al., "A Single-Chip 4X500 Mbaud CMOS Transceiver," ISSCC96/Session 7/ATM/SONET/Paper F17.7. 7 pages.
Widmer et al., "A DC-Balanced, Partitioned-Block, 8B/10B Transmission Code," Sep. 1, 1983, IBM J. Res. Develop., vol. 27, No. 5, pp. 440-451. 12 pages.
Williams et al., "An Experimental-Mbit CMOS SRAM with Configurable Organization and Operation," Oct. 1988, IEEE Journal of Solid State Circuits, vol. 23, No. 5, pp. 1085-1094. 10 pages.
Wollar, Beth, "Beth Wollar Email entitled 'RE: Permission to Copy Out of Print Book'," dated May 2, 2002. 2 pages.
Yamamoto et al., "A Front-End Processor for Modems," Dec. 1989, IEEE Journal of Solid-State Circuits, vol. 24, No. 6, pp. 1634-1638. 5 pages.

(56) References Cited

OTHER PUBLICATIONS

Yang et al., "A 0.8-um CMOS 2.5Gb/s Oversampling Receiver and Transmitter for Serial Links," Dec. 1996, IEEE Journal of Solid State Circuits, vol. 31, No. 12, pp. 2015-2023. 9 pages.
Numata, Kenji et. al., "New Nibbled-Page Architecture for High Density DRAM's," IEEE Journal of Solid State Circuits, vol. 24 No. 4, pp. 900-904 (Aug. 1989). 6 pages.
Williams et al., "An Experimental 1-Mbit CMOS SRAM with Configurable Organization and Operation," IEEE Journal of Solid State Circuits, vol. 23, No. 5, pp. 1085-1094 (Oct. 1988). 10 pages.
Anceau, Francois, "A Synchronous Approach for Clocking VLSI Systems," IEEE Journal of Solid-State Circuits, vol. SC-17, No. 1, pp. 51-56 (Feb. 1982). 6 pages.
Gustavson et al., "The Scalable Coherent Interface Project (Superbus)," SCI Aug. 22, 1988, Draft, Rev. 14. 16 pages.
Knut, Alnes, "SCI: A Proposal for SCI Operation," SCI-Jan. 6, 1989-doc31, Norsk Data, Oslo, Norway, p. 1-24, Jan. 6, 1989. 23 pages.
Minutes of Meeting No. 75 JEDEC JC-42.3 Committee on RAM Memories, and referenced attachment "Y" of the presentation titled "SyncLink", May 24, 1995, New Orleans. 14 pages.
Schanke, Morten, "Proposal for Clock Distribution in SCI", SCI-B [1 and SCI 2], May 5, 1989. 5 pages.
Lee, Thomas H., "A. 2.5 V CMOS Delay-Locked Loop for an 18 Mbit, 500 Megabyte/s DRAM," IEEE Journal, vol. 29, No. 12, Dec. 1994. 6 pages.
Hansen, Craig et al., "A RISC Microprocessor with Integral MMU and Cache Interface," MIPS Computer Systems, Sunnyvale, CA, IEEE 1986, p. 145-148. 4 pages.
Frank, Edward H., "The SBUS: Sun's High Performance System Bus for RISC Workstations," IEEE pp. 189-194, Sun Microsystems Inc. 1990. 6 pages.
Przybyliski, Steven A., "New DRAM Technologies, A Comprehensive Analysis of the New Architectures," pp. iii-iv, 119-121, 138-158, 177-203 (MicroDesign Resource 1994). 60 pages.
Texas Instruments, Inc., "TMS626402, 2097 152-Word By 2-Bank Synchronous Dynamic Random-Access Memory," Feb. 1994, pp. 5-3-5-23. 12 pages.
LSI Logic Preliminary Datasheet, "LR2000 High Performance RISC Microprocessor," Sep. 1988, (w/reference page). 16 pages.
Bakka, Bjorn, et al., "SCI: Logical Level Proposals-Working Paper," SCI-6Jan-89-doc31, Norsk data, Oslo, Norway, pp. 1-24, Jan. 6, 1989. 20 pages.
Widmer, et al., "A DC-Balanced, Partitioned-Block, 8B/10B Transmission Code," IBM J. Res. Develop., vol. 27, No. 5, Sep. 1983, pp. 440-451. 12 pages.
Knut Alnes, "SCI: A Proposal for SCI Operation," SCI-10Nov88-doc23, Norsk Data Report, Oslo, Norway, pp. 1-12, Nov. 10, 1988. 14 pages.
Mitsubishi Electric, "M5M4V16807ATP-10, -12,-15, Target Spec." (Rev. 0.3), May 7, 1993, p. 1-36. 37 pages.
Rau et al., "The Cydra 5 Departmental Supercomputer Design Philosophies, Decisions, and Tradeoffs," Computer IEEE, Jan. 1989 pp. 12-35 (w/cover & title page). 22 pages.
Moussouris, John P. "The Advanced Systems Outlook-Life Beyond RISC: The Next 30 years in High-Performance Computing," Computer Letter, Jul. 31, 1989 (an edited excerpt from an address at the fourth annual conference on the Advanced Systems Outlook, in San Francisco, CA (Jun. 5). 10 pages.
MoSys, "MD904 to MD920, Multibank DRAM (MDRAM) 128K×32 to 656K×32," Datasheet, Document DS01-2.1, MoSys Inc. California, Dec. 18, 1995, pp. 1-14. 14 pages.
Minutes of meeting and presentations made at JC-42.3 Committee on Ram Memories, Meeting No. 59, Sep. 18, 1991, Philadelphia. 102 pages.
Kushiyama, Natsuki et al, "A 500-Megabyte/s Data-Rate 4.5M DRAM" IEEE Journal of Solid State Circuits, IEEE Service Center, Piscataway, NJ, US, vol. 28, No. 4, Apr. 1, 1993, pp. 490-498, XP000362979 ISSN: 0018-9200.

Ohta, Kiyoto, "A 1-Mbit DRAM with 33-MHz Serial I/O Ports," IEEE Journal of Solid State Circuits, vol. 21, No. 5, pp. 649-654 (Oct. 1986). 6 pages.
Jeremiah et al., "Synchronous LSSD Packet Switching Memory and I/O Channel," IBM Tech. Disc. Bul,. vol. 24, No. 10, pp. 4986-4987 (Mar. 1982). 2 pages.
English Translation of Notice of the Reason for Refusal, Patent Application No. JP500879/95, mailed Sep. 21, 2004. 4 pages.
James, David, "Scalable I/O Architecture for Buses," IEEE pp. 539-544 (Apr. 1989). 8 pages.
Minutes of meeting and presentations made at JC-42.3 Committee on Ram Memories, Meeting No. 72, Sep. 13, 1994, Albuquerque NM. 56 pages.
Minutes of meeting and presentations made at JC-42.3 Committee on RAM Memories, Meeting No. 58, May 9, 1991, Anchorage AK. 30 pages.
American National Standard for Information Systems, "Fibre Channel-Physical and Signaling Interface (FC-PH) Rev. 4.3" proposed working draft, Jun. 1, 1994. 478 pages.
Kuriyama, Hirotada et al., "A 4-Mbit CMOS SRAM with 8-NS Serial Access Time," IEEE Symposium on VLSI Circuits Digest of Technical Papers, pp. 51-52 (Jun. 1990). 2 pages.
"High Speed CMOS Data book", Integrated Device Technology Inc., Santa Clara, CA, p. 9-1 to 9-14, 1988. 12 pages.
Micron Semiconductor, Inc. "MT4LC4M4E9 (S) 4 Meg×4 DRAM," 1994, pp. 1-183-1-196. 14 pages.
Kalter et al., "A 50-ns 16Mb DRAM with a 10-ns Data Rate and On-Chip ECC," IEEE Journal of Solid State Circuits, vol. 25, No. 5, pp. 1118-1128 (Oct. 1990). 11 pages.
Minutes of meeting and presentations made at JC-42.3 Committee on RAM Memories, Meeting No. 62 May 7, 1992 New Orleans, LA. 115 pages.
Knut, Alnes, "Scalable Coherent Interface," SCI-Feb89-doc52, (To appear in Eurobus Conference Proceedings May 1989) pp. 1-8. 8 pages.
Lee et al., "A CMOS Serial Link for Fully Duplexed Data Communication," IEEE Journal of Solid-State Circuits, vol. 30, No. 4, pp. 353-364, (Apr. 1995). 12 pages.
Minutes of meeting and presentations made at JC-42.3 Committee on Ram Memories, Meeting No. 64, Sep. 16-17, 1992, Crystal City, VA. 86 pages.
Farmwald, M. et al., (Rambus Inc.) "A fast path to one memory," IEEE Spectrum, Oct. 1992, pp. 50-51. 2 pages.
Moussouris, John P., "A CMOS Processor with Integrated Systems Functions," MIPS Computer Systems, Sunnyvale, CA, IEEE 1986, p. 126-130. 12 pages.
Minutes of meeting and presentations made at JC-42.3 Committee on Ram Memories, Meeting No. 66, Mar. 3-4, 1993, Scottsdale AZ. 84 pages.
Rambus Inc., "Architectural Overview," Rambus Inc., 1992, pp. 1-23. 23 pages.
Architectural Overview, Rambus Inc. Publication No. DL0001-02, 1993, pp. 1-24. 24 pages.
Lee, Thomas H., et al., "A 155-MHZ Clock Recovery Delay- and Phase-Locked Loop," pp. 421-430, Reprinted from IEEE Journal of Solid-State Circuits, vol. SC-27, pp. 1736-1746 (Dec. 1992). 10 pages.
Watanabe, S. et al., "An Experimental 16-Mbit CMOS DRAM Chip with a 100-MHz Serial Read/Write Mode," IEEE Journal of Solid State Circuits, vol. 24, No. 3, p. 763, Jun. 1982. 8 pages.
Fielder et al., "A 3 NS 1K×4 Static Self-Timed GaAs RAM," IEEE Gallium Arsenide Integrated Circuit Symposium Technical Digest, pp. 67-70 (Nov. 1988) (w/ Title of Conference and copywrite page). 6 pages.
Lee, M.E., et al., "Low-Power Area-Efficient High-Speed I/O Circuit Techniques," IEEE J. of Solid State Circuits, vol. 35, No. 11, Nov. 2000, pp. 1591-1599. 10 pages.
Minutes of meeting and presentations made at JC-42.3 Committee on Ram Memories, Jan. 17, 1995, San Jose CA. 39 pages.
Hidaka, Hideto at al., "The Cache DRAM Architecture: A DRAM with an On-Chip Cache Memory," IEEE MICRO, vol. 10, No. 2, Apr. 1990, pp. 14-25. 14 pages.

(56) References Cited

OTHER PUBLICATIONS

Kushiyama, N. et al., "500 Mbyte/sec Data-Rate 512 Kbits×9 DRAM Using a Novel I/O Interface," 1992 Symposium on VLSI Circuits Digest of Technical Papers, 1992. 2 pages.
Motorola, "Motorola MC88200 Cache/Memory Management Unit User's Manual," Second Edition, Prentice Hall (1988). 122 pages.
"1989 GaAs IC Data Book & Designers Guide," Gigabit Logic Inc. (Aug. 1989). 85 pages.
Siemens AG, "Siemens ICs for Entertainment Electronics Picture-in-Picture System," Siemens Edition, Aug. 1989. 36 pages.
Oshima, Shigeo et al., "High Speed DRAMs with Innovative Architectures," IEICE Trans. Electron, vol. E77-C, No. 8, pp. 1303-1315 Aug. 1994, (Exhibit F). 14 pages.
Respondents' Notice of Prior Art dated Jul. 5, 2011, Investigation No. 337-TA-753. 39 Pages.
Respondents' Notice of Prior Art dated Jul. 5, 2011, Investigation No. 337-TA-753. 37 Pages.
Tewksbury, Stuart K., "Wafer-Level Integrated Systems: Implementation Issues," Kluwer Academic Publishers, 1989. 459 pages.
Fields, Kari, "10-bit Interface TR Project," 1996, Document JNT0026672-JNT0026673, found online on Jul. 2, 2011 at http://www.t11.org/t11/stat.nsf/1158203694fa939f852566dc0049e810/9acfccd97c91b56385 . . . 2 pages.
Yang, et al., "A 08-um CMOS 2.5 Gb/s Oversampling Receiver and Transmitter for Serial Links," IEEE Journal of Solid-State Circuits, vol. 31, No. 12, Dec. 1996, pp. 2015-2023. 9 pages.
Meyr, H. et al., "Research Report, Manchester coding with Predistortion: An Efficient and Simple Transmission Technique in Local Digital Ring Networks", RZ 1042 (#37178) Oct. 27, 1980 Communications, 23 Pages.
Chen, et al., "A 1.25 Gb/s, 460m W CMOS Transceiver for Serial Data Communication," ISSCC97, Session 15, Serial Data Communications, Paper FP 15.3, pp. 242-243, 465. 3 pages.
Ewen, John F., et al., "Single-Chip 1062Mbaud CMOS Transceiver for Serial Data Communication" ISSCC95/Session 2/Data Communications/Paper WP 2.1 dated Feb. 15, 1995. 3 Pages.
Chiang, et al., "A 20 Gbs 0.13-um CMOS Serial Link Transmitter Using an LC-PLL to Directly Drive the Output Multiplexer," IEEE Journal of Solid-State Circuits, vol. 40, No. 4, Apr. 2005, pp. 1004-1011. 8 pages.
Yamamoto, et al., "A Front-End Processor for Modems," IEEE Journal of Solid-State Circuits, vol. 24, No. 6, Dec. 1989, pp. 1634-1638. 5 pages.
Levy, et al., "A Single-Chip 5-V 2400-b/s Modem," IEEE Journal of Solid-State Circuits, vol. 25, No. 3, Jun. 1990, pp. 632-643. 12 pages.
Widmer, Albert, et al, "A Single-Chip 4X500 Mbaud CMOS Transceiver", ISSCC96/Session 7/ATM/SONET/Paper F17.7 7 Pages.
Marbot, Roland, et al., "SP25.2: Serial Networks for Computing Applications", 1996 IEEE International Solid-State Circuits Conference. 3 Pages.
Widmer, A.X., Predistorting Transmission Line Driver, 1MB Technical Disclosure Bulletin, vol. 18, No. 3 Aug. 1975. 6 Pages.
Deutsch, A., et al, "Performance Limits of Electrical Cables for Intrasystem Communication", IBM Journal of Research and Development, vol. 38, No. 6, Nov. 1994. 16 Pages.
Batruni, Roy et al., "Mixed Digital/Analog Signal Processing for a Single-Chip 2B1Q U-lnterface Transceiver", IEEE Journal of Solid-State Circuits, vol. 25, No. 6, Dec. 1990. 12 Pages.
Walker, et al., "A Two-Chip 1.5-GBd Serial Link Interface," IEEE Journal of Solid-State Circuits, vol. 27, No. 12, Dec. 1992, pp. 1805-1811. 7 pages.
AMD, "Am79C98 Twisted-Pair Ethernet Transceivers (TPEX)," Publication # 14395, Rev D, May 1994. 22 pages.
Haykin, Simon, "An Introduction to Analog and Digital Communications," John Wiley & Sons, 1989. 89 pages.
Burlage, et al., "Applications of Linear Programming to the Time-Domain Design of Digital-Filter Equalizers," IEEE Transactions on Communications, Dec. 1973, from the International Conference on Communications, Philadelphia, PA, 1972. 6 pages.

Lee, et al., "Digital Communication," $1^{st}$ Edition, Kluwer Adademic Publishers, Boston, MA, 1988. 731 pages.
Lee, et al., "Digital Communication," $2^{nd}$ Edition, Kluwer Adademic Publishers, Boston, MA, 1994. 910 pages.
Proakis, John G., "Digital Communications," $3^{rd}$ Edition, McGraw-Hill, Inc. 1995. 30 pages.
Bissell, et al., "Digital Signal Transmission," Cambridge University Press, 1992. 126 pages.
Draft Proposed X3 Technical Report, "Fibre Channel-10-bit Interface," ANSI TR/X3.18-199x, Information Technology Industry Council, May 30, 1996. 17 pages.
Rocchi, Marc (ed.), "High-Speed Digital IC Technologies," Artech House, Inc., Norwood, MA, 1990. 74 pages.
"IEEE Standard for Heterogeneous InterConnect (HIC) (Low-Cost, Low-Latency Scalable Serial Interconnect for Parallel System Construction)," IEEE Std 1355-1995, Bus Architecture Standards Committee of the IEEE Computer Society, Sep. 21, 1995. 144 pages.
IEEE Standards for Local and Metropolitan Area Networks: Supplement to Carrier Sense Multiple Access with Collision Detection (CSMA/CD) Access Method and Physical Layer Specifications, "Media Access Control (MAC) Parameters, Physical Layer, Medium Attachment Units, and Repeater for 100 Mb/s Operation, Type 100BASE-T (Clauses 21-30)," IEEE Std 802.3U-1995, LAN MAN Standards Committee of the IEEE Computer Society, approved Jun. 14, 1995. 415 pages.
Motorola, "MC68302 Integrated Multiprotocol Processor User's Manual," 1991, Rev. 2, Second Edition, from the Library of the University of California at Santa Barbara. 544 pages.
Motorola, "M68000 8-/16-/32-Bit Microprocessors User's Manual," 1993, Ninth Edition, Freescale Semiconductor, Inc. 189 pages.
Geimer, Rick, "Hitachi Single-Chip RISC Micro-computer SH7032 and SH7034 HD6417032, HD6477034, HD6437034 Hardware Manual," Jun. 9, 1995, Hitachi Micro Systems, Incorporated. 614 pages.
Bull Serial Link Technology Strings, "Bullit-Data Sheet v2.0," May 1995, 3.3V version, First Release D1.0a. 55 pages.
"VMEbus Specification Manual," Revision C.1, Oct. 1985, Third Printing. 220 pages.
NeXT, "NextBus Interface Chip Specification," 1990. 142 pages.
NeXT, Inc., "NextBus Specification," 1990. 81 pages.
Cuppu et al., "A Performance Comparison of Contemporary DRAM Architectures," May 1999, In Proc. $26^{th}$ Annual International Symposium on Computer Architecture (ISCA '99), Atlanta, GA, 222-233. 12 pages.
Anderson et al., "The IBM System/360 Model 91: Machine Philosophy and Instruction-Handling," Jan. 1967, IBM Journal of Research and Development, vol. 11, No. 1, pp. 8-24. 17 pages.
Ramamurthy, Krishnan, "SeriaLink 500K Technology Core Specification," May 1, 1995, Rev. 1.0, LSI Logic, Computer Products Division, Serial Link Design Engineering. 18 pages.
IEEE, "Draft Standard for a High-Speed Memory Interface (SyncLink)," Draft 0.5 IEEE P1596.x-199x, 1995. 68 pages.
Miller, Marc, "CWSL300 Development Status," (LSI SeriaLink Presentation) May 3, 1995, LSI Logic, Computer Products DivisionSEA753-0104715 to 725. 11 pages.
Widmer et al., "Single-Chip 4×500-MBd CMOS Transceiver," IEEE Journal of Solid-State Circuits, vol. 31, No. 12, Dec. 1996, pp. 2004-2014. 11 pages.
IEEE Std 1802.Mar. 1991, "Conformance Test Methodology for IEEE Standards for Local and Metropolitan Area Networks: Carrier Sense Multiple Access with Collision Detection (CSMA/CD) Access Method and Physical Layer Specifications," Mar. 21, 1991. 35 pages.
Rambus Inc., "Corporate Backgrounder," Mar. 1992, Special Confidential, (JNT0013041 to 64). 24 pages.
LSI Logic, "CoreWare SeriaLink Core" Brochure, 1995. 4 pages.
P1596: SCI, A Scalable Coherent Interface, "Bus Specification Components," Nov. 28, 1988, SCI-28Nov88-doc2.p1, (JNT0010069 to 93). 25 pages.
Cataldo, Anthony, "Siemens to manufacture, market MoSys DRAMs," May 22, 1995, Electronic News, (JNT0022344 to 45). 2 pages.

(56) References Cited

OTHER PUBLICATIONS

Przybylski, Stevem, "DRAMs for New Memory Systems (Part 3): New Designs to Play Strong Role in Next-Generation Systems," Mar. 29, 1993, Microprocessor Report, pp. 22-26. 5 pages.
Przybylski, Steven, "New DRAMs Improve Bandwidth (Part 1): SDRAMs, CDRAMs, and EDRAMs Illustrate Evolutionary Approach," Feb. 15, 1993, Microprocessor Report, pp. 18-21. 4 pages.
Przybylski, Steven, "DRAMs for New Memory Systems (Part 2): Rambus, Ramlink Offer Revolutionary New Interfaces," Mar. 8, 1993, Microprocessor Report pp. 18-21. 4 pages.
Gustavson, David B., "Scalable Coherent Interface," Nov. 1988, SCI-28Nov88-doc20, SLACPUB-4798, Invited paper presented at COMPCON Spring '89, San Francisco, CA on Feb. 27-Mar. 3, 1989. 3 pages.
LSI Logic, "CoreWare Serialink CWSLSOO Core Datasheet," 1995. 4 pages.
Lee, Thomas H. et al., "FA18.6: A 2.5V Delay-Locked Loop for an 18Mb SOOMB/s DRAM," 1994, ISSCC94, Session 18, High-Performance Logic and Circuit Techniques, Paper FA 18.6, pp. 236-237, 239, 330. 4 pages.
Thornton, J.E., "Design of a Computer: The Control Data 6600," 1970, Scott, Foresman and Company, Glenview, IL., JNT0031249-349. 101 pages.
Przybylski, Steven A., "New DRAM Technologies: A Comprehensive Analysis of the New Architectures," 1994, MicroDesign Resources, Sebastopol, CA, pp. 119-121, 138-158, 177-200, 202-203, JNT0028042-097. 56 pages.
Horowitz, Mark, et al., "TP 10.5: PLL Design for a 500 MB/s Interface," 1993, ISSCC93, Session 10, High-Speed Communication and Interfaces, Paper TP 10.5, pp. 160-161, 282, JNT0020098-100. 3 pages.
"Documents related to National Semiconductor DP83902, DP83840, and DP83840A (NSC-753-00001 to 2472," Mar. 6, 1995 ("National Semiconductor Rolls Out the Industry's First VLSI Fast Ethernet Solutions with Auto-Negotiation"), found online at the Free Library by Farlex on Jun. 28, 2011, JNT0025757-759. 3 pages.
IBM, "Presentations made by Michael Clinton and Mark Kellogg at the internal IBM 'High Bandwidth DRAM Meeting' held on or about Mar. 23-24, 1992 (LSI753-0469497 to 505)," Apr. 2, 1992, JNT0020071-079. 9 pages.
"JEDEC Meeting Minutes of JC-42.3—All Meetings," Meeting No. 60 (Dec. 4-5, 1991), Meeting No. 61 (Feb. 27-28, 1992), Meeting No. 62 (May 7, 1992). 587 pages.
DP83902A ST-NIC, "Serial Network Interface Controller for Twisted Pair", National Semiconductor, Preliminary Nov. 1995, datasheet. 70 Pages.
English Abstract and brief description for JP61-160556U published Oct. 4, 1986. 13 pages.
National Semiconductor, "DP83840A 10/100 Mb/s Ethernet Physical Layer," Datasheet, Version A, Mar. 1997. 89 pages.
"IEEE Standard for High-Bandwidth Memory Interface Based on SCI Signaling Technology (Ramlink)," Draft 1.00, Dec. 13, 1993, IEEE P1596.4-199X, Microprocessor and Microcomputer Standards Subcommittee of the IEEE Computer Society. 96 pages.
"Ramlink: High-Bandwidth Memory Interface Based on SCI Signaling Technology," Draft Standard, Mar. 21, 1992, Ramlink: D0.45, P1596.4, Draft for Review by the Working Group. 57 pages.
"Ramlink Standard," SCI: Section 1.-D2.06, P1596, Jan. 11, 1993, IEEE, R-ITC-10047152-191. 40 pages.
Synclink Annexes to Ram link Standard, Annex A-C, Draft 1.00, Dec. 13, 1993, Based on SCI Signaling Technology (Ramlink), IEEE, P1596.4-199X, R1356826-863, R1356870-871, R1356874-885. 52 pages.
"Draft Standard for a High-Speed Memory Interface (Synclink)," Synclink Standard, Draft 0.75, IEEE P1596.7, Nov. 3, 1995, Microprocessor and Microcomputer Standards Subcommittee of the IEEE Computer Society, R7365987-R7366044. 58 pages.
Widmer, Albert, "Documents Produced by Albert Widmer," Jul. 8, 2011, letter to Mr. Lance Yang. 1 page.

LSI Logic, "CoreWare GigaBlaze Serialink Transceiver Cores Datasheet," 1996, (LSI753-0475243 to 246). 4 pages.
IBM, Presentations made to JEDEC on or about May 7, 1992 in New Orleans, Louisiana (LSI753-0475247 to 467). 221 pages.
Documents related to IBM DRAM products including Gazelle and Luna (IBM 000412 to 486), Mar. 1987-1993—as of Sep. 6, 2011 we only have IBM 000412 to 432). 21 pages.
Jacob et al., "Memory Systems: Cache, DRAM, Disk," ISBN: 978-0123797513, Morgan Kaufmann: San Francisco, CA, 2008. 23 pages.
Byte Press Release, "MoSys' Multibank DRAM (MDRAM) at Heart of Byte Magazine's 'Best of COMDEX/Fall 95' Award Winner, Tseng Lab's ET6000," Nov. 28, 1995, found at http://web.archive.org/web/19980125065916/www.mosysinc.com/press/byte.html on Sep. 18, 2006 (LSI753-0473069 to 070). 2 pages.
Przybylski, Steven, "MoSys Reveals MD RAM Architecture: Radical Alternative Is Not Just Another VRAM," Dec. 25, 1995, Microprocessor Report pp. 17-20 (LSI753-0473045 to 048). 4 pages.
MoSys Press Releases, "MoSys Innovative Ultra-High-Performance DRAM Architecture Basis for Breakthrough Graphics and Multimedia Engine," Nov. 13, 1995, found at file://C:\DOCUME-1\tgb\LOCALS-1\ Temp\QDROQ5PO.htm on Sep. 18, 2006 (LSI753-0473067 to 067). 2 pages.
Rambus Inc., "RDRAM," articles related to RDRAM technology, Mar. 1992-Dec. 1994 (LSI753-0466501 to 518, 566 to 589). 42 pages.
Dipert, Brian, "The Slammin', Jammin' DRAM Scramble," Jan. 20, 2000, EDN, vol. 2000, No. 2, pp. 68-82. 12 pages.
O'Connell et al., "Serial Link Breaks the I/O Bottleneck," Electronic Design, Computer Systems Special Editorial, Jul. 22, 1996, pp. 124-127. 9 pages.
Karen O'Connell (LSI Logic Corporation) Fax to Karen Huffstutter (Seagate), dated Jul. 10, 1992 (SEA753-0105250 to 251). 2 pages.
Seagate Aurora 170, "Project Schedule" and related documentation, dated May 20, 1995 (SEA753-0105057 to 059). 3 pages.
LSI/Cabletron, "Test Change Authorization," Dec. 16, 1996 (LSI753-0877638 to 639). 2 pages.
LSI Logic, "Application Note, Initial Design Review (I DR) Check List," Sep. 12, 1995 (LSI753-0877571 to 585). 15 pages.
LSI Logic, "GigaBlaze SeriaLink 500 Core Preliminary Datasheet," Feb. 1998 (LSI753-0475143 to 150). 8 pages.
LSI Logic Statement of Work and correspondence re products incorporating the CWSL500 Core Technology dated 1995 (SEA753-0105087 to 093). 7 pages.
MoSys Inc., "MD RAM datasheet," MD904 to MD920, 1/2 to 2 1/2 MByte Multibank DRAM (MDRAM) 128K×32 to 656K×32 Preliminary Information, 1997 (LSI753-0473073 to 088). 16 pages.
LSI Logic, "SeriaLink CWSL500 Core Design Manual," Preliminary, Jun. 5, 1996 (LSI753-0877703 to 953). 251 pages.
"IEEE Standard for Heterogeneous InterConnect (HIC) (Low-Cost, Low-Latency Scalable Serial Interconnect for Parallel System Construction)," Sep. 21, 1995, IEEE Std 1355-1995, IEEE Bus Architecture Standards Committee of the IEEE Computer Society, adopted by ISO/IEC and redesignated as ISO/IEC 14575:2000. 145 pages.
Complaint Under Section 337 of the Tariff Act of 1930, as Amended, In the Matter of Certain Semiconductor Chips and Products Containing Same. In United States International Trade Commission, Washington D.C. 20436. Investigation No. 337-TA-753, Dec. 1, 2010 for ITC Action Rel. Barth/Dally Patents, 238 pages. Appendices and Exhibits omitted except as otherwise cited herein.
Complaint for Patent Infringement and Jury Demand, dated Dec. 1, 2010, *Rambus Inc.* v. *Broadcom Corporation*. United States District Court Northern District of California, case No. 10-CV-05437-RS for ITC Action Rel. Barth/Dally Patents. 21 pages.
Complaint for Patent Infringement and Jury Demand, dated Dec. 1, 2010, *Rambus Inc.* v. *Freescale Semiconductor Inc.* United States District Court Northern District of California, case No. CV105445 for ITC Action Rel. Barth/Dally Patents. 21 pages.
Complaint for Patent Infringement and Jury Demand, dated Dec. 1, 2010, *Rambus Inc.* v. *LSI Corporation*. United States District Court Northern District of California, San Jose Division, case No. 10-CV-05446-JF for 1TC Action Rei. Barth/Dally Patents. 20 pages.

(56) References Cited

OTHER PUBLICATIONS

Complaint for Patent Infringement and Jury Demand, dated Dec. 1, 2010, *Rambus Inc.* v. *MediaTek Inc.* United States District Court Northern District of California, case No. CV105447 for ITC Action Rel. Barth/Dally Patents. 14 pages.

Complaint for Patent Infringement and Jury Demand, dated Dec. 1, 2010, *Rambus Inc.* v. *Nvidia Corporation*. United States District Court Northern District of California, case No. CV105448 for ITC Action Rel. Barth/Dally Patents. 10 pages.

Complaint for Patent Infringement and Jury Demand, dated Dec. 1, 2010, *Rambus Inc.* v. *STMicroelectronics N.V.*; STMicroelectronics Inc. United States District Court Northern District of California, case No. CV105449 for ITC Action Rel. Barth/Dally Patents. 20 pages.

*Rambus Inc.* v. *LSI Corporation*, LSI Corporation's Answer to Rambus Inc.'s Complaint for Patent Infringement and Counterclaims. United States District Court case No. 10-CV-05446-JF. Northern District of California, San Jose Division, Jan. 24, 2011 for 1TC Action Rei. Barth/Dally Patents. 26 pages.

Discovery Statement of Respondent Garmin International, dated Jan. 25, 2011 re United States International Trade Commission, Washington DC Investigation No. 337-TA-753 in the Matter of Certain Semiconductor Chips and Products Containing Same for ITC Action Rel. Barth/Dally Patents. 11 pages.

Discovery Statement of Respondent Hitachi Global Storage Technologies, Inc., dated Jan. 25, 2011 re United States International Trade Commission, Washington DC Investigation No. 337-TA-753 in the Matter of Certain Semiconductor Chips and Products Containing Same for ITC Action Rel. Barth/Dally Patents. 10 pages.

Discovery Statement of Hitachi Global Storage Technology, Inc., In the Matter of Certain Semiconductor Chips and Products Containing Same, re Investigation No. 337-TA-753, dated Jan. 25, 2011 for ITC Action Rel. Barth/Dally Patents. 27 pages.

Respondents' Joint Discovery Statement dated Jan. 25, 2011 re United States International Trade Commission, Washington DC Investigation No. 337-TA-753 in the Matter of Certain Semiconductor Chips and Products Containing Same. Encompassing responses from: Broadcom Corporation; NVIDIA Corp.; Freescale Semiconductor, Inc.; STMicroelectronics, Inc.; STMicroelectronics N.V.; MediaTek, Inc.; ASUSTek Computer, Inc.; Asus Computer International, Inc.; Biostar Microtech (U.S.A.) Corporation; Biostar Microtech International Corporation; Cisco Systems, Inc.; EliteGroup Computer System Co., Ltd. (ECS); EVGA Corporation; Galaxy Microsystems, Ltd.; Giga-Byte Technology Co., Ltd.; G.B. T., Inc.; Hewlett-Packard Company; Jaton Corporation; Jaton Technology TPE; Micro-Star International Co., Ltd.; MSI Computer Corporation; Gracom Technologies LLC; Oppo Digital, Inc.; Pal it Microsystems, Ltd.; Pine Technology Holdings Ltd.; Sparkle Computer Co., Ltd.; Zotac USA; Inc.; and Zotac International (MCO), Ltd for ITC Action Rel. Barth/Dally Patents. 27 pages.

*Rambus Inc.* v. *Broadcom Corp*, Broadcom's Answer and Counterclaims, including Exhibits. United States District Court case No. 10-CV-05437-RS. Northern District of California, San Jose Division, Jan. 26, 2011 for ITC Action Rel. Barth/Dally Patents. 270 pages.

The Asus Respondents' Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 123 pages.

The Biostar Respondents' Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 121 pages.

Response of Broad com Corporation to Complaint Under Section 337 of the Tariff Act of 1930, as Amended and Notice of Investigation including Exhibits re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 331 pages.

Response of Cisco Systems, Inc. to Complaint Under Section 337 of the Tariff Act of 1930, as Amended and Notice of Investigation including Exhibits re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 334 pages.

Respondent ECS's Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 120 pages.

Respondent EVGA's Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 121 pages.

Respondent Galaxy's Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for 1TC Action Rei. Barth/Dally Patents. 121 pages.

Response to Complaint and Notice of Investigation by Respondent Garmin International, Inc. re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 135 pages.

Gigabyte Respondents' Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 121 pages.

Respondent Hewlett-Packard Company's Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 120 pages.

The Jaton Respondents' Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 121 pages.

Response of MediaTek Inc. to Complaint Under Section 337 of the Tariff Act of 1930, as Amended and Notice of Investigation including Exhibits re United States International Trade Commission, Washington DC Investigation No. 337-TA-753 in the Matter of Certain Semiconductor Chips and Products Containing Same, dated Feb. 1, 2011 for 1TC Action Rei. Barth/Dally Patents. 334 pages.

Response of Motorola Inc. to Complaint Under Section 337 of the Tariff Act of 1930, as Amended and Notice of Investigation re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 132 pages.

The MSI Respondents' Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 120 pages.

(56) References Cited

OTHER PUBLICATIONS

Response of Oppo Digital, Inc. to Complaint Under Section 337 of the Tariff Act of 1930, as Amended and Notice of Investigation including Exhibits re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 333 pages.
The Palit Respondents' Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 120 pages.
Respondent Pine Technology Holdings, Ltd.'s Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 120 pages.
Respondent Sparkle Computer Co., Ltd.'s Response to Rambus Inc.'s Complaint and The Commission's Notice of Investigation including Exhibit re United States International Trade Commission, Washington DC in the Matter Investigation No. 337-TA-753 of Certain Semiconductor Chips and Products Containing Same, dated Feb. 1, 2011 for ITC Action Rel. Barth/Dally Patents. 121 pages.
The Zotac Respondents' Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 121 pages.
LSI Corporation's Response to Complaint Under Section 337 of the Tariff Act of 1930, as Amended, and to the Notice of Investigation Public Version re United States International Trade Commission, Washington DC Investigation No. 337-TA-753 in the Matter of Certain Semiconductor Chips and Products Containing Same, dated Feb. 2, 2011 for ITC Action Rel. Barth/Dally Patents. 118 pages.
Seagate's Technology's Response to Complaint Under Section 337 of the Tariff Act of 1930, as Amended, and to the Notice of Investigation, In the Matter of Certain Semiconductor Chips and Products Containing Same re Investigation No. 337-TA-753, dated Feb. 2, 2011 for ITC Action Rel. Barth/Dally Patents. 119 pages.
Granting Unopposed Motion Extending Time for Respondent Motorola, Inc.'s Response to Complaint and Notice of Investigation, In the Matter of Certain Semiconductor Chips and Products Containing Same re Investigation No. 337-TA-753, dated Feb. 3, 2011 for ITC Action Rel. Barth/Dally Patents. 4 pages.
Response of STMicroelectronics Inc. and STMicroelectronics N.V. to Complaint Under Section 337 of the Tariff Act of 1930, as Amended, and Notice of Investigation, In the Matter of Certain Semiconductors Chips and Products Containing Same re Investigation No. 337-TA-753, dated Feb. 4, 2011 for ITC Action Rel. Barth/Dally Patents. 119 pages.
Freescale Semiconductor, Inc.'s Answer to Rambus Inc.'s Complaint for Patent Infringement Demand for Jury Trial re Case No. C 10-05445 JF, In the United States District Court Northern District of California San Jose Division, dated Feb. 7, 2011 for ITC Action Rel. Barth/Dally Patents. 15 Pages.
Respondent NVIDIA Corporation's Response to Rambus Inc.'s Complaint and The Commission's Notice of Investigation, In the Matter of Certain Semiconductor Chips and Products Containing the Same re Investigation No. 337-TA-753, dated Feb. 8, 2011 for ITC Action Rel. Barth/Dally Patents. 132 Pages.
Plaintiff and Counter-Defendant Rambus Inc.'s Answer to Defendant and Counterclaimant LSI Corporation's Counterclaims for Declaratory Judgment in the United States District Court Northern District of California San Jose Division re Case No. 10-05446 JF, dated Feb. 14, 2011 for ITC Action Rel. Barth/Dally Patents. 11 Pages.
Plaintiff and Counter-Defendant Rambus Inc.'s Answer to Defendant ad Counterclaimant Broadcom Corporation's Counterclaims for Declaratory Judgment, In the United States District Court Northern District of California San Jose Division re Case No. 3:10-cv-05437-RS, dated Feb. 16, 2011 for ITC Action Rel. Barth/Dally Patents. 25 pages.
STMicroelectronics N.V. and STMicroelectronics, Inc.'s Answer to Complaint and Counterclaims, In the United States District Court for the Northern District of California San Francisco Division re Case No. 3:10-cv-05449-RS, dated Mar. 1, 2011 for ITC Action Rel. Barth/Dally Patents. 23 pages.
MediaTek's Answer, In the United States District Court Northern District of California San Francisco Division re Case No. 3:10-CV-05447, dated Mar. 7, 2011 for ITC Action Rel. Barth/Dally Patents. 231 pages.
Plaintiff and Counter-Defendant Rambus Inc.'s Answer to Defendant and Counterclaimant STMicroelectronics N.V. and STMicroelectronics Inc.'s Counterclaims for Declaratory Judgment, In the United States District Court Northern District of California San Francisco Division re Case No. 3:10-cv-05449 RS, dated Mar. 22, 2011 for ITC Action Rel. Barth/Dally Patents. 8 pages.
Amended Response of STMicroelectronics Inc. and STMicroelectronics N.V. to Complaint Under Section 337 of the Tariff Act of 1930, as Amended, and Notice of Investigation, In the Matter of Certain Semiconductor Chips and Products Containing Same re Investigation No. 337-TA-753, dated May 20, 2011 for ITC Action Rel. Barth/Dally Patents. 125 Pages.
Objections and Responses to Respondents Broadcom, Mediateck, STMicroelectronics N.V., STMicroelectronics, Inc., and Nvidia's Corporate Notice of Deposition to Complainant Rambus Inc. (Topic Nos. 60-94), In the Matter of Certain Semiconductor Chips and Products Containing Same, re Investigation No. 337-TA-753, dated Jun. 26, 2011 for ITC Action Rel. Barth/Dally Patents. 29 pages.
Respondent Broadcom's Motion to Amend Their Responses to Complaint, In the Matter of Certain Semiconductor Chips and Products Containing Same, re Investigation No. 337-TA-753, dated Jul. 1, 2011 for ITC Action Rel. Barth/Dally Patents. 1543 pages.
PCI-SIG's Responses and Objections to Subpoena Duces Tecum and Subpoena Ad Testificandum From Respondents Broadcom Corp., STMicroelectronics N.V., STMicroelectronics, Inc., and nVidia Corp., In the Matter of Certain Semiconductor Chips and Products Containing Same, re Investigation No. 337-TA-753, dated Jul. 5, 2011 for ITC Action Rel. Barth/Dally Patents. 13 pages.
PCI-SIG's Responses and Objections to Subpoena Duces Tecum and Subpoena Ad Testificandum From Complainant Rambus, Inc., In the Matter of Certain Semiconductor Chips and Products Containing Same, re Investigation No. 337-TA-753, dated Jul. 5, 2011 for ITC Action Rel. Barth/Dally Patents. 17 pages.
Notice of Prior Art by Respondents Broadcom, MediaTek, STMicroelectronics N.V., STMicroelectronics, Inc., nVidia, Audio Partnership PLC., Asustek Computer Inc., Asus Computer International, Inc., Biostar Microtech (U.S.A.) Corp., Biostar Microtech International, Cisco Systems, Inc., EliteGroup Computer Systems Co. Ltd. (ECS), EVGA Corporation, Galaxy Microsystems Ltd., Garmin International, Inc., G.B.T., Inc., Gigabyte Technology Co., Ltd., Gracom Technologies LLC, Hewlett-Packard Co., Hitachi Global Storage Technologies, Inc., Jaton Corp., Jaton Technology TPE, Micro-Star International, Motorola Mobility, Inc., MSI Computer Corporation, Oppo Digital, Inc., Pal it Microsystems Ltd., Pine Technology Holdings, Ltd., Sparkle Computer Co., Ltd., Zotac International (MCO) Ltd., and Zotac USA Inc., In the Matter of Certain Semiconductor Chips and Products Containing Same, re Investigation No. 337-TA-753, dated Jul. 5, 2011 for ITC Action Rel. Barth/Dally Patents. 37 pages.
Respondents' Notice of Prior Art, In the Matter of Certain Semiconductor Chips and Products Containing Same, re Investigation No. 337-TA-753, dated Jul. 5, 2011 for ITC Action Rel. Barth/Dally Patents. 39 pages.
Declaration of John Poulton dated Jul. 7, 2011 for ITC Action Rel. Barth/Dally Patents. 9 pages.

(56) References Cited

OTHER PUBLICATIONS

Rambus's Objections and Responses to Respondents Broadcom Corporation, nVidia Corporation, STMicroelectronics N.V., and STMicroelectronics, Inc.'s Fifth Set of Requests for Admission to Rambus (Nos. 496-712), In the Matter of Certain Semiconductor Chips and Products Containing Same, re Investigation No. 337-TA-753, dated Jul. 11, 2011 for ITC Action Rel. Barth/Dally Patents. 152 pages.
Expert Report of Dr. Robert Ellett Regarding Public Availability of Certain References, In the Matter of Certain Semiconductor Chips and Products Containing Same, re Investigation No. 337-TA-753, dated Jul. 20, 2011 for ITC Action Rel. Barth/Dally Patents. 34 pages.
Expert Report of R. Polk Wagner Concerning the Delay in the Prosecution of the Patents-At-Issue in the In Re Certain Semiconductor Chips and Products Containing Same Litigation, re Investigation No. 337-TA-753, dated Jul. 20, 2011 for ITC Action Rel. Barth/Dally Patents. 46 pages.
Respondents LSI and Seagate's Second Motion for Leave to Amend Their Tentative List of Witnesses, In the Matter of Certain Semiconductor Chips and Products Containing Same, re Investigation No. 337-TA-753, dated Jul. 29, 2011 for ITC Action Rel. Barth/Dally Patents. 188 pages.
First Rebuttal Expert Report of Andrew C. Singer, Ph.D. (Redacted), In the Matter of Certain Semiconductor Chips and Products Containing Same, re Investigation No. 337-TA-753, dated Aug. 2, 2011 for ITC Action Rel. Barth/Dally Patents. 171 pages.
Second Rebuttal Expert Report of Andrew C. Singer, Ph.D. (Redacted), In the Matter of Certain Semiconductor Chips and Products Containing Same, re Investigation No. 337-TA-753, dated Aug. 3, 2011 for ITC Action Rel. Barth/Dally Patents. 88 pages.
Respondents LSI and Seagate's Partial Withdrawal of Their Second Motion for Leave to Amend Their Tentative List of Witnesses (Motion Docket 753-064), In the Matter of Certain Semiconductor Chips and Products Containing Same, re Investigation No. 337-TA-753, dated Aug. 18, 2011 for ITC Action Rel. Barth/Dally Patents. 21 pages.
Complainant Rambus Inc.'s Objections to Respondents' Proposed Corrected Direct Exhibit List, In the Matter of Certain Semiconductor Chips and Products Containing Same, re Investigation No. 337-TA-753, dated Sep. 14, 2011 for ITC Action Rel. Barth/Dally Patents. 300 pages.
Complainant's Proposed Rebuttal Exhibit List, In the Matter of Certain Semiconductor Chips and Products Containing Same, re Investigation No. 337-TA-753, dated Sep. 16, 2011 for ITC Action Rel. Barth/Dally Patents. 183 pages.
Respondents' Tentative Rebuttal Exhibit List, In the Matter of Certain Semiconductor Chips and Products Containing Same, re Investigation No. 337-TA-753, dated Sep. 16, 2011 for ITC Action Rel. Barth/Dally Patents. 81 pages.
Motion for Receipt of Evidence Without a Sponsoring Witness and Motion for Leave to File Same on Sep. 28, 2011, In the Matter of Certain Semiconductor Chips and Products Containing Same, re Investigation No. 337-TA-753, dated Sep. 27, 2011 for ITC Action Rel. Barth/Dally Patents. 97 pages.
Vanderaar, et al., "Transmit Pulse Shaping Filters and Cordic Algorithm Based Precompensation for Digital Satellite Communications," IEEE, p. 1219-1222, (1997). 4 pages.
Dally, W.J., et al., "Transmitter Equalization for 4Gb/s Signaling," Hot Interconnects IV, 10 pgs. (1996). 10 pages.
Fiedler et al., "A 1.0625 Gbps Transceiver with 2x-Oversampling and Transmit Signal Pre-Emphasis," 1997 IEEE International Solid-State Circuits Conference, Session 15, p. 238-239, 464 (Feb. 7, 1997). 3 pages.
National Semiconductor Product Folder, "Com linear CLC014, Adaptive Cable Equalizer for Highspeed Data Recovery," Aug. 1996, p. 1-12. 12 pages.
Schroder, Hartmut, "High Word-Rate Digital Filters with Programmable Table Look-Up," IEEE Transactions on Circuits and Systems, May 1997, p. 277-279. 3 pages.

Dally, W.J., et al., "Transmitter Equalization for 4-Gbps Signaling," IEEE Micro, vol. 17, No. 1, Jan./Feb. 1997, p. 48-56. 9 pages.
Kobayashi, H., "Coding Schemes for Reduction of Intersymbol Interface in Data Transmission Systems," IBM J. Res. Develop., Reduction of Intersymbol Interface, p. 343-353 (Jul. 1970). 11 pages.
Kristiansen, E.H., Alnes, Knut, Bakka, Bjorn 0, and Jenssen, Mant, "Scalable Coherent Interface," to appear in Eurobus Conference Proceedings, May 1989. 9 pages.
Forney, et al., "Combined Equalization and Coding Using Preceding," IEEE Communications Magazine, p. 25-34 (Dec. 1991). 10 pages.
Shih, et al., "10 Mb/s Twisted Pair CMOS Transceiver with Transmit Waveform Pre-Equalization," IEEE 1991 Custom Integrated Circuits Conference, p. 7.3.1-7.3.4 (1991). 4 pages.
Ginzburg, et al., "FDDI over Unshielded Twisted Pairs," IEEE, p. 395-398 (1990). 4 pages.
De Man, Hugo J., et al., "High-speed NMOS Circuits for ROM-Accumulator and Multiplier Type Digital Filters," IEEE Journal of Solid-State Circuits, vol. SC-13, No. 5, Oct. 1978, p. 565-572. 8 pages.
Holte, et al., "A New Digital Echo Canceler for Two-Wire Subscriber Lines," IEEE Transactions on Communications, vol. COM-29, No. 11, p. 1573-1581 (Nov. 1981). 9 pages.
National Semiconductor Product Folder, "CLC014, Adaptive Cable Equalizer for High Speed Data Recovery," Feb. 26, 1997, p. 1-3. 3 pages.
Wang, et al., "A Monolithic Ka-Band 0.25-um GaAs MESFET Transmitter for High Volume Production," IEEE Journal of Solid-State Circuits; vol. 27. No. 10, pp. 1397-1404 (Oct. 1992). 26 pages.
Raffaelli et al., "A Low Cost 77 GHz Monolithic Transmitter for Automotive Collision Avoidance Systems," IEEE Microwave and Millimeter-Wave Monolithic Circuits Symposium; pp. 63-66 (Jun. 14-15, 1993). 4 pages.
Dally, William, U.S. Appl. No. 11/514,735, title Digital Transmitter, filed Aug. 31, 2006, Response mailed Apr. 16, 2010. 27 Pages.
Dally, William, U.S. Appl. No. 12/571,582, title Digital Transmitter, filed Oct. 1, 2009, Preliminary Amendment mailed Aug. 20, 2010. 16 pages.
"Amkor SuperBGA Preliminary Data Sheet" DS 510 10,94 (SEA753-0105113 to 114) cited in Notice of Prior Art dated Jul. 5, 2011 in U.S. Appl. Nos. 95/001,169 and 12/491,033. 2 pages.
Dally, William, U.S. Appl. No. 11/514,735, title Digital Transmitter, filed Aug. 31, 2006, Notice of Allowance and Fee(s) Due mailed Sep. 6, 2011. 15 Pages.
SyncLink, "A Proposal for an Implementation of 'Ramlink'," Micron Technology, Inc., May 23, 1995. 6 pages.
Electronic Engineering Times, Apr. 10, 1995, Issue 843, A CMP Publication "'Synclink' to take on SDRAMs". 2 pages.
Micron Technology, Inc., "4 megx4 EDO DRAM—MT4LC4M4E8, MT4C4M4E8, MT4LC4M4E9, MT4C4M4C9," Rev. 3/97, dated Mar. 1997. 23 pages.
Wallar, Beth, "Beth Wallar Email titled 'RE: permission to copy out of print book'," dated Apr. 26, 2002 and Response dated May 2, 2002. 2 pages.
Texas Instruments, "Proposal to Redefine Address Compression Control Bits for 16 bit Data Bus Width," May 8, 1991. 19 pages.
Respondent Hitachi Global Storage Technologies, Inc.'s Second Supplemental Objections and Responses to Complainant's First Set of Interrogatories to Respondent Hitachi Global Storage Technologies, Inc. (Nos. 12, 24, 28, 31, 34 and 51), In the Matter of Certain Semiconductor Chips and Products Containing Same re Investigation No. 337-TA-753, dated Jun. 8, 2011 for ITC Action Rel. Barth/Dally Patents. 24 Pages.
Respondent nVidia Corporation's First Supplemental Objections and Responses to Rambus Inc.'s Third Set of Interrogatories (Nos. 75-76), In the Matter of Certain Semiconductor Chips and Products Containing Same, re Investigation No. 337-TA-753, dated Jun. 20, 2011 for ITC Action Rel. Barth/Dally Patents. 18 pages.
Rambus Inc.'s Supplemental Response to Broadcom Corporation Interrogatory No. 8, In the Matters of Certain Semiconductor Chips and Products Containing Same, re Investigation No. 337-TA-753, dated Jun. 20, 2011 for ITC Action Rel. Barth/Dally Patents. 8 pages.

(56) References Cited

OTHER PUBLICATIONS

Dally, William J., U.S. Appl. No. 12/571,582, title Digital Transmitter, filed on Oct. 1, 2009, Office Action mailed Nov. 22, 2011. 38 pages.
Dally, William, U.S. Appl. No. 13/027,893, title Digital Transmitter, filed Feb. 15, 2011, re Office Action mailed Dec. 14, 2011. 38 pages.
Dally, William, U.S. Appl. No. 11/514,735, title Digital Transmitter, filed Aug. 31, 2006, Notice of Allowance and Fee(s) Due mailed Dec. 21, 2011. 25 pages.
Dally, William, U.S. Appl. No. 13/090,507, title Digital Transmitter, filed Apr. 20, 2011, Office Action mailed Jan. 11, 2012. 45 pages.
Dally, William, U.S. Appl. No. 12/571,582, title Digital Transmitter, filed Oct. 1, 2009, Notice of Allowance and Fee(s) Due mailed Mar. 2, 2012. 18 pages.
Dally, William, U.S. Appl. No. 12/491,033, title Digital Transmitter, filed Jun. 24, 2009, Notice of Allowance and Fee(s) Due mailed Feb. 23, 2012. 19 pages.
Rambus Inc.'s Objections and Responses to Freescale Semiconductor, Inc.'s First Set of Interrogatories (Nos. 1-93) Redacted Mar. 16, 2012 re United States International Trade Commission, Washington DC Investigation No. 337-TA-753 in the Matter of Certain Semiconductor Chips and Products Containing Same, dated Jan. 26, 2011 for ITC Action Rel. Barth/Dally Patents. 8 pages.
Respondent Hitachi Global Storage Technologies, Inc.'s Second Supplemental Objections and Responses to Complainant's First Set of Interrogatories to Respondent Hitachi Global Storage Technologies, Inc. (Nos. 12, 24, 28, 31, 34 and 51) Redacted on Mar. 16, 2012, In the Matter of Certain Semiconductor Chips and Products Containing Same re Investigation No. 337-TA-753, dated Jun. 8, 2011 for ITC Action Rel. Barth/Dally Patents. 7 Pages.
Rambus Inc.'s Supplemental Responses to Broadcom Corporation's Interrogatories, Redacted on Mar. 20, 2012, In the Matter of Certain Semiconductor Chips and Products Containing Same re Investigation No. 337-TA-753, dated Jun. 8, 2011 for ITC Action Rel. Barth/Dally Patents. 3 Pages.
Dally, William, U.S. Appl. No. 13/090,507, title Digital Transmitter, filed Apr. 20, 2011, Notice of Allowance and Fee(s) Due mailed Apr. 20, 2011. 13 pages.
Dally, William J., U.S. Appl. No. 13/091,382, title Digital Transmitter, filed Apr. 21, 2011, Notice of Allowance and Fee(s) Due dated Apr. 11, 2012. 53 Pages.
Complainant Rambus Inc.'s Petition for Review in the Matter of Certain Semiconductor Chips and Products Containing Same served Mar. 29, 2012, re ITC Inv. No. 337-TA-753. 116 pages.
Respondents' Contingent Petition for Review of the Initial Determination in the Matter of Certain Semiconductor Chips and Products Containing the Same served Mar. 29, 2012 re ITC Inv. No. 337-TA-753. 84 pages.
Summary of Complainant's Petition for Review in the Matter of Certain Semiconductor Chips and Products Containing Same served Mar. 29, 2012 re ITC Inv. No. 337-TA-753. 17 pages.
Combined Response of the Office of Unfair Import Investigations to the Private Parties' Petitions for Review of the Initial Determination on Violation of Section 337 served Apr. 16, 2012 re ITC Inv. No. 337-TA-753. 104 pages.
Response of Complainant Rambus Inc. to Petitions for Review of Respondents and the Staff in the Matter of Certain Semiconductor Chips and Products Containing Same served Apr. 13, 2012 re. ITC Inv. No. 337-TA-753. 87 pages.
Summary of Response of Complainant Rambus Inc. to Petitions for Review of Respondents and the Staff in the Matter of Certain Semiconductor Chips and Products Containing Same served Apr. 13, 2012 re ITC Inv. No. 337-TA-753. 17 pages.
Redacted Expert Report of Dr. Ali Hajimiri Regarding the Invalidity of US Patent Nos. in the Matter of Certain Semiconductor Chips and Products Containing Same dated Jul. 20, 2011 re ITC Inv. No. 337-TA-753. 412 pages.

Redacted Expert Report of Marwan Hassoun, Ph.D. Regarding Validity of U.S. Patent Nos. in the Matter of Certain Semiconductor Chips and Products Containing Same dated Jul. 20, 2011 re ITC Inv. No. 337-TA-753. 695 pages.
Redacted First Rebuttal Expert Report of Andrew C. Singer Ph.D. in the Matter of Certain Semiconductor Chips and Products Containing Same dated Aug. 2, 2011 re ITC Inv. No. 337-TA-753. 172 pages.
Redacted Second Rebuttal Expert Report of Andrew C. Singer Ph.D. in the Matter of Certain Semiconductor Chips and Products Containing Same served Aug. 3, 2011 re ITC Inv. No. 337-TA-753. 88 pages.
Redacted Direct Witness Statement of Dr. Ali Hajimiri in the Matter of Certain Semiconductor Chips and Products Containing Same dated Sep. 7, 2011 re ITC Inv. No. 337-TA-753. 298 pages.
Redacted Direct Witness Statement of Marwan Hassoun, Ph.D. in the Matter of Certain Semiconductor Chips and Products Containing Same submitted Sep. 7, 2011 re ITC Inv. No. 337-TA-753. 470 pages.
Redacted Rebuttal Witness Statement of Dr. Ali Hajimiri in the Matter of Certain Semiconductor Chips and Products Containing Same dated Sep. 21, 2011 re ITC Inv. No. 337-TA-753. 59 pages.
Redacted Corrected Rebuttal Witness Statement of Andrew C. Singer, Ph.D. in the Matter of Semiconductor Chips and Products Containing Same dated Oct. 19, 2011 re ITC Inv. No. 37-TA-753. 147 pages.
Redacted Respondents' Corrected Post-Trial Brief in the Matter of Certain Semiconductor Chips and Products Containing Same dated Jan. 6, 2012 (originally filed Nov. 8, 2011) re ITC Inv. No. 337-TA-753. 321 pages.
Redacted Respondents' Prehearing Statement and Brief in the Matter of Certain Semiconductor Chips and Products Containing the Same submitted Sep. 21, 2011 re ITC Inv. No. 337-TA-753. 475 pages.
Notice of Commission Determination Terminating the Investigation as to Three Respondents on the Basis of Settlement; Determination to Review in the Entirety a Final Initial Determination Finding No Violation of Section 337; Schedule for Filing Written Submissions or Certain Issues and on Remedy, the Public Interest and Bonding in the Matter of Certain Semiconductor Chips and Products Containing Same dated May 3, 2012 re ITC Inv. No. 337-TA-753. 6 pages.
Response of the Office of Unfair Import Investigations to the Notice of Commission Determination to Review in the Entirety a Final Determination Finding No Violation of Section 337, May 31, 2012, Public Version, In the Matter of "Certain Semiconductor Chips and Products Containing Same," Investigation No. 337-TA-753. 109 pages.
Respondents' Response to the Commission's Notice of Review, May 18, 2012, redacted, In the Matter of "Certain Semiconductor Chips and Products Containing the Same," Investigation No. 337-TA-753. 116 pages.
Complainant Rambus Inc.'s Submission on the Issues of Remedy, the Public Interest, and Bonding, dated May 18, 2012, Redacted, Includes Exhibit A (General Exclusion Order), B (Limited Exclusion Order), and Exhibit C (Orders to Cease and Desist), all dated Jun. 2012, In the Matter of "Certain Semiconductor Chips and Products Containing Same," Investigation No. 337-TA-753. 67 pages.
Respondents' Reply to Petition of Complainant Rambus Inc. and Contingent Petition of the Office of Unfair Import Investigations, Mar. 27, 2012, Redacted, In the Matter of "Certain Semiconductor Chips and Products Containing the Same," Investigation No. 337-TA-753. 112 pages.
Summary of Respondents' Reply to Petition of Complainant Rambus Inc. and Contingent Petition of the Office of Unfair Import Investigations, Mar. 27, 2012, Redacted, In the Matter of "Certain Semiconductor Chips and Products Containing the Same," Investigation No. 337-TA-753. 15 pages.
Contingent Petition of the Office of Unfair Import Investigations for Review of the Initial Determination on Violation of Section 337, Mar. 19, 2012, Redacted, In the Matter of "Certain Semiconductor Chips and Products Containing Same," Investigation No. 337-TA-753. 17 pages.
Complainant Rambus Inc.'s Response to the Commission's Notice to Review in the Entirety a Final Initial Determination Finding No Violation of Section 337, May 18, 2012, Redacted, In the Matter of "Certain Semiconductor Chips and Products Containing Same," Investigation No. 337-TA-753. 115 pages.

(56) References Cited

OTHER PUBLICATIONS

National Semiconductor Product Folder, "CLC014, Adaptive Cable Equalizer for High Speed Data Recovery," Feb. 26, 1997, pp. 1-3.

National Semiconductor Product Folder, "Com linear CLC014, Adaptive Cable Equalizer for High-speed Data Recover," Aug. 1996, pp. 1-12.

De Man, Hugo J. et al., "High-speed NMOS Circuits for ROM-Accumulator and Multiplier Type Digital Filters," IEEE Journal of Solid-State Circuits, vol. SC-13, No. 5, Oct. 1978, pp. 565-572.

Fiedler, Alan et al., "PF 15:1: A 1.0625Gbps Transceiver with 2X-Oversampling and Transmit Signal Pre-Emphasis," IEEE International Solid-State Circuits Conference, Feb. 7, 1997, pp. 238-239.

Schroder, Hartmut, "High Word-Rate Digital Filters with Programmable Table Look-Up," IEEE Transactions on Circuits and Systems, May 1997, pp. 277-279.

Dally, William J. et al., "Transmitter Equalization for 4-Gbps Signaling," IEEE Micro, vol. 17, No. 1, Jan.-Feb. 1997, pp. 48-56.

Holte, et al., "A New Digital Echo Canceler for Two-Wire Subscriber Lines," IEEE Transactions on Communications, vol. COM-29, No. 11, pp. 1573-1581 (Nov. 1981).

Forney, et al., "Combined Equalization and Coding Using Preceding," IEEE Communications Magazine, pp. 25-34 (Dec. 1991).

Kobayashi, "Coding Schemes for Reduction of Intersymbol Interface in Data Transmission Systems," IBM J. Res. Develop., Reduction of Intersymbol Interference, pp. 343-353 (Jul. 1970).

Vanderaar, et al., "Transmit Pulse Shaping Filters and Cordic Algorithm Based Precompensation for Digital Satellite Communications," IEEE, pp. 1219-1222, (1997).

Fielder, et al., "A 1.0625Gbps Transceiver with 2x-Oversampling and Transmit Signal Pre-Emphasis," 1997 IEEE International Solid-State Circuits Conference, Session 15, pp. 238-239, 464 (Feb. 7, 1997).

Ginzburg, et al., "FDDI over Unshielded Twisted Pairs," IEEE, pp. 395-398 (1990).

Shih, et al., "10 Mb-s Twisted Pair CMOS Transceiver with Transmit Waveform Pre-Equalization," IEEE 1991 Custom Integrated Circuits Conference, pp. 7.3.1-7.3.4 (1991).

Dally, William J., et al., "Transmitter Equalization for 4Gb-s Signaling," Hot Interconnects IV, 10 pgs. (1996).

Komizo, et al., "A 7 GHz FM Transmitter Utilizing GaAs Power MESFETS," IEEE; vol. 77, issue 1, pp. 243-245 (Jun. 1977).

Wang, et al., "A Monolithic Ka-Band 0.25-IJ.m GaAs MESFET Transmitter for High Volume Production," IEEE Journal of Solid-State Circuits; vol. 27, No. 10, pp. 1397-1404 (Oct. 1992).

Raffaelli, et al., "A Low Cost 77 GHz Monolithic Transmitter for Automotive Collision Avoidance Systems," IEEE Microwave and Millimeter-Wave Monolithic Circuits Symposium; pp. 63-66 (Jun. 14-15, 1993).

"Notice of Commission Determination Terminating the Investigation With a Finding of No Violation of Section 337," issued Jul. 25, 2012 re ITC Investigation No. 337-TA-753, 3 pages.

"Commission Opinion," issued Aug. 17, 2012 in the Matter of Certain Semiconductor Chips and Products Containing Same, ITC Investigation No. 337-TA-753, 69 pages.

\* cited by examiner

DIGITAL TRANSMITTER

RELATED APPLICATIONS

This application is a continuation of U.S. application Ser. No. 13/914,350, filed Jun. 10, 2013, now issued as U.S. Pat. No. 8,761,235 on Jun. 24, 2014, which is a continuation of Ser. No. 12/942,607, filed Nov. 9, 2010, now issued as U.S. Pat. No. 8,681,837 on Mar. 25, 2014, which is a continuation of U.S. application Ser. No. 12/571,582, filed Oct. 1, 2009, now U.S. Pat. No. 8,243,847, which is a continuation of application Ser. No. 11/514,735, filed Aug. 31, 2006, now U.S. Pat. No. 8,254,491, which is a continuation of application Ser. No. 11/483,971, filed Jul. 10, 2006, now abandoned, which is a continuation of application Ser. No. 10/372,630, filed on Feb. 24, 2003, now U.S. Pat. No. 7,099,404, which is a continuation of application Ser. No. 09/852,481, filed on May 10, 2001, now U.S. Pat. No. 6,542,555, which is a continuation of Ser. No. 08/882,252, filed on Jun. 25, 1997, now U.S. Pat. No. 6,266,379, which is a continuation-in-part of Ser. No. 08/880,980, filed on Jun. 23, 1997, now abandoned, which claims the benefit of U.S. Provisional Application No. 60/050,098, filed on Jun. 20, 1997. The entire teachings of the above applications are incorporated herein by reference.

GOVERNMENT SUPPORT

This invention was made with government support, under Contract No. F19628-92-C-0045 awarded by the U.S. Air Force Systems. The Government has certain rights in the invention.

BACKGROUND OF THE INVENTION

The performance of many digital systems is limited by the interconnection bandwidth between chips, boards, and cabinets. As VLSI technology continues to scale, system bandwidth will become an even more significant bottleneck as the number of I/Os scales more slowly than the bandwidth demands of on-chip logic. Also, off-chip signaling rates have historically scaled more slowly than on-chip clock rates. Most digital systems today use full-swing unterminated signaling methods that are unsuited for data rates over 100 MHz on one meter wires. Even good current-mode signaling methods with matched terminations and carefully controlled line and connector impedance are limited to about 1 GHz by the frequency-dependent attenuation of copper lines. Without new approaches to high-speed signaling, bandwidth will stop scaling with technology when we reach these limits.

SUMMARY OF THE INVENTION

Conventional approaches to dealing with frequency dependent attenuation on transmission lines have been based on equalization, either in the transmitter or the receiver. For example, Tomlinson precoding is used in modems, and digital equalization in binary communication channels has been suggested in U.S. Pat. No. 4,374,426 to Burlage et al. However, such systems cannot scale to very high data rate binary or multilevel systems having bandwidths extending from near DC to greater than 100 MHz. Above 100 MHz, there is substantial attenuation due to skin effect resistance on conventional transmission lines.

The present invention enables equalizers which can be implemented as digital filters operating at acceptable clock speeds. For example, a three gigabit per second (Gbps) system can be implemented using 400 Mbps circuitry. The invention has particular application to nonmodulated, high data rate, binary or multilevel systems as found locally within a data processor cabinet or on a local area network.

In accordance with the present invention, a digital transmitter comprises an equalizer which emphasizes transition signal levels relative to repeated signal levels. In particular, a novel equalizer generates signal levels as a logical function of bit history to emphasize transition signal levels. Preferred implementations define the logical function of bit history in a look up table.

In preferred embodiments, the equalizer converts an input signal, having discrete signal levels at an input data rate, to an output signal having a greater number of discrete signal levels at the input data rate. In particular, the equalizer generates transmitted signal levels based on time since last signal transition. A particularly simple implementation is based on whether a current bit is equal to an immediately previous bit.

The clock rates of circuitry can be reduced by multiplexing outputs of parallel logic circuits operating on different multiple bit inputs to generate the signal levels. In an adaptive system, the level of equalization in the transmitter can be modified as a function of signals detected at the receiver.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The density and speed of modern VLSI technology can be applied to overcome the I/O bottleneck they have created by building sophisticated I/O circuitry that compensates for the characteristics of the physical interconnect and cancels dominant sources of timing and voltage noise. Such optimized I/O circuitry is capable of achieving I/O rates an order of magnitude higher than those commonly used today while operating at lower power levels.

A system embodying the invention can achieve a four Gbps signaling rate using 0.5 μm CMOS circuits by controlling and compensating for characteristics of the transmission medium, by cancelling timing skew, and through careful management of time and voltage noise.

Figure 1:
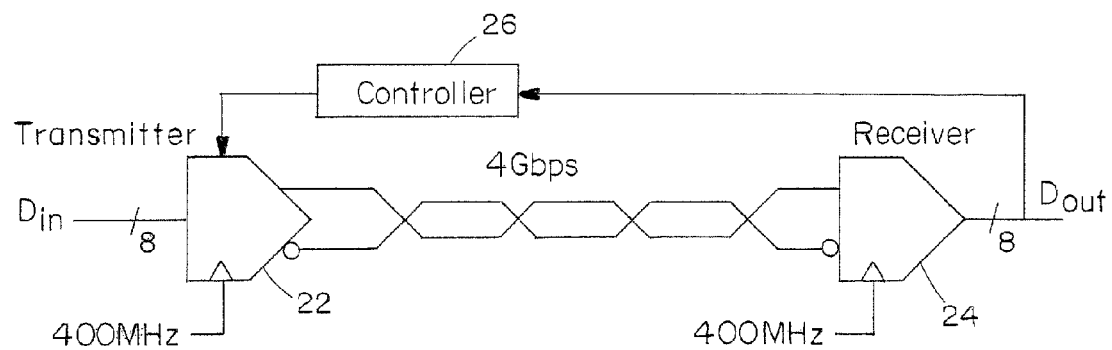
FIG. 1 illustrates a digital communication system embodying in the present invention.
Figure 13:
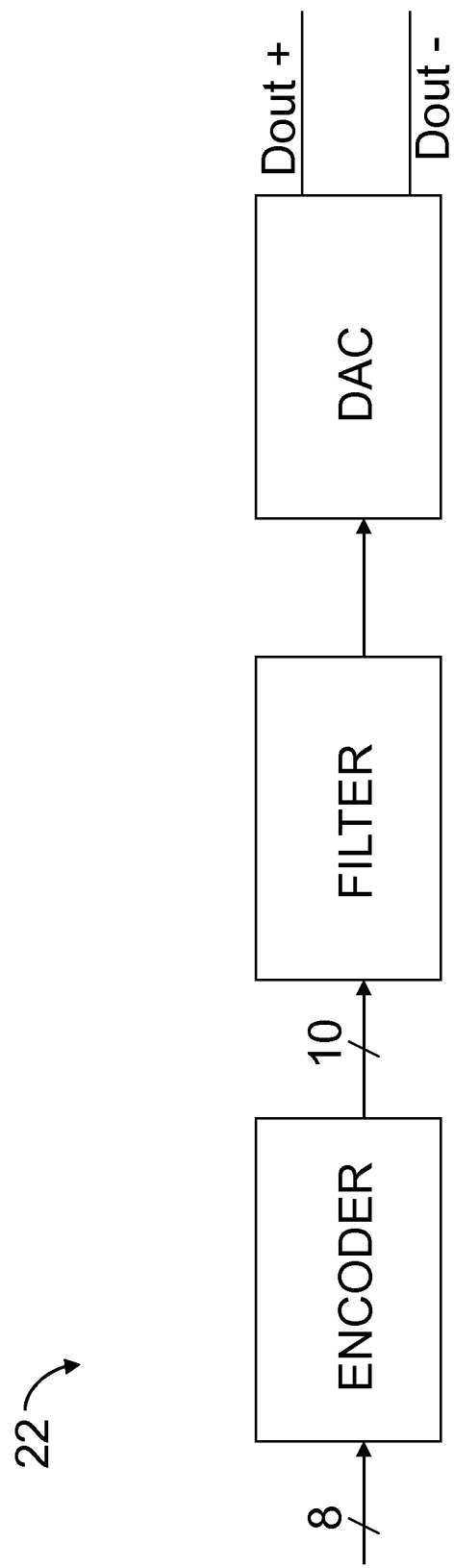
FIG. 13 illustrates a transmitter having an encoder, equalizing filter, and driving DAC.

FIG. 1 shows one channel of high-speed signaling system embodying the invention. A transmitter module 22 accepts 8-bit parallel data at 400 MHz. Each byte is coded into 10 bits (FIG. 13) for band-limiting and forward error correction and transmitted up to 3 m across a single differential transmission line. The transmitter pre-emphasizes the signal to compensate for expected line characteristics. The lossy transmission line as well as package and connector parasitics attenuate and distort the received waveform, and it is further corrupted by noise coupled from adjacent lines and the power supply. The receiver 24 accepts this noisy, distorted signal and its own 400 MHz clock. The receiver generates 4 GHz timing signals aligned to the received data, samples the noisy signal, decodes the signal, and produces synchronous 8-bit data out. The transmit and receive modules may be packaged in a standard-cell library so they can be used by average CMOS designers without special skills.

The availability of 4 Gbps electrical signaling will enable the design of low-cost, high-bandwidth digital systems. The wide, slow buses around which many contemporary digital systems are organized can be replaced by point-to-point networks using a single, or at most a few, high-speed serial channels resulting in significant reduction in chip and module pinouts and in power dissipation. A network based on 400 MBytes/s serial channels, for example, has several times the bandwidth of a 133 MBytes/s PCI-bus that requires about 80 lines. Also, depending on its topology, the network permits several simultaneous transfers to take place at full rate. A group of eight parallel channels would provide sufficient data bandwidth (3.2 GBytes/s) for the CPU to memory connection of today's fastest processors. For modest distances (up to 30 m with 18 AWG wire), high-speed electrical signaling is an attractive alternative to optical communication in terms of cost, power, and board area for peripheral connection and building-sized local-area networks.

Frequency-Dependent Attenuation Causes Intersymbol Interference

Skin-effect resistance causes the attenuation of a conventional transmission line to increase with frequency. With a broadband signal, as typically used in digital systems, the superposition of unattenuated low-frequency signal components with attenuated high-frequency signal components causes intersymbol interference that degrades noise margins and reduces the maximum frequency at which the system can operate.

Figure 2A:
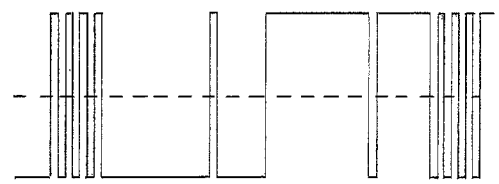
FIGS. 2A and 2B illustrate a sample binary pulse train and the resultant frequency dependent attenuation caused by a transmission line.
Figure 2B:
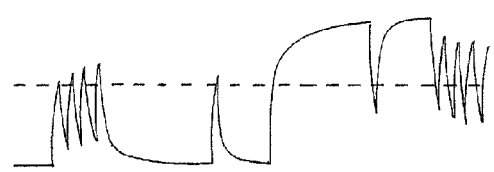
Figure 3A:
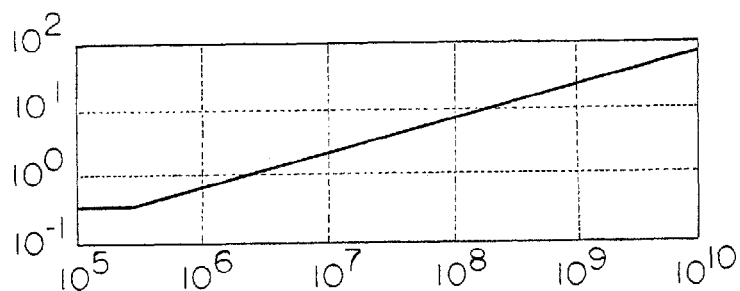
FIGS. 3A and 3B illustrate the resistance and attenuation curves for one meter of 30 AWG, 100 ohm twisted pair transmission line.
Figure 3B:
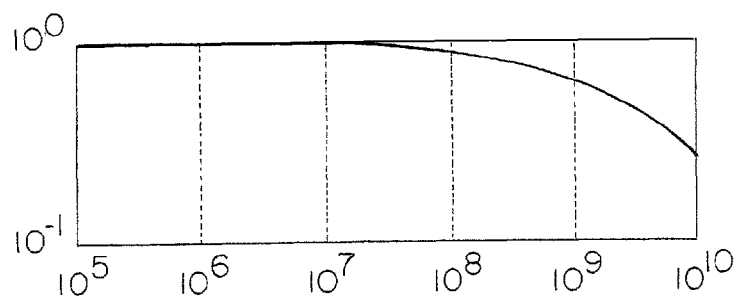
Figure 3C:
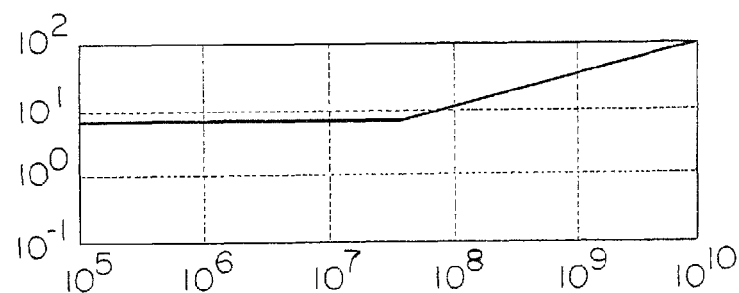
FIGS. 3C and 3D illustrate the resistance and attenuation curves for one meter of 5 mil 0.5 oz 50 ohm strip guide.
Figure 3D:
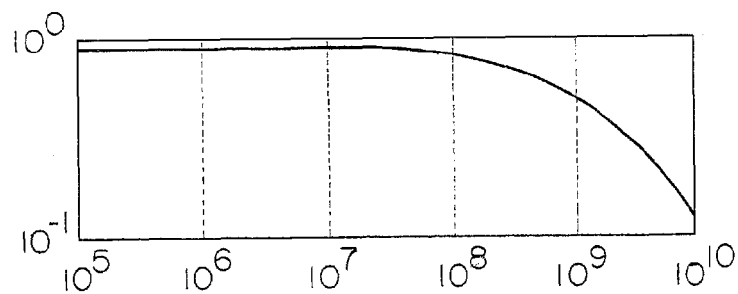

This effect is most pronounced in the case of a single 1 (0) in a field of 0s (1s) as illustrated in FIGS. 2A and B. The figures show a 4 Gb/s signal (FIG. 2A) and the simulated result of passing this signal across 3 m of 24 AWG twisted pair (FIG. 2B). The highest frequency of interest (2 GHz) is attenuated by −7.6 dB (42%). The unattenuated low-frequency component of the signal causes the isolated high-frequency pulse to barely reach the midpoint of the signal swing giving no eye opening in a differential system and very little probability of correct detection.

The problem here is not the magnitude of the attenuation, but rather the interference caused by the frequency-dependent nature of the attenuation. The high-frequency pulse has sufficient amplitude at the receiver for proper detection. It is the offset of the pulse from the receiver threshold by low-frequency interference that causes the problem. Later, we will see how using a transmitter equalizer to preemphasize the high-frequency components of the signal eliminates this problem. However, first we will characterize the nature of this attenuation in more detail.

FIGS. 3A-D show the resistance per meter and the attenuation per meter as a function of frequency for a 30 AWG (d=128 mm) twisted pair with a differential impedance of 100 ohms (FIGS. 3A and 3B) and for a 5 mil (d=125 mm) half-ounce (0.7 mil thick) 50 ohms (FIGS. 3C and 3D) stripguide. For the 30 AWG pair, the skin effect begins increasing resistance at 267 KHz and results in an attenuation to 56% of the original magnitude (−5 dB) per meter of cable at our operating frequency of 2 GHz corresponding to a bit rate of 4 Gb/s. Skin effect does not begin to effect the 5 mil PC trace until 43 MHz because of its thin vertical dimension. The high DC resistance (6.8 ohms/m) of this line gives it a DC attenuation of 88% (−1.2 dB). Above 70 MHz the attenuation rolls off rapidly reaching 40% (−8 dB) at 2 GHz. The important parameter, however, is the difference between the DC and high-frequency attenuation which is 45% (−6.8 dB).

Figure 4A:
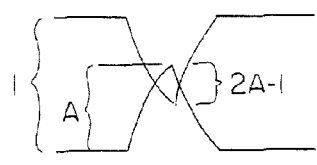
FIG. 4A illustrates respective plus and minus signals in a differential system and the reduced data eye due to attenuation.
Figure 4B:
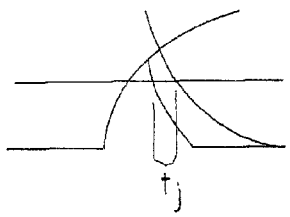
FIG. 4B illustrates trailing edge jitter.
Figure 4C:
FIG. 4C illustrates the data eye with equalization.

The effect of frequency dependent attenuation is graphically illustrated in the eye-diagrams of FIG. 4A-C. As shown in the waveform in FIG. 4A, without equalization, a high-frequency attenuation factor of A reduces the height of the eye opening to 2A-1 with the eye completely disappearing at A≤0.5. This height is the amount of effective signal swing available to tolerate other noise sources such as receiver offset, receiver sensitivity, crosstalk, reflections of previous bits, and coupled supply noise. Because the waveforms cross the receiver threshold offset from the center of the signal swing, the width of the eye is also reduced. As illustrated in FIG. 4B, the leading edge of the attenuated pulse crosses the threshold at the normal time. The trailing edge, however, is advanced by $t_j$. This data-dependent jitter causes greater sensitivity to skew and jitter in the signal or sampling clock and may introduce noise into the timing loop.

The waveform of FIG. 4C illustrates the situation when we equalize the signal by attenuating the DC and low frequency components so all components are attenuated by a factor of A. Here the height of the eye opening is A, considerably larger than 2A-1, especially for large attenuations. Also, because the waveforms cross at the midpoint of their swing, the width of the eye is a full bit-cell giving better tolerance of timing skew and jitter.

Preemphasizing Signal Transitions Equalizes Line Attenuation

Equalization eliminates the problem of frequency-dependent attenuation by filtering the transmitted or received waveform so the concatenation of the equalizing filter and the transmission line gives a flat frequency response. With equalization, an isolated 1 (0) in a field of 0s (1s) crosses the receiver threshold at the midpoint of its swing, as shown in FIG. 4C, rather than being offset by an unattenuated DC component, as shown in FIG. 4A. Narrow-band voice, video, and data modems have long used equalization to compensate for the linear portion of the line characteristics (Lee, Edward A., and Messerschmitt, David G., Digital Communication, Second Edition, Kluwer, 1994). However, it has not been used to date in broadband signaling with a wide bandwidth (i.e., greater than 100 MHz) over short distances.

We equalize the line using a 4 GHz FIR filter built into the current-mode transmitter. The arrangement is similar to the use of Tomlinson precoding in a narrowband modem (Tomlinson, M., "New Automatic Equalizer Employing Modulo Arithmetic," Electronic Letters, March 1971). In a high-speed digital system it is much simpler to equalize at the transmitter than at the receiver, as is more commonly done in communication systems. Equalizing at the transmitter allows us to use a simple receiver that just samples a binary value at 4 GHz. Equalizing at the receiver would require an A/D of at least a few bits resolution or a high-speed analog delay line, both difficult circuit design problems. A discrete-time FIR equalizer is preferable to a continuous-time passive or active filter as it is more easily realized in a standard CMOS process.

Figure 5A:
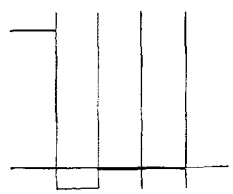
FIGS. 5A and 5B illustrate impulse response and frequency response of an equalizing filter embodying the invention.
Figure 5C:
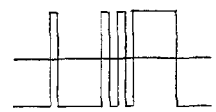
FIGS. 5C and 5D illustrate an example input sequence and output sequence from the equalizer.
Figure 5B:
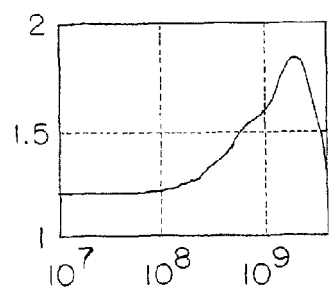

After much experimentation we have selected a five-tap FIR filter that operates at the bit rate. The weights are trained to match the filter to the frequency response of the line as described below. For a 1 m 30 AWG line, the impulse response is shown in FIG. 5A. Each vertical line delimits a time interval of one bit-cell or 250 ps. The filter has a high-pass response as shown in FIG. 5B.

Figure 6A:
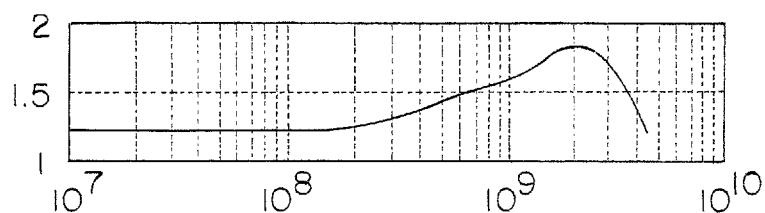
FIG. 6A illustrates the frequency response of an equalization filter embodying the invention.
Figure 6B:
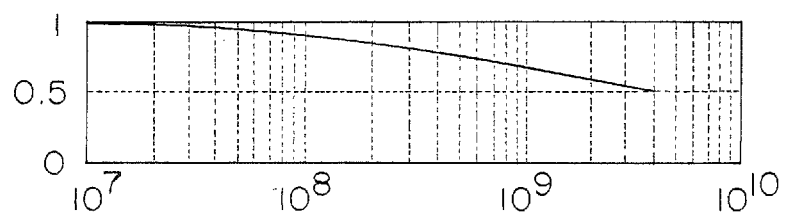
FIG. 6B illustrates transmission line attenuation.
Figure 6C:
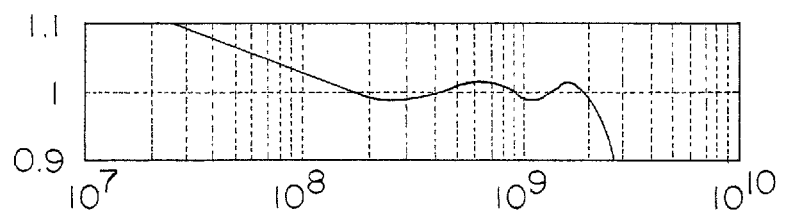
FIG. 6C illustrates the combination of equalization and line attenuation.

As shown in FIGS. 6A-C, this filter cancels the low-pass attenuation of the line giving a fairly flat response over the frequency band of interest (the decade from 200 MHz to 2 GHz). We band-limit the transmitted signal via coding (FIG. 13) to eliminate frequencies below 200 MHz. The equalization band is limited by the length of the filter. Adding taps to the filter would widen the band. We have selected five taps as a compromise between bandwidth and cost of equalization.

Figure 5D:
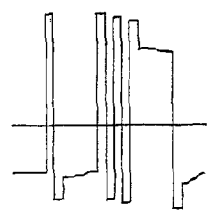

FIG. 6A shows the frequency response of the filter, FIG. 6B shows the frequency response of the line and FIG. 6C shows the combination (the product) for 1 m of 30 AWG cable. The scale on FIG. 6C is compressed to exaggerate the effect. The filter cancels the response of parasitics as well as the response of the line. The response is flat to within 5% across the band of interest. The filter results in all transitions being full-swing, while attenuating repeated bits. FIG. 5D shows the response of the filter to an example data sequence shown in FIG. 5C (00001000001010111110000). The example shows that each signal transition goes full swing with the current stepped down to an attenuated level for repeated strings of 1s (0s).

Figure 7A:
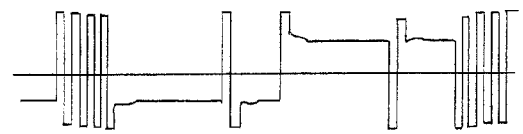
FIG. 7A illustrates an equalized transmitter signal based on the input signal of FIG. 2A.
Figure 7B:
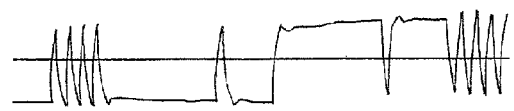
FIG. 7B illustrates the signal at the receiver resulting from the signal of FIG. 7A to be compared to FIG. 2B without equalization.

FIGS. 7A and B illustrate the application of equalization to the example of FIGS. 2A and 2B. FIG. 7A shows the filtered version of the original signal and FIG. 7B the received waveform. With equalization the isolated pulses and high-frequency segments of the signal are centered on the receiver threshold and have adequate eye openings for detection.

Circuit Implementations

Figure 8:
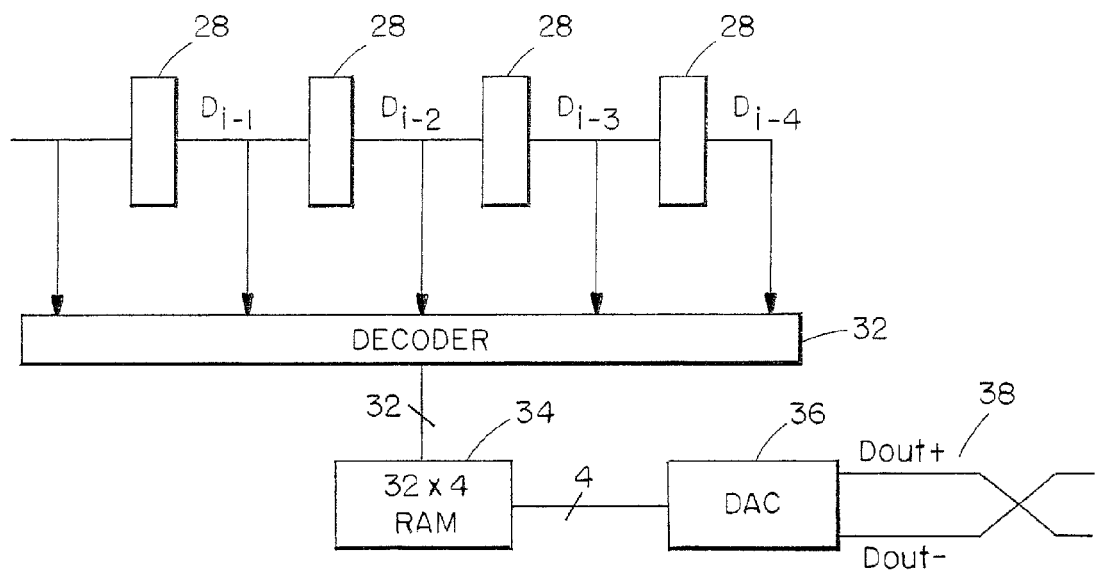
FIG. 8 illustrates one embodiment of an equalizer of the present invention including an FIR filter and digital-to-analog converter.

Preferred implementations of the invention include finite input response (FIR) filters, and FIG. 8 illustrates one such implementation. In this case, a 5 tap filter has been selected as a balance between higher fractional bandwidth and circuit complexity. With a greater number of taps, equalization can be obtained at lower frequencies. The present design provides for equalization in a range of 100 MHz to 2 GHz. By reducing to 2 or 3 taps, the lower end of the range may be no less than 500 MHz.

As in a conventional FIR filter, the input $D_i$ is delayed in successive delay elements 28. However, rather than weighting the individual delayed signals and summing the weighted signals to obtain the desired output, the delayed signals are applied to a 5-to-32 decoder 32.

One of the 32 output bits from the decoder 32 is high with any input state and that high bit addresses a 4 bit word from the 32×4 random access memory 34. The memory 34 is shown to be random access in order to allow for reprogramming of the equalization using a training process below. However, the system may be a fixed design which can be implemented using a read only memory.

Figure 9:
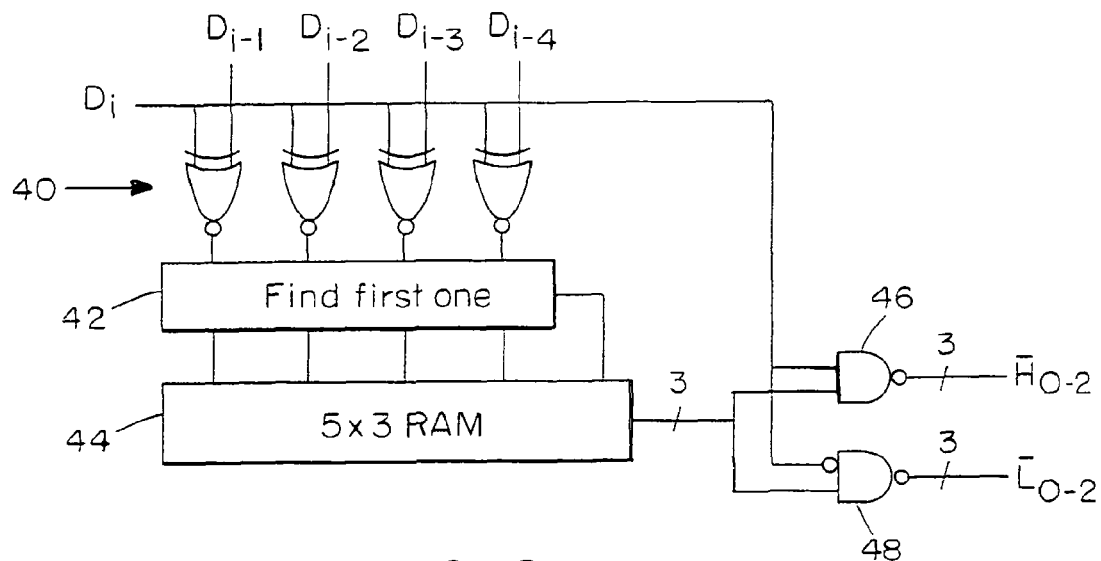
FIG. 9 illustrates a transition filter for use in a preferred embodiment of the invention.

The 4 bit output from RAM 34 defines one of the 15 output levels generated by a digital-to-analog converter 36 and applied to the transmission line 38. Those levels include 0, seven positive levels where Dout− is pulled low, and seven negative levels where Dout+ is pulled low. To simplify the implementation, each FIR filter is approximated by a transition filter implemented with a look-up table as illustrated in FIG. 9. The transition filter compares, in logic elements 40, the current data bit $D_i$ to each of the last four bits, and uses a find-first-one unit 42 to determine the number of bits since the last signal transition. The result is used to look up a 3-bit drive strength for the current bit from a 15-bit serially-loaded RAM 44. The drive strength is multiplied by the current bit with two sets of three NAND gates 46, 48 to generate three-bit high and low drive signals for the DAC.

While the transition filter is a non-linear element, it closely approximates the response of an FIR filter for the impulse functions needed to equalize typical transmission lines. Making this approximation greatly reduces the size and delay of the filter as a 96-bit RAM would be required to implement a full 5-tap FIR filter via a lookup table and the gates 46 and 48.

Figure 10:
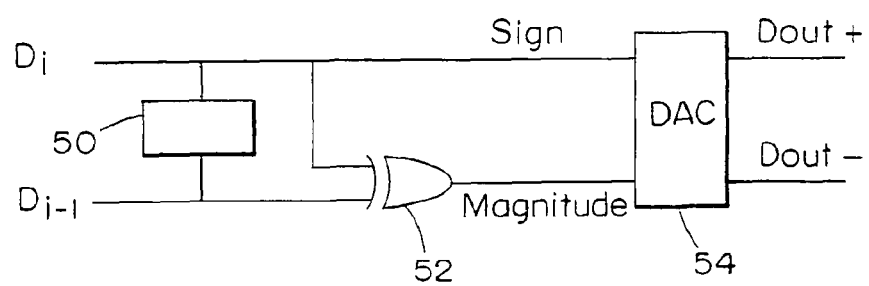
FIG. 10 illustrates a two tap transition filter embodying the invention.

The transition filter can be simplified even further to the simple logic circuit of FIG. 10 which operates as a two tap filter. The input signal $D_i$ is delayed in a single delay element 50 to produce the signal $D_{i-1}$. The two signals are combined in an exclusive-OR gate 52 to determine whether the current bit is equal to the immediately previous bit. If so, the lower magnitude output is generated by the digital-to-analog converter 54. If, on the other hand, there has been a transition since the previous bit, the output is emphasized. Thus, this simple circuit provides four output levels, two positive and two negative.

In yet another two-tap embodiment, with a transition, full current drive is used in opposite directions on both sides of the transition. When the signal value remains unchanged, an attenuated current drive is used.

Figure 11A:
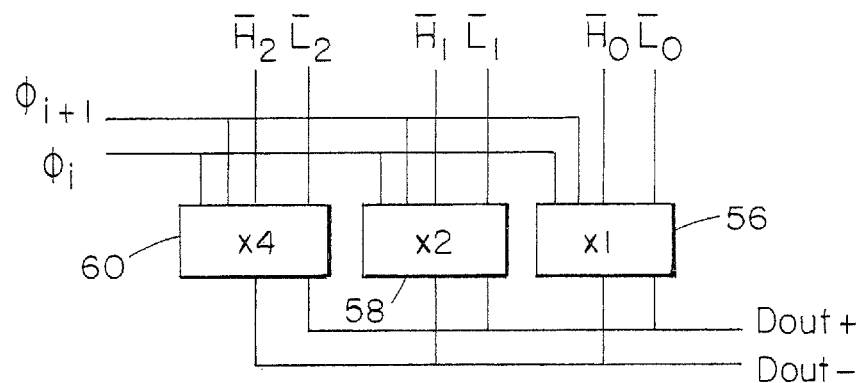
FIGS. 11A and 11B illustrate a digital to analog converter for use in the present invention.

The circuit design of the DAC used in the FIG. 9 embodiment is shown in FIGS. 11A and B. As shown in FIG. 11A, each DAC module is composed of three progressively sized differential pulse generators 56, 58 and 60. Each generator is enabled to produce a current pulse on Dout+ (Dout_) if the corresponding H (L) line is low. If neither line is low no pulse is produced. Depending on the current bit and the three-bit value read from the RAM 44 in the filter module, 15 different current values are possible (nominally from −8.75 mA to +8.75 mA in 1.25 mA steps). The timing of the pulse is controlled by a pair of clocks. A low-going on-clock $\Phi_i$ gates the pulse on its falling edge. The high-true off clock $\Phi_{i+1}$ gates the pulse off 250 ps later.

Figure 11B:
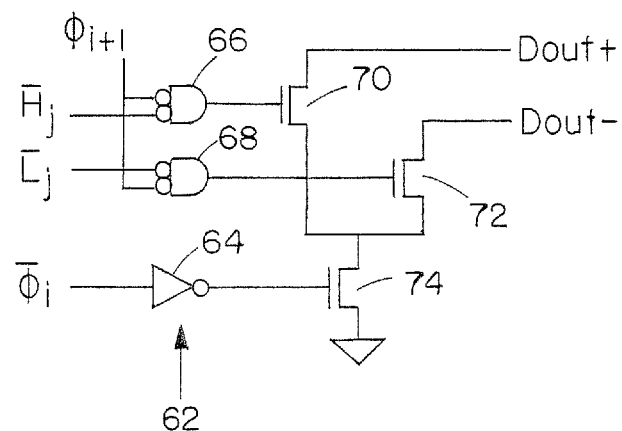

Each of the three differential pulse generators is implemented as shown in FIG. 11B. A pre-drive stage 62 inverts the on-clock in inverter 64 and qualifies the off-clock with the enable signals in NOR gates 66 and 68. A low (true) enable signal, which must be stable while the off-clock is low, turns on one of the two output transistors 70, 72, priming the circuit for the arrival of the on-clock. When the on-clock falls, the common tail transistor 74 is turned on, starting the current pulse. When the off-clock rises, the selected output transistor terminates the current pulse. The delay of the qualifying NOR-gate is carefully matched against that of the on-clock inverter to avoid distorting the pulse width.

To enable operation of the equalization circuit at rates in the order of gigahertz while using circuitry operating only in the order of hundreds of megahertz, the preferred embodiment generates the signal levels by multiplexing outputs of parallel logic circuits operating on different multiple bit inputs.

Figure 12:
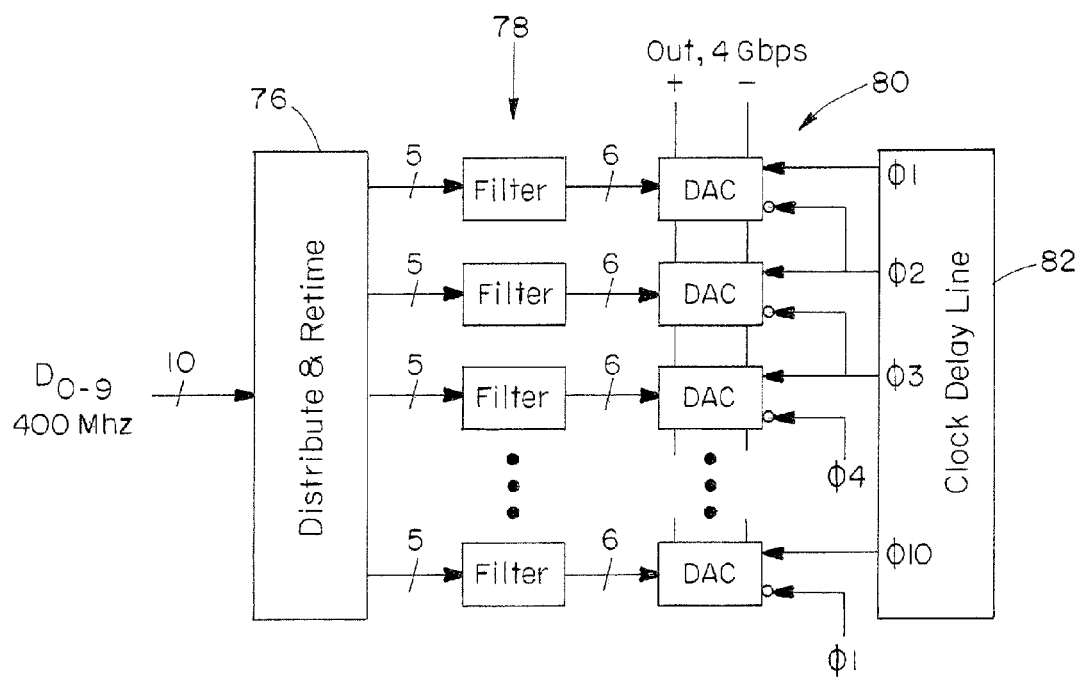
FIG. 12 illustrates a preferred multiplexed embodiment of the invention.

A block diagram of the multiplexed transmitter is shown in FIG. 12. The transmitter accepts 10 bits of data, $D_{0-9}$, at 400 MHz. A distribution block 76 delivers 5 bits of data to each of 10 FIR filters 78 of filter/DAC transmitters. The ith filter receives bit $D_i$ and the four previous bits. For the first four filters this involves delaying bits from the previous clock cycle. The distribution also retimes the filter inputs to the clock domain of the filter. Each filter 78 is a 5-tap transition filter that produces a 4-bit output encoded as 3 bits of positive drive and 3 bits of negative drive. These six bits from the filter directly select which of six pulse generators in the DAC 80 connected to that filter are enabled. The enabled pulse generators are sequenced by the 10-phase clock 82, multiplexing their outputs to Out at 4 Gbps. The ith pulse generator is gated on by $\Phi_i$ and gated off by $\Phi_{i+1}$. To meet the timing requirements of the pulse generator, the ith filter operates off of clock $\Phi_{i+1}$.

A training sequence may be used to initialize the transmitter pre-emphasis filter at powerup. Training is performed under the control of a supervisory processor controller 26 that interfaces with the transmitter on one end of the line and the receiver on the other end via a low-speed serial scan chain. A preliminary version of a training sequence for one channel is as follows:

1. The frequency response of the line is measured. The transmitter is commanded to turn off precompensation and send an alternating sequence of 1s and 0s, representing a first bit rate (effective frequency of data transition). The receiver measures the level of the received signal by using a feedback transmitter to shift the DC operating point of the sense-amplifiers. The process is repeated at other bit rates (frequencies) to trace out the attenuation curve. For example, bit rates of $R_{max}$, $R_{max}/2$, $R_{max}/3$ . . . may be tested.

2. Based on the attenuation measurements taken in (1), the transmitter equalization is set by programming the FIR filter and/or DAC.

Alternative Transition Coding

Figure 15:
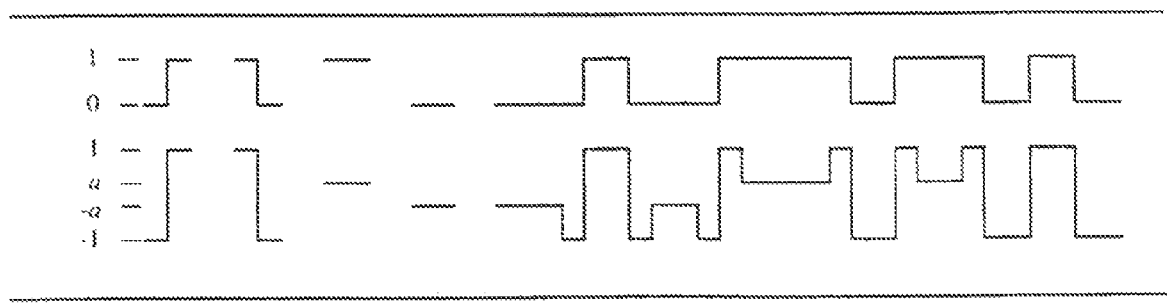
FIG. 15 illustrates an alternative embodiment of the invention.

An alternative transition coding scheme is illustrated in FIG. 15. The method examines each pair of adjacent bits to select one of four current values (−1 m, −a, a, 1) to drive the line during each of the two half-bit periods on the boundary of the bit pair. The left part of the figure shows the four possible values for the bit-pairs on the top row and the corresponding codings on the bottom row. On a transition, full current drive is used, in opposite directions, on both sides of the transition. When the signal value remains unchanged, an attenuated current drive (a) is used. The right side of the figure shows the bit stream 00100111011010 on the top row and the coding of this bit stream on the bottom row. This transition coding method is in effect a 4-tap FIR filter (with weights (a−1)/2 and (a+1)/2 for the outer and inner taps respectively) operating at twice the bit rate.

Transmitter Design

Figure 16:
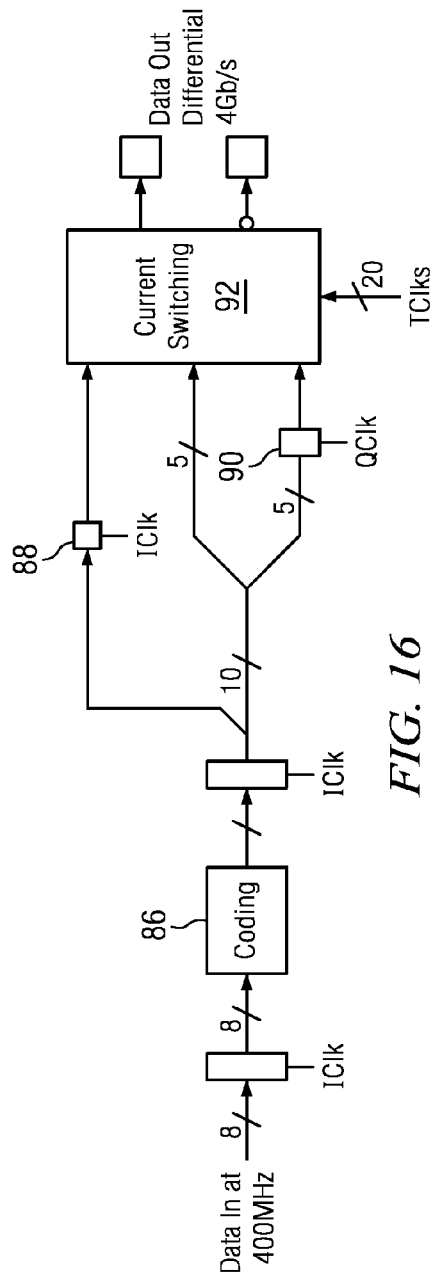
FIG. 16 is a block diagram of a transmitter for the coding scheme of FIG. 15.

A block diagram of a 4 Gb/s transmitter with transition coding is shown in FIG. 16. Except for the current switching network (described below), the entire transmitter operates at 400 MHz. Byte-wide input data arrives at 400 MS/s and is clocked into a double-edge triggered flip-flop by both edges of a 200 MHz clock, IClk. The data is coded at 86 giving 10-bits of data to be transmitted. The input data is coded to band-limit it to perform forward error correction and detection, and to provide a reverse channel for backward error correction. The most significant bit of this data is delayed by an additional IClk flip-flop 88 for use in transition coding the next byte of input data. The low 5-bits of the data are resampled at 90 by QClk, which is in quadrature to IClk to make them stable in the period about the edge of IClk. The current switching network 92 accepts 11 bits of data (5 directly, 5 in quadrature, and 1 delayed by a cycle) and 20 400 MHz clocks which are separated by 125 ps in phase. As described below, this network transition codes the data and uses the 20 clocks to sequence this data onto the differential output by steering a pair of current sources.

Figure 17:
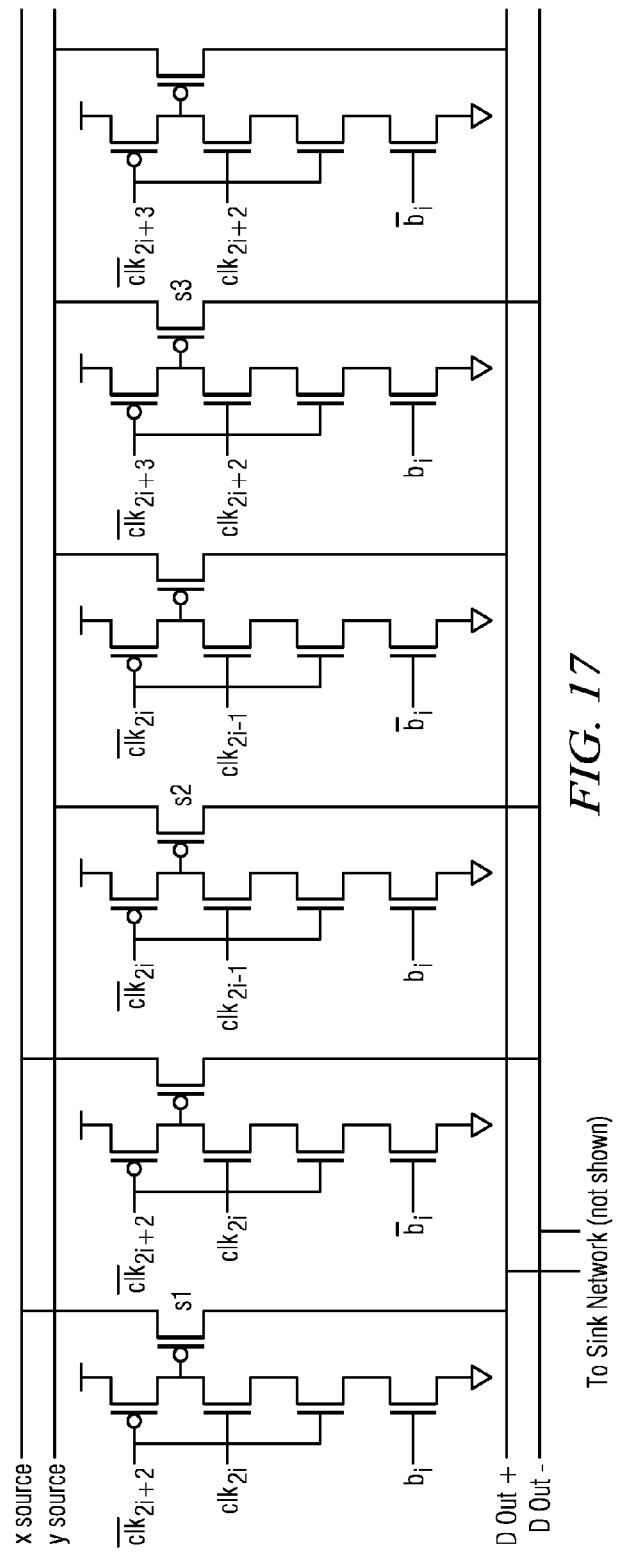
FIG. 17 is one of ten transition coding and current steering networks in the current switching network of FIG. 16.

The source half of one bit of the transition coding network is shown in FIG. 17. The circuit steers current between the two sources, x and y at the top, and the differential current-mode, at the bottom. The two current sources are used to give the four current levels required for transition pre-emphasis. Source x has magnitude $I_o(1+a)/2$, while y has magnitude $I_o(1−a)/2$. The attenuation factor, a, is programmed by switching a set of current sources totaling $I_o$ between x and y. A mirror-imaged sink network (not shown) steers x and y current sinks to the output lines in a complementary manner.

The circuit consists of three pairs of sections (six total). Each section is a PFET current switch controlled by a three-input dynamic NAND gate. Each pair switches one of the current sources to either the positive or negative output (depending on the state of the data input b) during the time between the rising edges of an on-clock and an off-clock. For example, the first pair implements the middle two taps of the transition coding FIR filter. For the two clock phases corresponding to bit i, $clk_{2i}$ and $clk_{2i+1}$, this pair steers source x to the output. When $clk_{2i}$ goes high, one of the two PFET switches in this pair is turned on, steering current to DOut+ if $b_i=1$ or DOut− if $b_i=0$. When $clk_{2i+2}$ goes high two phases later, the switch is turned off and the portion of the network associated with $b_{i+1}$ takes over source x. In a similar manner, the second pair steers source y during the clock phase (half-bit period) before bit i, and the third pair switches source y during the phase after bit i. The current waveforms from the bit controlling source x and the bit controlling source y are superimposed on the output to give the final coded waveform.

Figure 18:
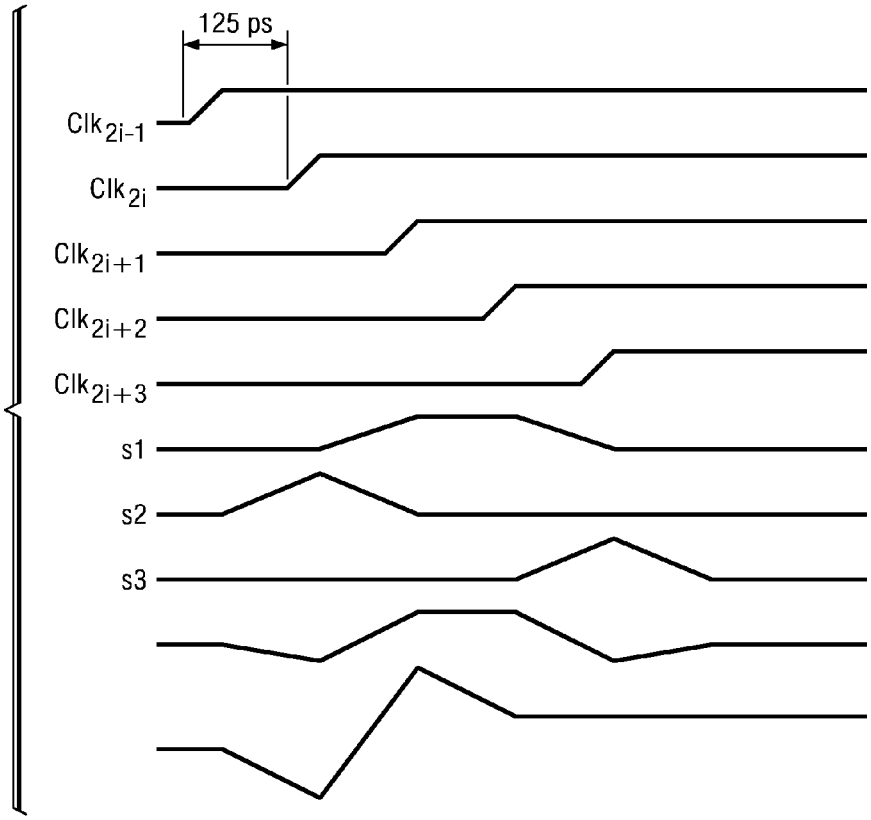
FIG. 18 is a set of waveforms for transition coding and the current steering network.

FIG. 18 shows the waveforms for this circuit. The top five traces show the five clock phases, $clk_{2i-1}$ to $clk_{2i+3}$, each separated by 125 ps (a half-bit cell). The next three traces show the gates of the three PFET switches s1, s2, and s3, assuming that bit is 1. The PFET switching signals are shaped to give a 125 ps transition time to smoothly interpolate from one setting to the next. Active process compensation can be used to achieve controlled transition times of these signals. The current on the output due to bit $b_i$ is shown in trace nine. This is the impulse response of the filter. Finally, the bottom trace shows the superposition of this current waveform with that of other bits assuming a 0-1 transition.

Figure 19:
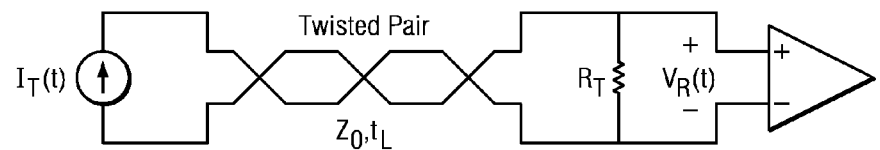
FIG. 19 illustrates differential current mode signaling on a differential transmission line.

This transmitter implements bipolar, differential, current-mode signaling on a different transmission line. As shown in FIG. 19, with this approach the transmitted signal current, $I_T$, is injected into a symmetric transmission line. At the receiver this current induces a voltage, $V_R$, across the termination resistor $R_T$. Because the voltage is developed at the receiver, this choice of signaling convention eliminates most noise due to voltage shifts between the transmitter and receiver. Using bipolar signaling eliminates reference errors as zero current is the reference level. Finally, operating current mode over a symmetric line keeps the true and complement signal in phase avoiding polarity inverting delay or phase mismatch that can plague differential voltage mode approaches. For these reasons, this signaling approach has better noise immunity than series- or parallel-terminated voltage-mode signaling, unipolar current-mode signaling, or any single-ended approach.

Receiver Design

Figure 20:
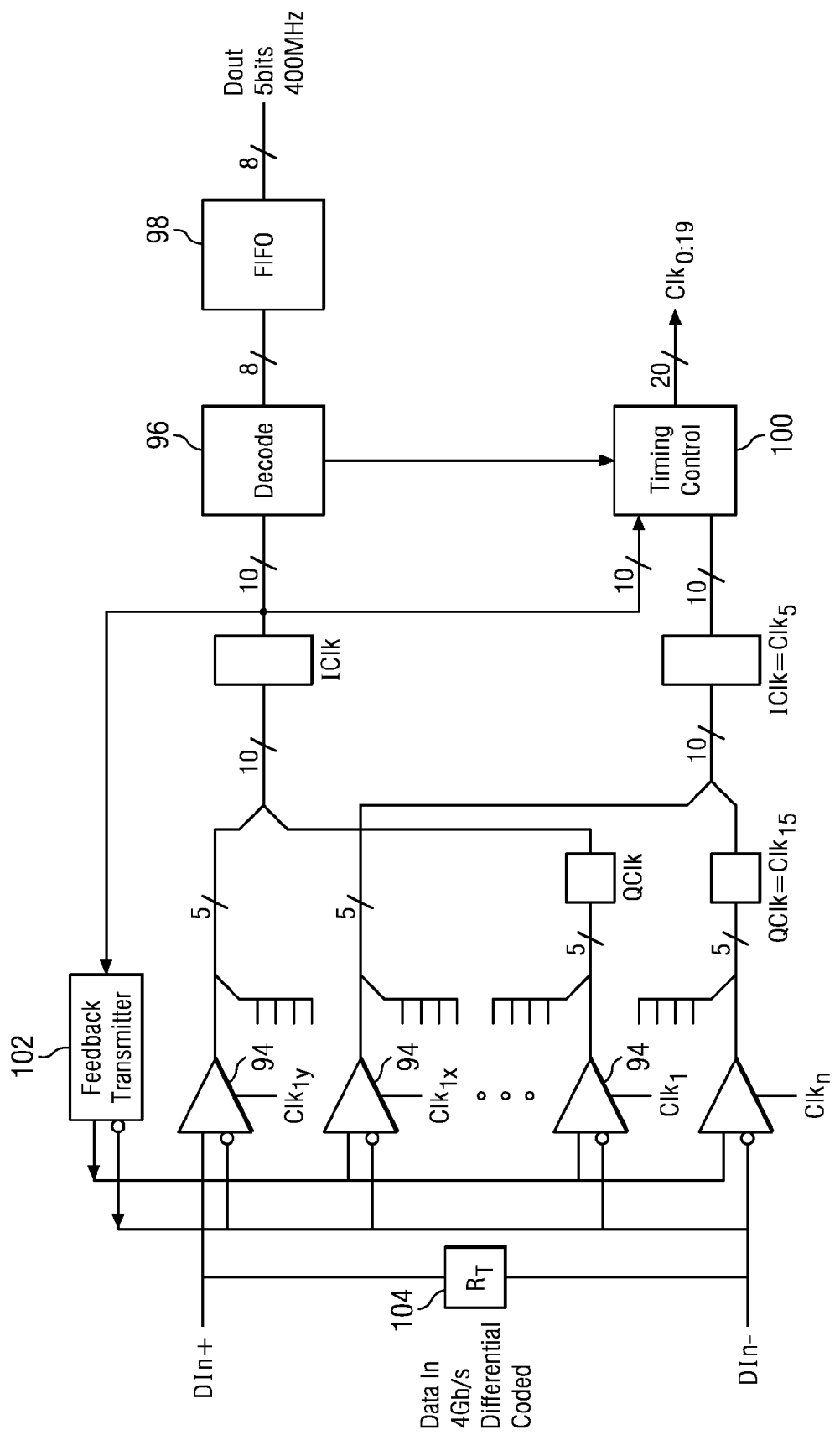
FIG. 20 is a block diagram of the receiver used in the alternative coding technique.

A block diagram of the receiver is shown in FIG. 20. In many respects it is a mirror image of the transmitter. A 4 Gb/s differential data signal enters at the left of the figure and 8b data at 400 MB/s leaves at the right. Except for the amplifiers at the left which sample the line, the entire receiver operates at 400 MHz. The line is connected to 20 gate-isolated clocked sense amplifiers that sample the value on the line at each of the 20 clock phases spaced 125 ps apart every half-bit. The amplifiers 94 gated by odd-numbered clock phases sample the incoming 4 Gb/s bit stream in the center of every cell to recover the data. After synchronization, the 10 bits recovered during one clock cycle are passed to the decoded 96. The decode block also includes a 20 to 10 funnel shifter for framing the recovered byte. The decoded output is stored in a small FIFO 98. The samples from the even numbered clocks are passed to the timing control legs 100 where they are used to adjust the phase of the receive clock as described below.

Active compensation of intersymbol interference may be provided by feeding back a filtered version of the recovered data stream to the input of the receiver. This will be accomplished using a scaled replica of the transmitter to generate a feedback current that will be superimposed onto the input nodes. The feedback transmitter 102 will be fed by the output of an FIR filter operating at the bit rate that attempts to match, and cancel, any echoes appearing on the line due to impedance discontinuities or resonant circuits. The feedback signal may be applied to a separate differential input of the receive amplifiers, not summed directly on the line as shown, to avoid injecting a backward traveling wave into the line. This approach is similar to decision-feedback equalization which is commonly used in communication systems.

A digitally-trimmed on-chip termination resistor 104 is connected across the differential pair to terminate the line. The termination resistor will be built on the receiver chip out of a series of progressively sized complementary pass gates. The pass-gates are switched on and off under closed loop control using a thermometer code to match RT to the line impedance to within 5%. Depending on crosstalk measurements a termination may be added to the transmitter as well to absorb near-end crosstalk.

CONCLUSION

Transmitter equalization extends the data rates and distances over which electronic digital signaling can be reliably used. Preemphasizing the high-frequency components of the signal compensates for the low-pass frequency response of the package and transmission line. This prevents the unattenuated low-frequency components from interfering with high-frequency pulses by causing offsets that prevent detection. With equalization an isolated pulse at the receiver has the same amplitude as a long string of repeated bits. This gives a clean received signal with a good eye opening in both the time and voltage dimensions.

In one embodiment, we implement equalization for a 4 Gbs signaling system by building a 4 GHz, five-tap FIR filter into the transmitter. This filter is simple to implement yet equalizes the frequency response to within 5% across the band of interest. The filter is realized using 0.5 mm CMOS circuitry operating at 400 MHz using a bank of 10 filters and DACs sequenced by a 10-phase 400 MHz clock. Narrow drive periods are realized using series gating to combine two clock phases, an on-phase and off-phase, in each DAC. We have simulated extracted layout of the equalized transmitter driving a load through package parasitics and 1 m of differential strip guide to demonstrate the feasibility of this approach.

The equalizing transmitter described here is one component of a 4 Gbs signaling system we are currently developing for implementation in an 0.5 μm CMOS technology. The system also relies on low jitter timing circuitry, automatic per-line skew compensation, a narrow-aperture receive amplifier, and careful package design.

The availability of 4 Gbs serial channels in a commodity CMOS technology will enable a range of system opportunities. The ubiquitous system bus can be replaced by a lower-cost yet higher-speed point-to-point network. A single hub chip with 32 serial ports can directly provide the interconnection for most systems and can be assembled into more sophisticated networks for larger systems. A single 4 Gbs serial channel provides adequate data bandwidth for most system components and multiple channels can be ganged in parallel for higher bandwidths.

Figure 14:
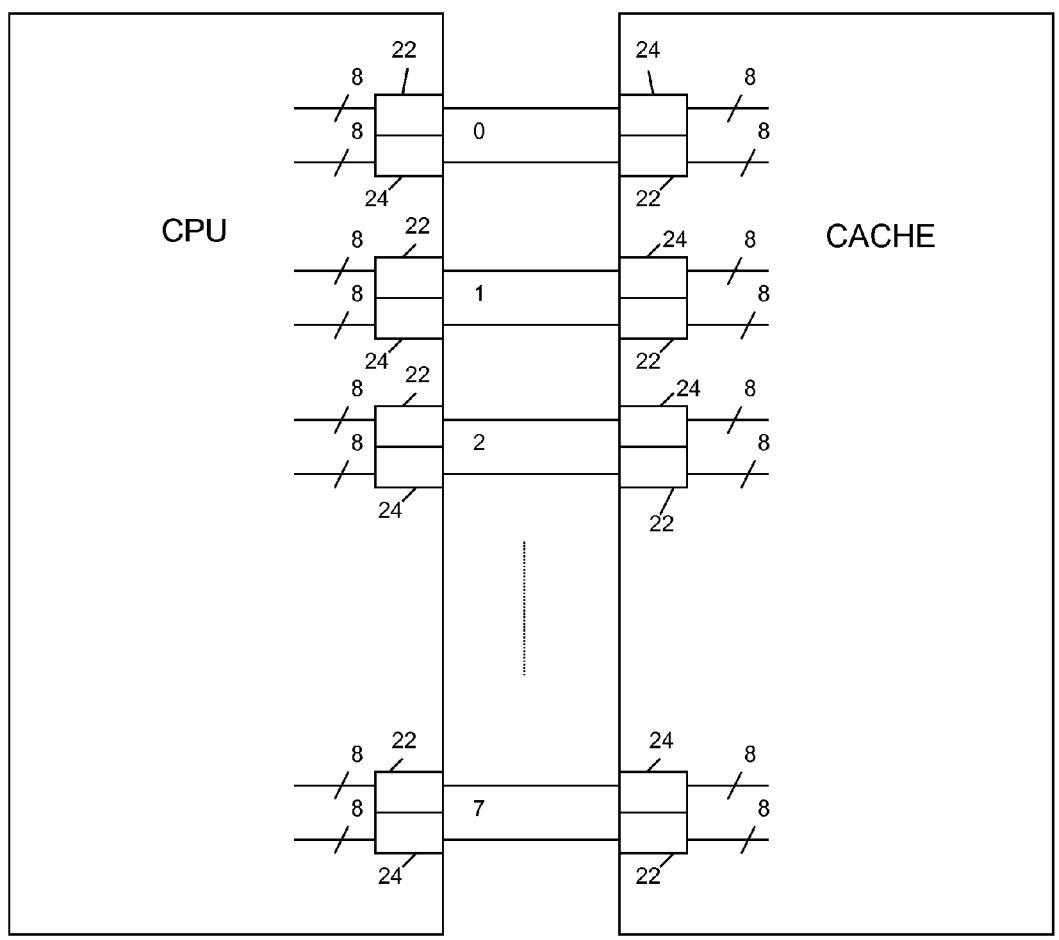
FIG. 14 illustrates a CPU to cache interface embodying the present invention.

A 4 Gbs serial channel can also be used as a replacement technology at both the component and system level. At the component level, a single serial channel (two pins) replaces 40 100 MHz pins. A 4 GByte/s CPU to L2 cache interface, for example, (FIG. 14) could be implemented with just eight serial channels. At the system level, high-speed electrical serial channels are a direct replacement for expensive optical interconnect. Using 18 AWG wire, these channels will operate up to lengths of 10 m enabling high-bandwidth, low-cost peripheral connections and local-area networks. Inexpensive electrical repeaters can be used to operate over substantially longer distances.

Even with 4 Gbs channels, system bandwidth remains a major problem for system designers. On-chip logic bandwidth (gates×speed) is increasing at a rate of 90% per year (60% gates and 20% speed). The density and bandwidth of system interconnect is increasing at a much slower rate of about 20% per year as they are limited by mechanical factors that are on a slower growth curve than that of semiconductor lithography. A major challenge for designers is to use scarce system interconnect resources effectively, both through the design of sophisticated signaling systems that use all available wire bandwidth and through system architectures that exploit locality to reduce the demands on this bandwidth.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A semiconductor device for use in transmitting a signal over a conductive path to a receiver, the semiconductor device comprising:
    a semiconductor chip; and
    equalization circuitry, including programmable circuitry, and a drive circuit, on the semiconductor chip;
    the equalization circuitry to receive input bits and generate a sequence of signal levels, at least one signal level per input bit but no more than two signal levels per input bit, each signal level a logical function of bits of the input bits, the signal levels in the sequence to be generated so as to emphasize transitions between adjacent bits of the inputs bits while attenuating repeated values of adjacent bits of the input bits;
    the drive circuit to drive the sequence of signal levels onto the conductive path;
    the programmable circuitry to cause a particular set of tap weight settings, for at least three taps to be used by the equalization circuitry to generate the signal levels in the sequence, in response to measured line characteristics associated with the conductive path.

2. The semiconductor device of claim 1, wherein the semiconductor device supports a training mode, wherein the semiconductor device further comprises circuitry to generate a signal pattern comprising ones and zeroes for the drive circuit to transmit to the receiver during the training mode, the ones and zeroes alternated in a manner to test multiple bit rates, and wherein the programmable circuitry is to receive programming to define the particular set of tap weight settings to be used by the equalization circuitry responsive to the transmission of the signal pattern during the training mode.

3. The semiconductor device of claim 1, wherein the at least three taps include a main tap, a precursor tap and a postcursor tap.

4. The semiconductor device of claim 1, wherein the at least three taps are collectively used to generate each signal level in the sequence.

5. The semiconductor device of claim 1, wherein the conductive path is a differential path, and wherein:
    the drive circuit is to transmit a serial output signal to the receiver in a manner that conveys the signal levels in the sequence using full current drive in opposite directions on both sides of each transition between adjacent bits of the input bits, as a differential signal.

6. The semiconductor device of claim 5, wherein:
    the equalization circuitry and the drive circuit are implemented as a standard cell, and define a single serial port of the semiconductor device; and
    the semiconductor device comprises plural ones of the single serial port, each having an instance of the equalization circuitry and the drive circuit, implemented so as to transmit a sequence of signal levels over a respective differential path.

7. The semiconductor device of claim 1, wherein the semiconductor device further comprises circuitry to receive n parallel bits, and to encode the parallel bits to generate m of the input bits in response to the n parallel bits, where m is greater than n, so as to ensure a minimum transition density in the input bits.

8. The semiconductor device of claim 1, wherein the programmable circuitry includes a lookup table, and wherein the equalization circuitry is to use the logical function of the bit of the input bits to access the lookup table and the lookup table is to responsively yield a drive strength.

9. The semiconductor device of claim 1, wherein the signal levels of the sequence are to vary in frequency over a range that includes Rmax, Rmax/2 and Rmax/3, where Rmax represents an alternating sequence of ones and zeros in the input bits.

10. The semiconductor device of claim 1, wherein the drive circuit includes pulse generators.

11. A semiconductor device for use in transmitting a signal over a conductive path to a receiver, the semiconductor device comprising:
    a semiconductor chip;
    equalization circuitry, including programmable circuitry, a drive circuit, and circuitry to generate a signal pattern on the semiconductor chip;
    the equalization circuitry to receive input bits and generate a sequence of signal levels, at least one signal level per input bit but no more than two signal levels per input bit, each signal level a logical function of bits of the input bits, the signal levels in the sequence to be generated so as to emphasize transitions between adjacent bits of the inputs bits while attenuating repeated values of adjacent bits of the input bits;
    the drive circuit to drive the sequence of signal levels onto the conductive path;
    the programmable circuitry to cause a particular set of tap weight settings, for at least three taps to be used by the equalization circuitry to generate the signal levels in the sequence, in response to measured line characteristics associated with the conductive path, the at least three taps including a precursor tap and a postcursor tap;
    the signal pattern comprising ones and zeroes for the drive circuit to transmit to the receiver during the training mode, the ones and zeroes alternated by the circuitry to generate the pattern in a manner to test multiple bit rates;
    the programmable circuitry to receive programming, to define the particular set of tap weight settings to be used by the equalization circuitry, responsive to the transmission of the signal pattern during a training mode of the semiconductor device.

12. The semiconductor device of claim 11, wherein the conductive path is a differential path, and wherein:
    the drive circuit is to transmit a serial, differential output signal to the receiver over the differential path in a manner that conveys the sequence of signal levels using full current drive in opposite directions on both sides of each transition between adjacent bits of the input bits.

13. The semiconductor device of claim 11, wherein:
    the equalization circuitry, the drive circuit and the circuitry to generate the signal pattern are implemented as a standard cell, and define a single serial port of the semiconductor device; and
    the semiconductor device comprises plural ones of the single serial port, each having an instance of the equalization circuitry, the drive circuit and the circuitry to generate the signal pattern, implemented so as to transmit a sequence of signal levels over a respective differential path.

14. The semiconductor device of claim 11, wherein the semiconductor device further comprises circuitry to receive n parallel bits, and to encode the parallel bits to generate m of the input bits in response to the n parallel bits, where m is greater than n, so as to ensure a minimum transition density in the input bits.

15. A semiconductor device for use in transmitting a signal over a conductive, differential path to a receiver, the semiconductor device comprising:
  a semiconductor chip; and
  encoding circuitry, equalization circuitry, including programmable circuitry, and a drive circuit on the semiconductor chip;
  the encoding circuitry to receive n parallel bits and to encode the parallel bits to generate m input bits in response to the n parallel bits, where m is greater than n, so as to generate the m input bits in a manner that ensures a minimum transition density;
  the equalization circuitry to receive m input bits and generate a sequence of signal levels, at least one signal level per input bit but no more than two signal levels per input bit, each signal level a logical function of bits of the input bits, the signal levels in the sequence to be generated so as to emphasize transitions between adjacent bits of the m inputs bits while attenuating repeated values of adjacent bits of the m input bits;
  the drive circuit to drive the sequence of signal levels onto the conductive, differential path as a serial output signal;
  the programmable circuitry to cause a particular set of tap weight settings, for at least three taps to be used by the equalization circuitry to generate the signal levels in the sequence, in response to measured line characteristics associated with the conductive path.

16. The semiconductor device of claim 15, wherein the semiconductor device supports a training mode, wherein the semiconductor device further comprises circuitry to generate a signal pattern comprising ones and zeroes for the drive circuit to transmit to the receiver during the training mode, the ones and zeroes alternated in a manner to test multiple bit rates, and wherein the programmable circuitry is to receive programming to define the particular set of tap weight settings to be used by the equalization circuitry responsive to the transmission of the signal pattern during the training mode.

17. The semiconductor device of claim 15, wherein the at least three taps include a main tap, a precursor tap and a postcursor tap.

18. The semiconductor device of claim 15, wherein the at least three taps are collectively used to generate each signal level in the sequence.

19. The semiconductor device of claim 15, wherein:
  the encoding circuitry, the equalization circuitry, and the drive circuit are implemented as a standard cell, and define a single serial port of the semiconductor device; and
  the semiconductor device comprises plural ones of the single serial port, each having an instance of the encoding circuitry, the equalization circuitry, and the drive circuit, implemented so as to transmit a sequence of signal levels over a respective differential path.

20. The semiconductor device of claim 15, wherein the signal levels of the sequence are to vary in frequency over a range that includes Rmax, Rmax/2 and Rmax/3, where Rmax represents an alternating sequence of ones and zeros in the m input bits.

21. The semiconductor device of claim 15, wherein there is exactly one signal level in the sequence of signal levels for each of the m input bits.

* * * * *

UNITED STATES PATENT AND TRADEMARK OFFICE
CERTIFICATE OF CORRECTION

PATENT NO. : 8,923,433 B2
APPLICATION NO. : 14/170685
DATED : December 30, 2014
INVENTOR(S) : William J. Dally Page 1 of 1

It is certified that error appears in the above-identified patent and that said Letters Patent is hereby corrected as shown below:

In the Claims

Column 12, in Claim 11, line 40, delete the second occurrence of "the" and insert --a--

Column 12, in Claim 11, line 46, delete "a" and insert --the--

Signed and Sealed this
Twenty-sixth Day of May, 2015

Michelle K. Lee
*Director of the United States Patent and Trademark Office*